(12) United States Patent
Noguchi

(10) Patent No.: US 7,692,835 B2
(45) Date of Patent: Apr. 6, 2010

(54) HOLOGRAM RECORDING APPARATUS, HOLOGRAM RECORDING METHOD, AND HOLOGRAM RECORDING MEDIUM

(75) Inventor: Tatsumi Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 623 days.

(21) Appl. No.: 11/501,819

(22) Filed: Aug. 10, 2006

(65) Prior Publication Data

US 2007/0047039 A1     Mar. 1, 2007

(30) Foreign Application Priority Data

Aug. 30, 2005   (JP)   ............................. 2005-249084

(51) Int. Cl.
 *G02B 5/32*   (2006.01)
(52) U.S. Cl. ................................ 359/21; 359/1; 359/35; 359/900
(58) Field of Classification Search ........................ None
See application file for complete search history.

(56) References Cited

U.S. PATENT DOCUMENTS 7,274,497 B2 *   9/2007   Tsukagoshi et al. ........... 359/22
2005/0162719 A1 *   7/2005   Ogasawara et al. ........... 359/22

FOREIGN PATENT DOCUMENTS

| JP | 7-254037 | 10/1995 |
| JP | 2001-75463 | 3/2001 |
| JP | 2004-29476 | 1/2004 |
| JP | 2005-92438 | 4/2005 |
| JP | 2005-190636 | 7/2005 |
| WO | WO 2005006317 A1 * | 1/2005 |

* cited by examiner

*Primary Examiner*—Arnel C Lavarias
*Assistant Examiner*—Derek S Chapel
(74) *Attorney, Agent, or Firm*—Oblon, Spivak, McClelland, Maier & Neustadt, L.L.P.

(57) ABSTRACT

A recording medium, a recording apparatus, and a recording method. Recording data is recorded as element holograms on a hologram recording medium, a synchronization signal selected from among a plurality of synchronization signals and recording data encoded for every predetermined unit amount are arrayed to facilitate reproduction.

9 Claims, 61 Drawing Sheets

DATA DT

FOURIER IMAGE

DT REPRODUCTION IMAGE

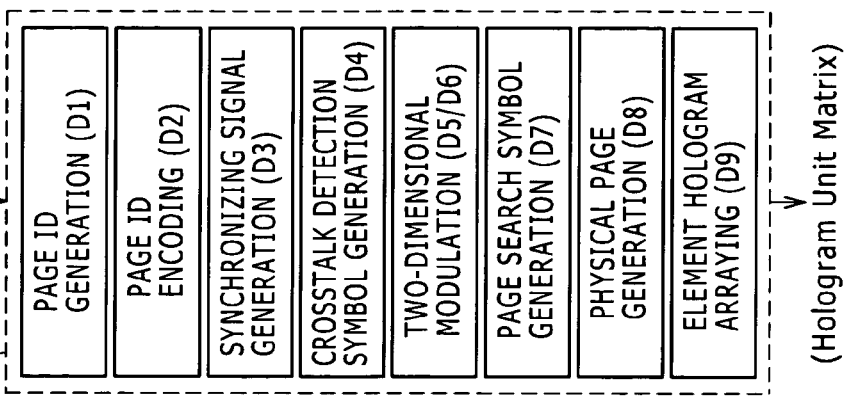
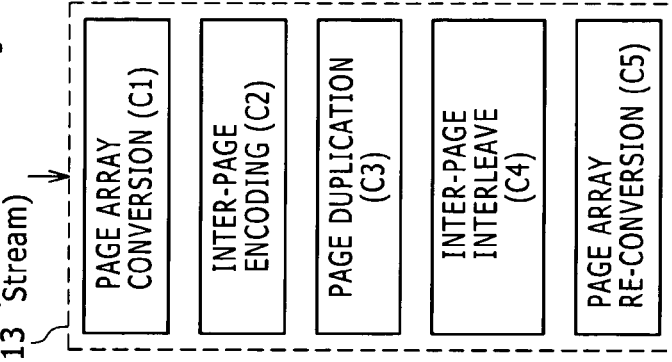
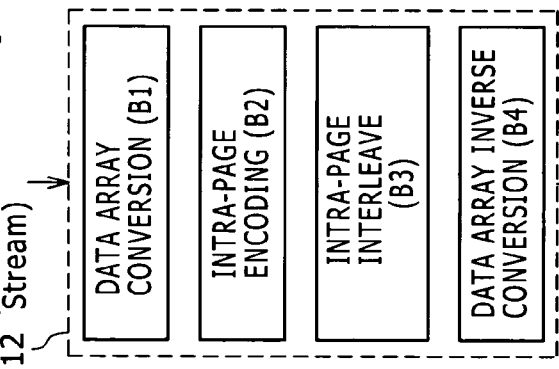
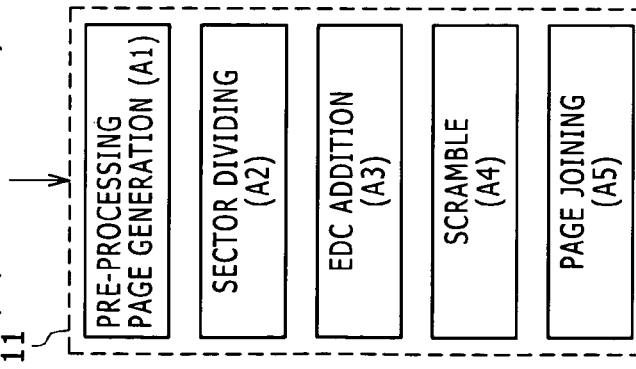

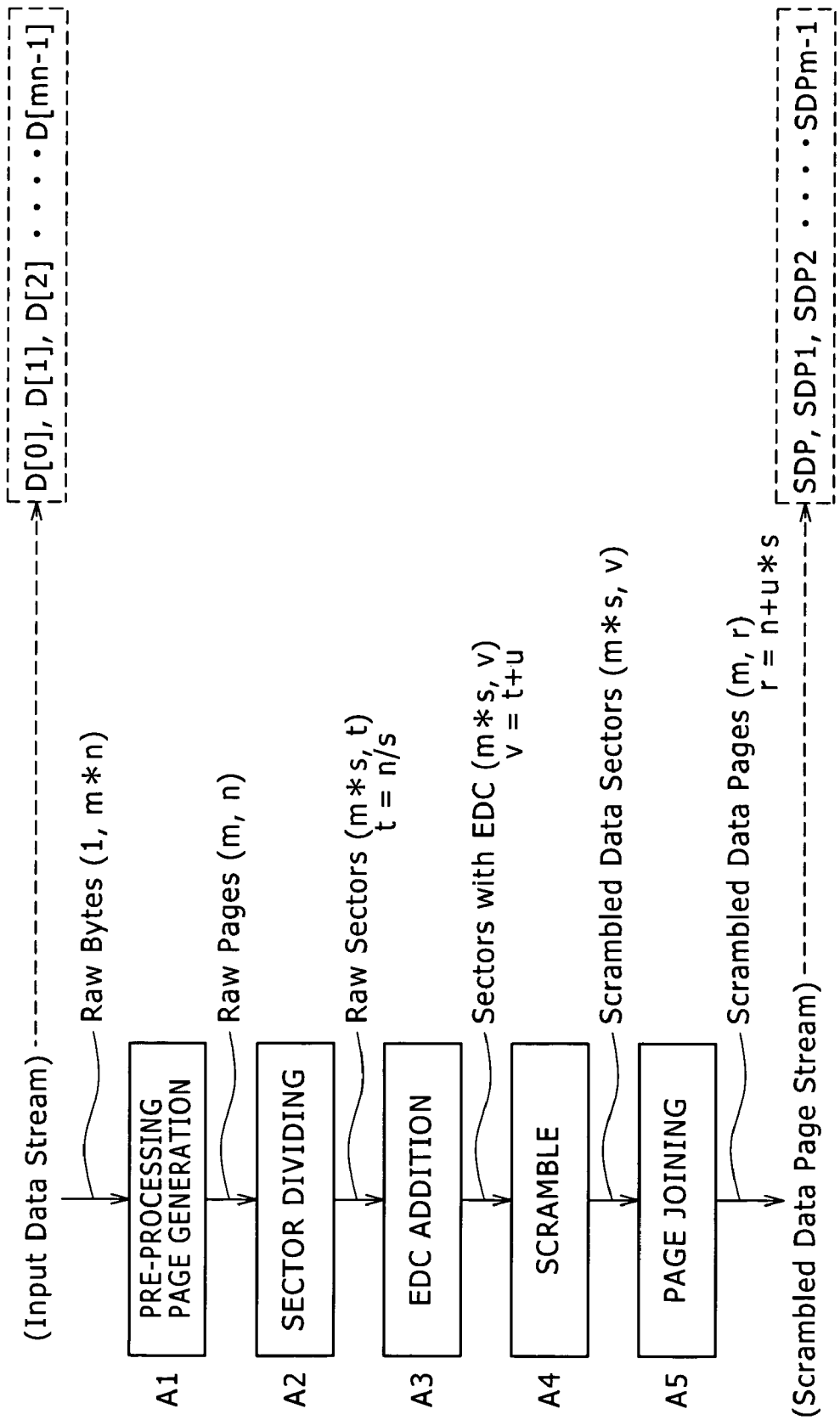

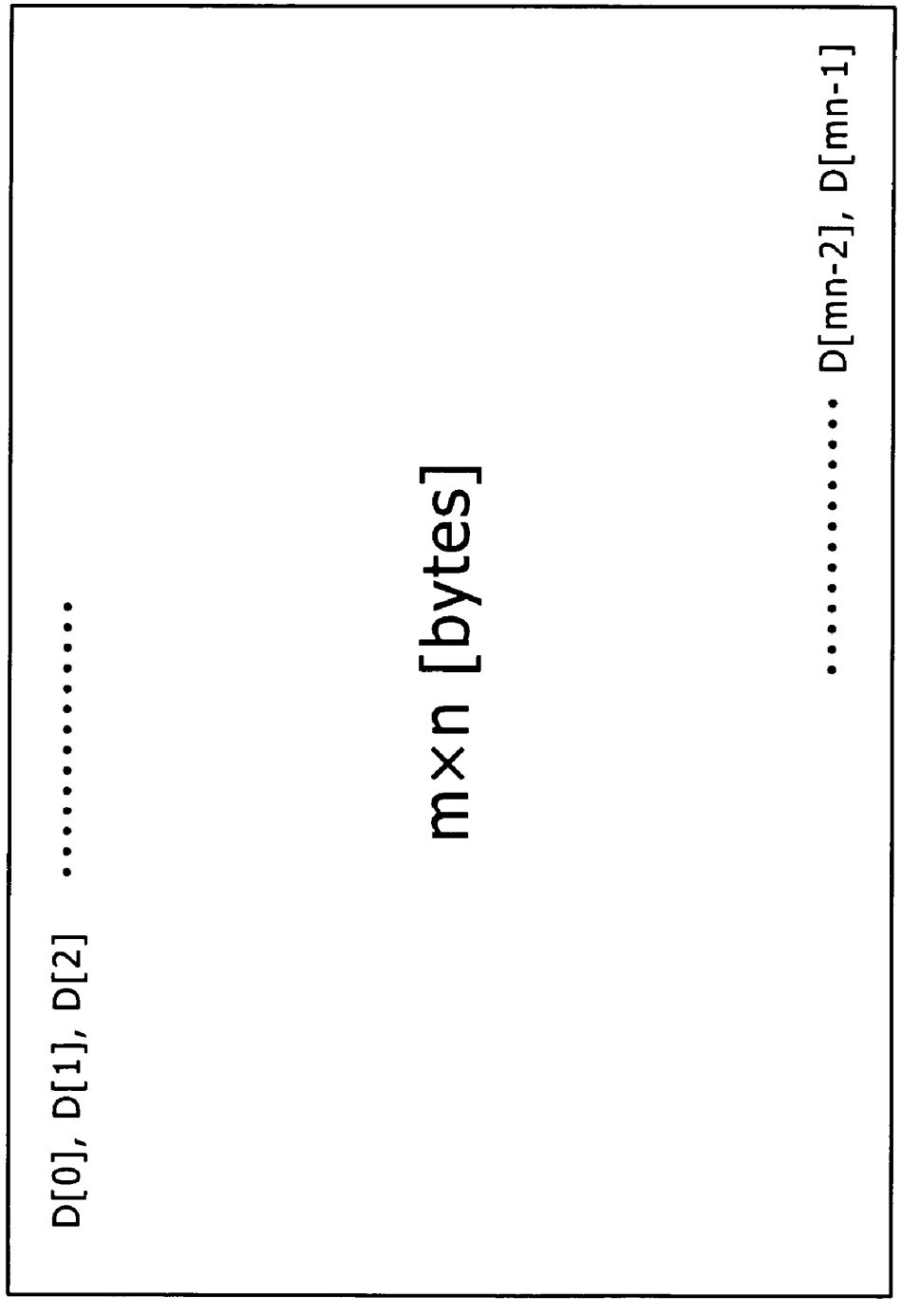

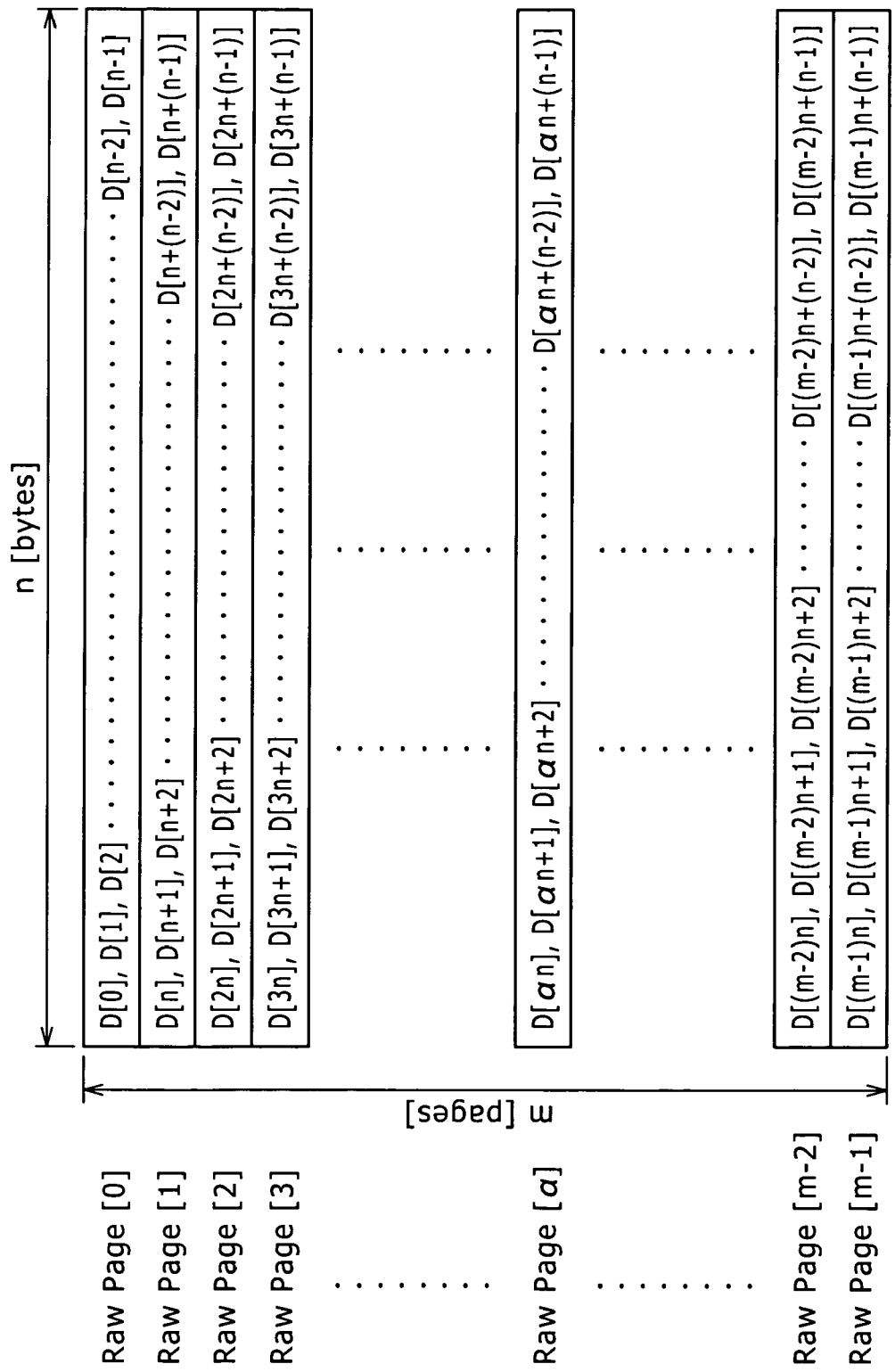

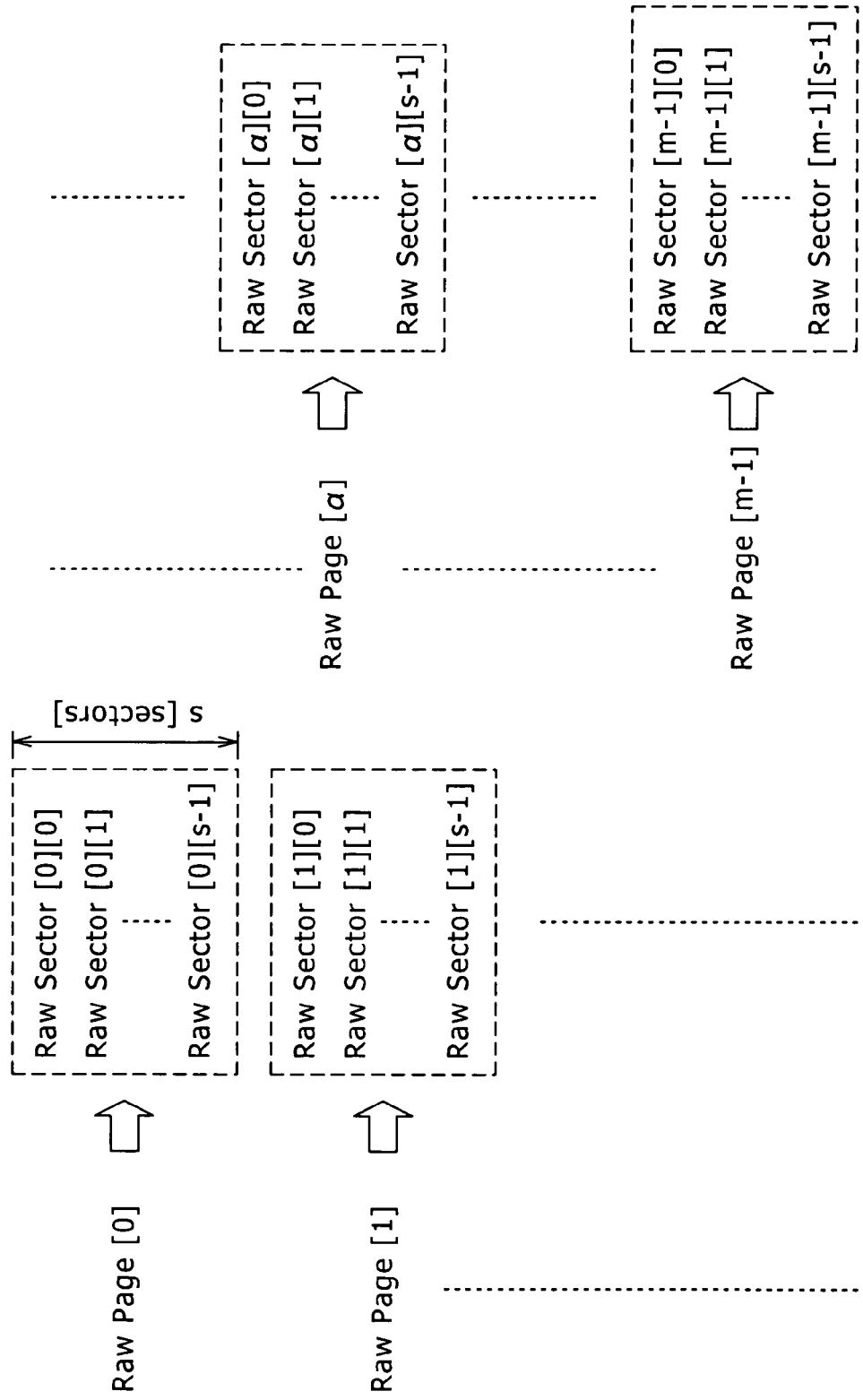

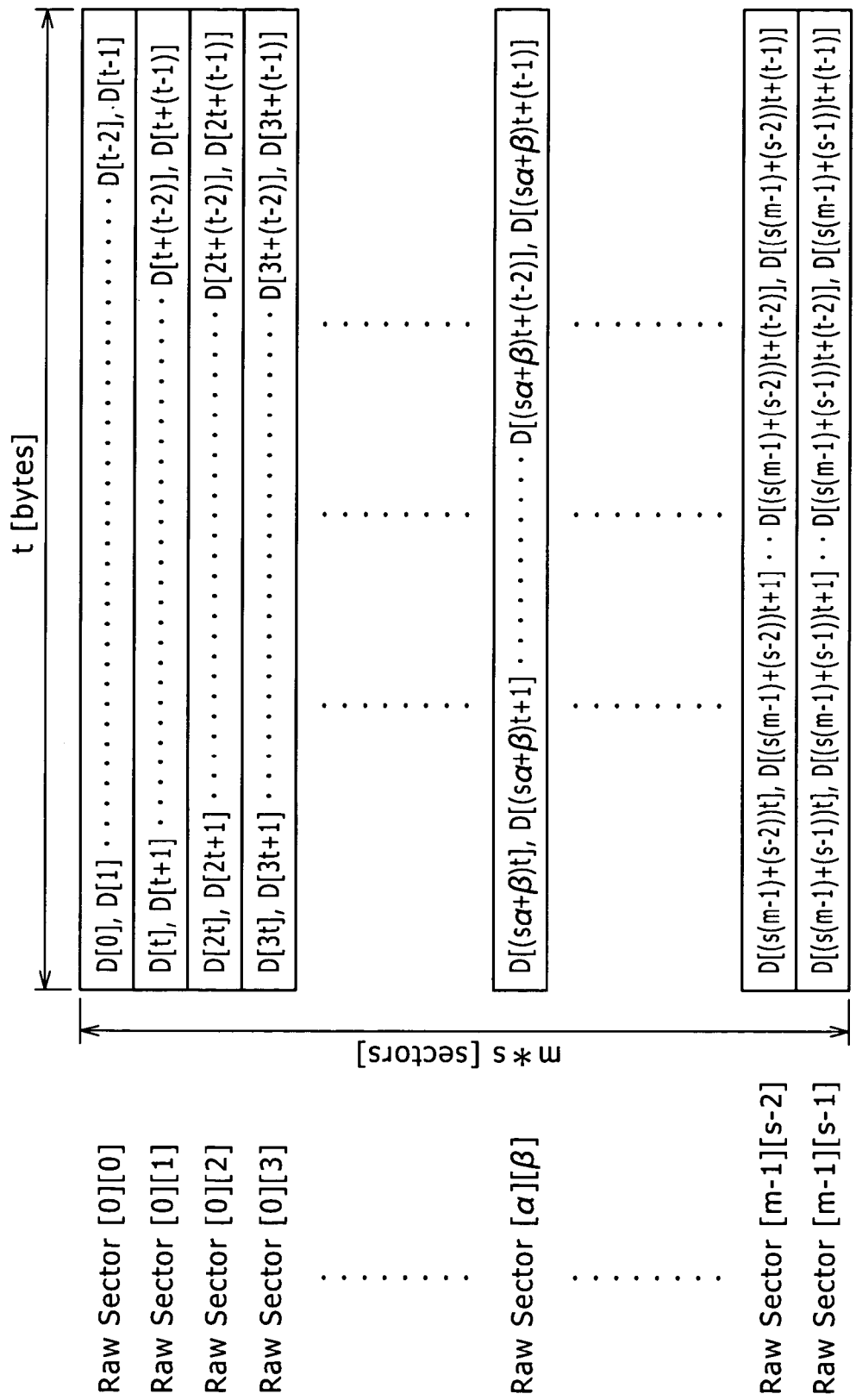

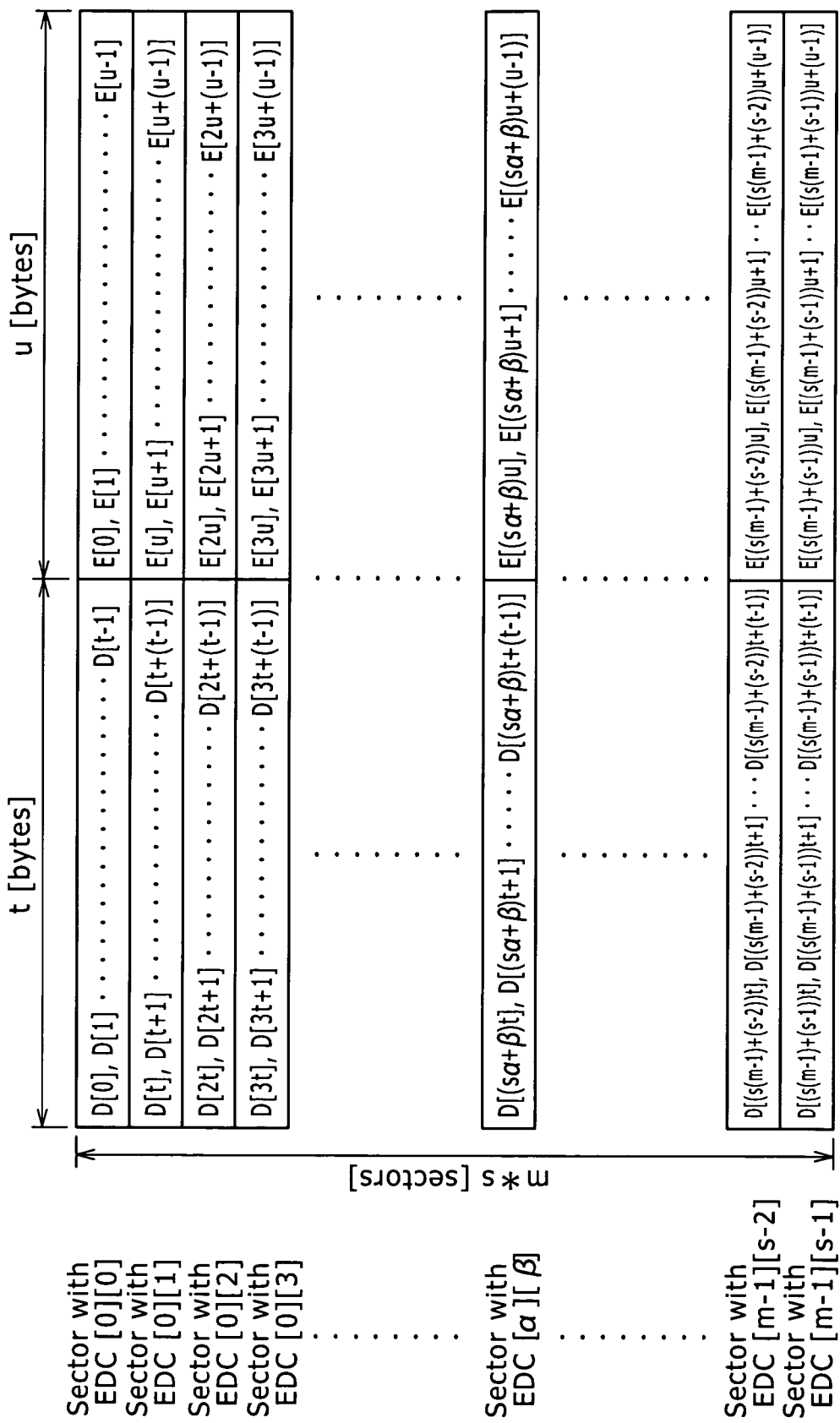

| BEFORE MODULATION | | AFTER MODULATION | | | | | | | | | | | | | | | |
|---|---|---|---|---|---|---|---|---|---|---|---|---|---|---|---|---|---|
| DEC | HEX | Pf | Pe | Pd | Pc | Pb | Pa | P9 | P8 | P7 | P6 | P5 | P4 | P3 | P2 | P1 | P0 |
| 0 | 00 | x | 0 | 0 | 0 | 0 | 0 | 0 | 0 | 0 | 0 | 0 | 1 | 0 | 1 | 0 | 1 |
| 1 | 01 | x | 0 | 0 | 0 | 0 | 0 | 0 | 0 | 0 | 0 | 0 | 1 | 1 | 0 | 0 | 1 |
| 2 | 02 | x | 0 | 0 | 0 | 0 | 0 | 0 | 0 | 0 | 0 | 0 | 1 | 1 | 0 | 1 | 0 |
| 3 | 03 | x | 0 | 0 | 0 | 0 | 0 | 0 | 0 | 0 | 0 | 0 | 1 | 1 | 1 | 0 | 0 |
| 4 | 04 | x | 0 | 0 | 0 | 0 | 0 | 0 | 0 | 0 | 0 | 1 | 0 | 0 | 0 | 1 | 1 |
| 5 | 05 | x | 0 | 0 | 0 | 0 | 0 | 0 | 0 | 0 | 0 | 1 | 0 | 0 | 1 | 0 | 1 |
| 6 | 06 | x | 0 | 0 | 0 | 0 | 0 | 0 | 0 | 0 | 0 | 1 | 0 | 0 | 1 | 1 | 0 |
| 7 | 07 | x | 0 | 0 | 0 | 0 | 0 | 0 | 0 | 0 | 0 | 1 | 0 | 1 | 0 | 0 | 1 |
| 8 | 08 | x | 0 | 0 | 0 | 0 | 0 | 0 | 0 | 0 | 0 | 1 | 0 | 1 | 0 | 1 | 0 |
| 9 | 09 | x | 0 | 0 | 0 | 0 | 0 | 0 | 0 | 0 | 0 | 1 | 0 | 1 | 1 | 0 | 0 |
| 10 | 0A | x | 0 | 0 | 0 | 0 | 0 | 0 | 0 | 0 | 0 | 1 | 1 | 0 | 0 | 0 | 1 |
| 11 | 0B | x | 0 | 0 | 0 | 0 | 0 | 0 | 0 | 0 | 0 | 1 | 1 | 0 | 0 | 1 | 0 |
| 12 | 0C | x | 0 | 0 | 0 | 0 | 0 | 0 | 0 | 0 | 0 | 1 | 1 | 0 | 1 | 0 | 0 |
| 13 | 0D | x | 0 | 0 | 0 | 0 | 0 | 0 | 0 | 0 | 0 | 1 | 1 | 1 | 0 | 0 | 0 |
| 14 | 0E | x | 0 | 0 | 0 | 0 | 0 | 0 | 0 | 0 | 1 | 0 | 0 | 0 | 0 | 1 | 1 |
| 15 | 0F | x | 0 | 0 | 0 | 0 | 0 | 0 | 0 | 0 | 1 | 0 | 0 | 0 | 1 | 0 | 1 |
| 16 | 10 | x | 0 | 0 | 0 | 0 | 0 | 0 | 0 | 0 | 1 | 0 | 0 | 0 | 1 | 1 | 0 |
| 17 | 11 | x | 0 | 0 | 0 | 0 | 0 | 0 | 0 | 0 | 1 | 0 | 0 | 1 | 0 | 0 | 1 |
| 18 | 12 | x | 0 | 0 | 0 | 0 | 0 | 0 | 0 | 0 | 1 | 0 | 0 | 1 | 0 | 1 | 0 |
| 19 | 13 | x | 0 | 0 | 0 | 0 | 0 | 0 | 0 | 0 | 1 | 0 | 0 | 1 | 1 | 0 | 0 |
| 20 | 14 | x | 0 | 0 | 0 | 0 | 0 | 0 | 0 | 0 | 1 | 0 | 1 | 0 | 0 | 0 | 1 |
| 21 | 15 | x | 0 | 0 | 0 | 0 | 0 | 0 | 0 | 0 | 1 | 0 | 1 | 0 | 0 | 1 | 0 |
| 22 | 16 | x | 0 | 0 | 0 | 0 | 0 | 0 | 0 | 0 | 1 | 0 | 1 | 0 | 1 | 0 | 0 |
| 23 | 17 | x | 0 | 0 | 0 | 0 | 0 | 0 | 0 | 0 | 1 | 0 | 1 | 1 | 0 | 0 | 0 |
| 24 | 18 | x | 0 | 0 | 0 | 0 | 0 | 0 | 0 | 0 | 1 | 1 | 0 | 0 | 0 | 0 | 1 |
| 25 | 19 | x | 0 | 0 | 0 | 0 | 0 | 0 | 0 | 0 | 1 | 1 | 0 | 0 | 0 | 1 | 0 |
| 26 | 1A | x | 0 | 0 | 0 | 0 | 0 | 0 | 0 | 0 | 1 | 1 | 0 | 0 | 1 | 0 | 0 |
| 27 | 1B | x | 0 | 0 | 0 | 0 | 0 | 0 | 0 | 0 | 1 | 1 | 0 | 1 | 0 | 0 | 0 |
| 28 | 1C | x | 0 | 0 | 0 | 0 | 0 | 0 | 0 | 1 | 0 | 0 | 0 | 0 | 0 | 1 | 1 |
| 29 | 1D | x | 0 | 0 | 0 | 0 | 0 | 0 | 0 | 1 | 0 | 0 | 0 | 0 | 1 | 0 | 1 |
| 30 | 1E | x | 0 | 0 | 0 | 0 | 0 | 0 | 0 | 1 | 0 | 0 | 0 | 0 | 1 | 1 | 0 |
| 31 | 1F | x | 0 | 0 | 0 | 0 | 0 | 0 | 0 | 1 | 0 | 0 | 0 | 1 | 0 | 0 | 1 |
| 32 | 20 | x | 0 | 0 | 0 | 0 | 0 | 0 | 0 | 1 | 0 | 0 | 0 | 1 | 0 | 1 | 0 |
| 33 | 21 | x | 0 | 0 | 0 | 0 | 0 | 0 | 0 | 1 | 0 | 0 | 1 | 0 | 0 | 0 | 1 |
| 34 | 22 | x | 0 | 0 | 0 | 0 | 0 | 0 | 0 | 1 | 0 | 0 | 1 | 0 | 0 | 1 | 0 |
| 35 | 23 | x | 0 | 0 | 0 | 0 | 0 | 0 | 0 | 1 | 0 | 0 | 1 | 0 | 1 | 0 | 0 |
| 36 | 24 | x | 0 | 0 | 0 | 0 | 0 | 0 | 0 | 1 | 0 | 0 | 1 | 1 | 0 | 0 | 0 |
| 37 | 25 | x | 0 | 0 | 0 | 0 | 0 | 0 | 0 | 1 | 0 | 1 | 0 | 0 | 0 | 0 | 1 |

FIG. 29

| BEFORE MODULATION | | AFTER MODULATION | | | | | | | | | | | | | | |
|---|---|---|---|---|---|---|---|---|---|---|---|---|---|---|---|---|
| DEC | HEX | Pf | Pe | Pd | Pc | Pb | Pa | P9 | P8 | P7 | P6 | P5 | P4 | P3 | P2 | P1 | P0 |
| 38 | 26 | x | 0 | 0 | 0 | 0 | 0 | 0 | 0 | 1 | 0 | 1 | 0 | 0 | 0 | 1 | 0 |
| 39 | 27 | x | 0 | 0 | 0 | 0 | 0 | 0 | 0 | 1 | 0 | 1 | 0 | 0 | 1 | 0 | 0 |
| 40 | 28 | x | 0 | 0 | 0 | 0 | 0 | 0 | 0 | 1 | 0 | 1 | 0 | 1 | 0 | 0 | 0 |
| 41 | 29 | x | 0 | 0 | 0 | 0 | 0 | 0 | 0 | 1 | 1 | 0 | 0 | 0 | 0 | 0 | 1 |
| 42 | 2A | x | 0 | 0 | 0 | 0 | 0 | 0 | 0 | 1 | 1 | 0 | 0 | 0 | 0 | 1 | 0 |
| 43 | 2B | x | 0 | 0 | 0 | 0 | 0 | 0 | 0 | 1 | 1 | 0 | 0 | 0 | 1 | 0 | 0 |
| 44 | 2C | x | 0 | 0 | 0 | 0 | 0 | 0 | 0 | 1 | 1 | 0 | 0 | 1 | 0 | 0 | 0 |
| 45 | 2D | x | 0 | 0 | 0 | 0 | 0 | 0 | 1 | 0 | 0 | 0 | 0 | 0 | 0 | 1 | 1 |
| 46 | 2E | x | 0 | 0 | 0 | 0 | 0 | 0 | 1 | 0 | 0 | 0 | 0 | 0 | 1 | 0 | 1 |
| 47 | 2F | x | 0 | 0 | 0 | 0 | 0 | 0 | 1 | 0 | 0 | 0 | 0 | 0 | 1 | 1 | 0 |
| 48 | 30 | x | 0 | 0 | 0 | 0 | 0 | 0 | 1 | 0 | 0 | 0 | 0 | 1 | 0 | 0 | 1 |
| 49 | 31 | x | 0 | 0 | 0 | 0 | 0 | 0 | 1 | 0 | 0 | 0 | 0 | 1 | 0 | 1 | 0 |
| 50 | 32 | x | 0 | 0 | 0 | 0 | 0 | 0 | 1 | 0 | 0 | 0 | 0 | 1 | 1 | 0 | 0 |
| 51 | 33 | x | 0 | 0 | 0 | 0 | 0 | 0 | 1 | 0 | 0 | 0 | 1 | 0 | 1 | 0 | 0 |
| 52 | 34 | x | 0 | 0 | 0 | 0 | 0 | 0 | 1 | 0 | 0 | 0 | 1 | 1 | 0 | 0 | 0 |
| 53 | 35 | x | 0 | 0 | 0 | 0 | 0 | 0 | 1 | 0 | 0 | 1 | 0 | 0 | 0 | 0 | 1 |
| 54 | 36 | x | 0 | 0 | 0 | 0 | 0 | 0 | 1 | 0 | 0 | 1 | 0 | 0 | 0 | 1 | 0 |
| 55 | 37 | x | 0 | 0 | 0 | 0 | 0 | 0 | 1 | 0 | 0 | 1 | 0 | 1 | 0 | 0 | 0 |
| 56 | 38 | x | 0 | 0 | 0 | 0 | 0 | 0 | 1 | 0 | 0 | 1 | 1 | 0 | 0 | 0 | 0 |
| 57 | 39 | x | 0 | 0 | 0 | 0 | 0 | 0 | 1 | 0 | 1 | 0 | 0 | 0 | 0 | 0 | 1 |
| 58 | 3A | x | 0 | 0 | 0 | 0 | 0 | 0 | 1 | 0 | 1 | 0 | 0 | 0 | 0 | 1 | 0 |
| 59 | 3B | x | 0 | 0 | 0 | 0 | 0 | 0 | 1 | 0 | 1 | 0 | 0 | 0 | 1 | 0 | 0 |
| 60 | 3C | x | 0 | 0 | 0 | 0 | 0 | 0 | 1 | 0 | 1 | 0 | 0 | 1 | 0 | 0 | 0 |
| 61 | 3D | x | 0 | 0 | 0 | 0 | 0 | 0 | 1 | 0 | 1 | 0 | 1 | 0 | 0 | 0 | 0 |
| 62 | 3E | x | 0 | 0 | 0 | 0 | 0 | 0 | 1 | 0 | 1 | 1 | 0 | 0 | 0 | 0 | 0 |
| 63 | 3F | x | 0 | 0 | 0 | 0 | 0 | 0 | 1 | 1 | 0 | 0 | 0 | 0 | 0 | 0 | 1 |
| 64 | 40 | x | 0 | 0 | 0 | 0 | 0 | 0 | 1 | 1 | 0 | 0 | 0 | 0 | 0 | 1 | 0 |
| 65 | 41 | x | 0 | 0 | 0 | 0 | 0 | 0 | 1 | 1 | 0 | 0 | 0 | 0 | 1 | 0 | 0 |
| 66 | 42 | x | 0 | 0 | 0 | 0 | 0 | 0 | 1 | 1 | 0 | 0 | 0 | 1 | 0 | 0 | 0 |
| 67 | 43 | x | 0 | 0 | 0 | 0 | 0 | 0 | 1 | 1 | 0 | 0 | 1 | 0 | 0 | 0 | 0 |
| 68 | 44 | x | 0 | 0 | 0 | 0 | 0 | 0 | 1 | 1 | 0 | 1 | 0 | 0 | 0 | 0 | 0 |
| 69 | 45 | x | 0 | 0 | 0 | 0 | 0 | 0 | 1 | 1 | 1 | 0 | 0 | 0 | 0 | 0 | 0 |
| 70 | 46 | x | 0 | 0 | 0 | 0 | 0 | 1 | 0 | 0 | 0 | 0 | 0 | 0 | 0 | 0 | 1 | 1 |
| 71 | 47 | x | 0 | 0 | 0 | 0 | 0 | 1 | 0 | 0 | 0 | 0 | 0 | 0 | 1 | 0 | 1 |
| 72 | 48 | x | 0 | 0 | 0 | 0 | 0 | 1 | 0 | 0 | 0 | 0 | 0 | 0 | 1 | 1 | 0 |
| 73 | 49 | x | 0 | 0 | 0 | 0 | 0 | 1 | 0 | 0 | 0 | 0 | 0 | 1 | 0 | 0 | 1 |
| 74 | 4A | x | 0 | 0 | 0 | 0 | 0 | 1 | 0 | 0 | 0 | 0 | 0 | 1 | 0 | 1 | 0 |

FIG.30

| BEFORE MODULATION | | AFTER MODULATION | | | | | | | | | | | | | | | |
|---|---|---|---|---|---|---|---|---|---|---|---|---|---|---|---|---|---|
| DEC | HEX | Pf | Pe | Pd | Pc | Pb | Pa | P9 | P8 | P7 | P6 | P5 | P4 | P3 | P2 | P1 | P0 |
| 75 | 4B | x | 0 | 0 | 0 | 0 | 0 | 1 | 0 | 0 | 0 | 0 | 0 | 1 | 1 | 0 | 0 |
| 76 | 4C | x | 0 | 0 | 0 | 0 | 0 | 1 | 0 | 0 | 0 | 0 | 1 | 0 | 0 | 0 | 1 |
| 77 | 4D | x | 0 | 0 | 0 | 0 | 0 | 1 | 0 | 0 | 0 | 0 | 1 | 0 | 0 | 1 | 0 |
| 78 | 4E | x | 0 | 0 | 0 | 0 | 0 | 1 | 0 | 0 | 0 | 0 | 1 | 0 | 1 | 0 | 0 |
| 79 | 4F | x | 0 | 0 | 0 | 0 | 0 | 1 | 0 | 0 | 0 | 0 | 1 | 1 | 0 | 0 | 0 |
| 80 | 50 | x | 0 | 0 | 0 | 0 | 0 | 1 | 0 | 0 | 0 | 1 | 0 | 0 | 0 | 0 | 1 |
| 81 | 51 | x | 0 | 0 | 0 | 0 | 0 | 1 | 0 | 0 | 0 | 1 | 0 | 0 | 1 | 0 | 0 |
| 82 | 52 | x | 0 | 0 | 0 | 0 | 0 | 1 | 0 | 0 | 0 | 1 | 0 | 1 | 0 | 0 | 0 |
| 83 | 53 | x | 0 | 0 | 0 | 0 | 0 | 1 | 0 | 0 | 0 | 1 | 1 | 0 | 0 | 0 | 0 |
| 84 | 54 | x | 0 | 0 | 0 | 0 | 0 | 1 | 0 | 0 | 1 | 0 | 0 | 0 | 0 | 0 | 1 |
| 85 | 55 | x | 0 | 0 | 0 | 0 | 0 | 1 | 0 | 0 | 1 | 0 | 0 | 0 | 0 | 1 | 0 |
| 86 | 56 | x | 0 | 0 | 0 | 0 | 0 | 1 | 0 | 0 | 1 | 0 | 0 | 0 | 1 | 0 | 0 |
| 87 | 57 | x | 0 | 0 | 0 | 0 | 0 | 1 | 0 | 0 | 1 | 0 | 1 | 0 | 0 | 0 | 0 |
| 88 | 58 | x | 0 | 0 | 0 | 0 | 0 | 1 | 0 | 0 | 1 | 1 | 0 | 0 | 0 | 0 | 0 |
| 89 | 59 | x | 0 | 0 | 0 | 0 | 0 | 1 | 0 | 1 | 0 | 0 | 0 | 0 | 0 | 0 | 1 |
| 90 | 5A | x | 0 | 0 | 0 | 0 | 0 | 1 | 0 | 1 | 0 | 0 | 0 | 0 | 0 | 1 | 0 |
| 91 | 5B | x | 0 | 0 | 0 | 0 | 0 | 1 | 0 | 1 | 0 | 0 | 0 | 0 | 1 | 0 | 0 |
| 92 | 5C | x | 0 | 0 | 0 | 0 | 0 | 1 | 0 | 1 | 0 | 0 | 0 | 1 | 0 | 0 | 0 |
| 93 | 5D | x | 0 | 0 | 0 | 0 | 0 | 1 | 0 | 1 | 0 | 0 | 1 | 0 | 0 | 0 | 0 |
| 94 | 5E | x | 0 | 0 | 0 | 0 | 0 | 1 | 0 | 1 | 0 | 1 | 0 | 0 | 0 | 0 | 0 |
| 95 | 5F | x | 0 | 0 | 0 | 0 | 0 | 1 | 0 | 1 | 1 | 0 | 0 | 0 | 0 | 0 | 0 |
| 96 | 60 | x | 0 | 0 | 0 | 0 | 0 | 1 | 1 | 0 | 0 | 0 | 0 | 0 | 0 | 0 | 1 |
| 97 | 61 | x | 0 | 0 | 0 | 0 | 0 | 1 | 1 | 0 | 0 | 0 | 0 | 0 | 0 | 1 | 0 |
| 98 | 62 | x | 0 | 0 | 0 | 0 | 0 | 1 | 1 | 0 | 0 | 0 | 0 | 0 | 1 | 0 | 0 |
| 99 | 63 | x | 0 | 0 | 0 | 0 | 0 | 1 | 1 | 0 | 0 | 0 | 0 | 1 | 0 | 0 | 0 |
| 100 | 64 | x | 0 | 0 | 0 | 0 | 0 | 1 | 1 | 0 | 0 | 0 | 1 | 0 | 0 | 0 | 0 |
| 101 | 65 | x | 0 | 0 | 0 | 0 | 0 | 1 | 1 | 0 | 0 | 1 | 0 | 0 | 0 | 0 | 0 |
| 102 | 66 | x | 0 | 0 | 0 | 0 | 0 | 1 | 1 | 0 | 1 | 0 | 0 | 0 | 0 | 0 | 0 |
| 103 | 67 | x | 0 | 0 | 0 | 0 | 0 | 1 | 1 | 1 | 0 | 0 | 0 | 0 | 0 | 0 | 0 |
| 104 | 68 | x | 0 | 0 | 0 | 0 | 1 | 0 | 0 | 0 | 0 | 0 | 0 | 0 | 0 | 1 | 1 |
| 105 | 69 | x | 0 | 0 | 0 | 0 | 1 | 0 | 0 | 0 | 0 | 0 | 0 | 0 | 1 | 0 | 1 |
| 106 | 6A | x | 0 | 0 | 0 | 0 | 1 | 0 | 0 | 0 | 0 | 0 | 0 | 0 | 1 | 1 | 0 |
| 107 | 6B | x | 0 | 0 | 0 | 0 | 1 | 0 | 0 | 0 | 0 | 0 | 0 | 1 | 0 | 0 | 1 |
| 108 | 6C | x | 0 | 0 | 0 | 0 | 1 | 0 | 0 | 0 | 0 | 0 | 0 | 1 | 0 | 1 | 0 |
| 109 | 6D | x | 0 | 0 | 0 | 0 | 1 | 0 | 0 | 0 | 0 | 0 | 0 | 1 | 1 | 0 | 0 |
| 110 | 6E | x | 0 | 0 | 0 | 0 | 1 | 0 | 0 | 0 | 0 | 0 | 1 | 0 | 0 | 0 | 1 |
| 111 | 6F | x | 0 | 0 | 0 | 0 | 1 | 0 | 0 | 0 | 0 | 0 | 1 | 0 | 0 | 1 | 0 |

FIG.31

| BEFORE MODULATION | | AFTER MODULATION | | | | | | | | | | | | | | | |
|---|---|---|---|---|---|---|---|---|---|---|---|---|---|---|---|---|---|
| DEC | HEX | Pf | Pe | Pd | Pc | Pb | Pa | P9 | P8 | P7 | P6 | P5 | P4 | P3 | P2 | P1 | P0 |
| 112 | 70 | x | 0 | 0 | 0 | 0 | 1 | 0 | 0 | 0 | 0 | 0 | 1 | 0 | 1 | 0 | 0 |
| 113 | 71 | x | 0 | 0 | 0 | 0 | 1 | 0 | 0 | 0 | 0 | 0 | 1 | 1 | 0 | 0 | 0 |
| 114 | 72 | x | 0 | 0 | 0 | 0 | 1 | 0 | 0 | 0 | 0 | 1 | 0 | 0 | 0 | 1 | 0 |
| 115 | 73 | x | 0 | 0 | 0 | 0 | 1 | 0 | 0 | 0 | 0 | 1 | 0 | 0 | 1 | 0 | 0 |
| 116 | 74 | x | 0 | 0 | 0 | 0 | 1 | 0 | 0 | 0 | 0 | 1 | 0 | 1 | 0 | 0 | 0 |
| 117 | 75 | x | 0 | 0 | 0 | 0 | 1 | 0 | 0 | 0 | 0 | 1 | 1 | 0 | 0 | 0 | 0 |
| 118 | 76 | x | 0 | 0 | 0 | 0 | 1 | 0 | 0 | 0 | 1 | 0 | 0 | 0 | 0 | 0 | 1 |
| 119 | 77 | x | 0 | 0 | 0 | 0 | 1 | 0 | 0 | 0 | 1 | 0 | 0 | 0 | 0 | 1 | 0 |
| 120 | 78 | x | 0 | 0 | 0 | 0 | 1 | 0 | 0 | 0 | 1 | 0 | 0 | 1 | 0 | 0 | 0 |
| 121 | 79 | x | 0 | 0 | 0 | 0 | 1 | 0 | 0 | 0 | 1 | 0 | 1 | 0 | 0 | 0 | 0 |
| 122 | 7A | x | 0 | 0 | 0 | 0 | 1 | 0 | 0 | 0 | 1 | 1 | 0 | 0 | 0 | 0 | 0 |
| 123 | 7B | x | 0 | 0 | 0 | 0 | 1 | 0 | 0 | 1 | 0 | 0 | 0 | 0 | 0 | 0 | 1 |
| 124 | 7C | x | 0 | 0 | 0 | 0 | 1 | 0 | 0 | 1 | 0 | 0 | 0 | 0 | 0 | 1 | 0 |
| 125 | 7D | x | 0 | 0 | 0 | 0 | 1 | 0 | 0 | 1 | 0 | 0 | 0 | 0 | 1 | 0 | 0 |
| 126 | 7E | x | 0 | 0 | 0 | 0 | 1 | 0 | 0 | 1 | 0 | 0 | 0 | 1 | 0 | 0 | 0 |
| 127 | 7F | x | 0 | 0 | 0 | 0 | 1 | 0 | 0 | 1 | 0 | 0 | 1 | 0 | 0 | 0 | 0 |
| 128 | 80 | x | 0 | 0 | 0 | 0 | 1 | 0 | 0 | 1 | 0 | 1 | 0 | 0 | 0 | 0 | 0 |
| 129 | 81 | x | 0 | 0 | 0 | 0 | 1 | 0 | 0 | 1 | 1 | 0 | 0 | 0 | 0 | 0 | 0 |
| 130 | 82 | x | 0 | 0 | 0 | 0 | 1 | 0 | 1 | 0 | 0 | 0 | 0 | 0 | 0 | 0 | 1 |
| 131 | 83 | x | 0 | 0 | 0 | 0 | 1 | 0 | 1 | 0 | 0 | 0 | 0 | 0 | 0 | 1 | 0 |
| 132 | 84 | x | 0 | 0 | 0 | 0 | 1 | 0 | 1 | 0 | 0 | 0 | 0 | 0 | 1 | 0 | 0 |
| 133 | 85 | x | 0 | 0 | 0 | 0 | 1 | 0 | 1 | 0 | 0 | 0 | 0 | 1 | 0 | 0 | 0 |
| 134 | 86 | x | 0 | 0 | 0 | 0 | 1 | 0 | 1 | 0 | 0 | 0 | 1 | 0 | 0 | 0 | 0 |
| 135 | 87 | x | 0 | 0 | 0 | 0 | 1 | 0 | 1 | 0 | 0 | 1 | 0 | 0 | 0 | 0 | 0 |
| 136 | 88 | x | 0 | 0 | 0 | 0 | 1 | 0 | 1 | 0 | 1 | 0 | 0 | 0 | 0 | 0 | 0 |
| 137 | 89 | x | 0 | 0 | 0 | 0 | 1 | 0 | 1 | 1 | 0 | 0 | 0 | 0 | 0 | 0 | 0 |
| 138 | 8A | x | 0 | 0 | 0 | 0 | 1 | 1 | 0 | 0 | 0 | 0 | 0 | 0 | 0 | 0 | 1 |
| 139 | 8B | x | 0 | 0 | 0 | 0 | 1 | 1 | 0 | 0 | 0 | 0 | 0 | 0 | 0 | 1 | 0 |
| 140 | 8C | x | 0 | 0 | 0 | 0 | 1 | 1 | 0 | 0 | 0 | 0 | 0 | 0 | 1 | 0 | 0 |
| 141 | 8D | x | 0 | 0 | 0 | 0 | 1 | 1 | 0 | 0 | 0 | 0 | 0 | 1 | 0 | 0 | 0 |
| 142 | 8E | x | 0 | 0 | 0 | 0 | 1 | 1 | 0 | 0 | 0 | 0 | 1 | 0 | 0 | 0 | 0 |
| 143 | 8F | x | 0 | 0 | 0 | 0 | 1 | 1 | 0 | 0 | 0 | 1 | 0 | 0 | 0 | 0 | 0 |
| 144 | 90 | x | 0 | 0 | 0 | 0 | 1 | 1 | 0 | 0 | 1 | 0 | 0 | 0 | 0 | 0 | 0 |
| 145 | 91 | x | 0 | 0 | 0 | 0 | 1 | 1 | 0 | 1 | 0 | 0 | 0 | 0 | 0 | 0 | 0 |
| 146 | 92 | x | 0 | 0 | 1 | 0 | 0 | 0 | 0 | 0 | 0 | 0 | 0 | 0 | 0 | 1 | 1 |
| 147 | 93 | x | 0 | 0 | 1 | 0 | 0 | 0 | 0 | 0 | 0 | 0 | 0 | 0 | 1 | 0 | 1 |

FIG.32

| BEFORE MODULATION | | AFTER MODULATION | | | | | | | | | | | | | | | |
|---|---|---|---|---|---|---|---|---|---|---|---|---|---|---|---|---|---|
| DEC | HEX | Pf | Pe | Pd | Pc | Pb | Pa | P9 | P8 | P7 | P6 | P5 | P4 | P3 | P2 | P1 | P0 |
| 148 | 94 | x | 0 | 0 | 1 | 0 | 0 | 0 | 0 | 0 | 0 | 0 | 0 | 0 | 1 | 1 | 0 |
| 149 | 95 | x | 0 | 0 | 1 | 0 | 0 | 0 | 0 | 0 | 0 | 0 | 0 | 1 | 0 | 0 | 1 |
| 150 | 96 | x | 0 | 0 | 1 | 0 | 0 | 0 | 0 | 0 | 0 | 0 | 0 | 1 | 0 | 1 | 0 |
| 151 | 97 | x | 0 | 0 | 1 | 0 | 0 | 0 | 0 | 0 | 0 | 0 | 0 | 1 | 1 | 0 | 0 |
| 152 | 98 | x | 0 | 0 | 1 | 0 | 0 | 0 | 0 | 0 | 0 | 0 | 1 | 0 | 0 | 1 | 0 |
| 153 | 99 | x | 0 | 0 | 1 | 0 | 0 | 0 | 0 | 0 | 0 | 0 | 1 | 0 | 1 | 0 | 0 |
| 154 | 9A | x | 0 | 0 | 1 | 0 | 0 | 0 | 0 | 0 | 0 | 0 | 1 | 1 | 0 | 0 | 0 |
| 155 | 9B | x | 0 | 0 | 1 | 0 | 0 | 0 | 0 | 0 | 0 | 1 | 0 | 0 | 0 | 0 | 1 |
| 156 | 9C | x | 0 | 0 | 1 | 0 | 0 | 0 | 0 | 0 | 0 | 1 | 0 | 0 | 0 | 1 | 0 |
| 157 | 9D | x | 0 | 0 | 1 | 0 | 0 | 0 | 0 | 0 | 0 | 1 | 0 | 0 | 1 | 0 | 0 |
| 158 | 9E | x | 0 | 0 | 1 | 0 | 0 | 0 | 0 | 0 | 0 | 1 | 0 | 1 | 0 | 0 | 0 |
| 159 | 9F | x | 0 | 0 | 1 | 0 | 0 | 0 | 0 | 0 | 0 | 1 | 1 | 0 | 0 | 0 | 0 |
| 160 | A0 | x | 0 | 0 | 1 | 0 | 0 | 0 | 0 | 0 | 1 | 0 | 0 | 0 | 0 | 0 | 1 |
| 161 | A1 | x | 0 | 0 | 1 | 0 | 0 | 0 | 0 | 0 | 1 | 0 | 0 | 0 | 0 | 1 | 0 |
| 162 | A2 | x | 0 | 0 | 1 | 0 | 0 | 0 | 0 | 0 | 1 | 0 | 0 | 0 | 1 | 0 | 0 |
| 163 | A3 | x | 0 | 0 | 1 | 0 | 0 | 0 | 0 | 0 | 1 | 0 | 1 | 0 | 0 | 0 | 0 |
| 164 | A4 | x | 0 | 0 | 1 | 0 | 0 | 0 | 0 | 0 | 1 | 1 | 0 | 0 | 0 | 0 | 0 |
| 165 | A5 | x | 0 | 0 | 1 | 0 | 0 | 0 | 0 | 1 | 0 | 0 | 0 | 0 | 0 | 0 | 1 |
| 166 | A6 | x | 0 | 0 | 1 | 0 | 0 | 0 | 0 | 1 | 0 | 0 | 0 | 0 | 0 | 1 | 0 |
| 167 | A7 | x | 0 | 0 | 1 | 0 | 0 | 0 | 0 | 1 | 0 | 0 | 0 | 0 | 1 | 0 | 0 |
| 168 | A8 | x | 0 | 0 | 1 | 0 | 0 | 0 | 0 | 1 | 0 | 0 | 0 | 1 | 0 | 0 | 0 |
| 169 | A9 | x | 0 | 0 | 1 | 0 | 0 | 0 | 0 | 1 | 0 | 0 | 1 | 0 | 0 | 0 | 0 |
| 170 | AA | x | 0 | 0 | 1 | 0 | 0 | 0 | 0 | 1 | 0 | 1 | 0 | 0 | 0 | 0 | 0 |
| 171 | AB | x | 0 | 0 | 1 | 0 | 0 | 0 | 0 | 1 | 1 | 0 | 0 | 0 | 0 | 0 | 0 |
| 172 | AC | x | 0 | 0 | 1 | 0 | 0 | 0 | 1 | 0 | 0 | 0 | 0 | 0 | 0 | 1 | 0 |
| 173 | AD | x | 0 | 0 | 1 | 0 | 0 | 0 | 1 | 0 | 0 | 0 | 0 | 0 | 1 | 0 | 0 |
| 174 | AE | x | 0 | 0 | 1 | 0 | 0 | 0 | 1 | 0 | 0 | 0 | 0 | 1 | 0 | 0 | 0 |
| 175 | AF | x | 0 | 0 | 1 | 0 | 0 | 0 | 1 | 0 | 0 | 1 | 0 | 0 | 0 | 0 | 0 |
| 176 | B0 | x | 0 | 0 | 1 | 0 | 0 | 0 | 1 | 0 | 1 | 0 | 0 | 0 | 0 | 0 | 0 |
| 177 | B1 | x | 0 | 0 | 1 | 0 | 0 | 0 | 1 | 1 | 0 | 0 | 0 | 0 | 0 | 0 | 0 |
| 178 | B2 | x | 0 | 0 | 1 | 0 | 0 | 1 | 0 | 0 | 0 | 0 | 0 | 0 | 0 | 0 | 1 |
| 179 | B3 | x | 0 | 0 | 1 | 0 | 0 | 1 | 0 | 0 | 0 | 0 | 0 | 0 | 0 | 1 | 0 |
| 180 | B4 | x | 0 | 0 | 1 | 0 | 0 | 1 | 0 | 0 | 0 | 0 | 0 | 0 | 1 | 0 | 0 |
| 181 | B5 | x | 0 | 0 | 1 | 0 | 0 | 1 | 0 | 0 | 0 | 0 | 1 | 0 | 0 | 0 | 0 |
| 182 | B6 | x | 0 | 0 | 1 | 0 | 0 | 1 | 0 | 0 | 1 | 0 | 0 | 0 | 0 | 0 | 0 |
| 183 | B7 | x | 0 | 0 | 1 | 0 | 0 | 1 | 0 | 1 | 0 | 0 | 0 | 0 | 0 | 0 | 0 |

FIG. 33

| BEFORE MODULATION | | AFTER MODULATION | | | | | | | | | | | | | | | |
|---|---|---|---|---|---|---|---|---|---|---|---|---|---|---|---|---|---|
| DEC | HEX | Pf | Pe | Pd | Pc | Pb | Pa | P9 | P8 | P7 | P6 | P5 | P4 | P3 | P2 | P1 | P0 |
| 184 | B8 | x | 0 | 0 | 1 | 0 | 0 | 1 | 1 | 0 | 0 | 0 | 0 | 0 | 0 | 0 | 0 |
| 185 | B9 | x | 0 | 0 | 1 | 0 | 1 | 0 | 0 | 0 | 0 | 0 | 0 | 0 | 0 | 0 | 1 |
| 186 | BA | x | 0 | 0 | 1 | 0 | 1 | 0 | 0 | 0 | 0 | 0 | 0 | 0 | 0 | 1 | 0 |
| 187 | BB | x | 0 | 0 | 1 | 0 | 1 | 0 | 0 | 0 | 0 | 0 | 0 | 0 | 1 | 0 | 0 |
| 188 | BC | x | 0 | 0 | 1 | 0 | 1 | 0 | 0 | 0 | 0 | 0 | 0 | 1 | 0 | 0 | 0 |
| 189 | BD | x | 0 | 0 | 1 | 0 | 1 | 0 | 0 | 0 | 0 | 0 | 1 | 0 | 0 | 0 | 0 |
| 190 | BE | x | 0 | 0 | 1 | 0 | 1 | 0 | 0 | 0 | 0 | 1 | 0 | 0 | 0 | 0 | 0 |
| 191 | BF | x | 0 | 0 | 1 | 0 | 1 | 0 | 0 | 0 | 1 | 0 | 0 | 0 | 0 | 0 | 0 |
| 192 | C0 | x | 0 | 0 | 1 | 0 | 1 | 0 | 0 | 1 | 0 | 0 | 0 | 0 | 0 | 0 | 0 |
| 193 | C1 | x | 0 | 0 | 1 | 0 | 1 | 0 | 1 | 0 | 0 | 0 | 0 | 0 | 0 | 0 | 0 |
| 194 | C2 | x | 0 | 0 | 1 | 0 | 1 | 1 | 0 | 0 | 0 | 0 | 0 | 0 | 0 | 0 | 0 |
| 195 | C3 | x | 0 | 1 | 0 | 0 | 0 | 0 | 0 | 0 | 0 | 0 | 0 | 0 | 0 | 1 | 1 |
| 196 | C4 | x | 0 | 1 | 0 | 0 | 0 | 0 | 0 | 0 | 0 | 0 | 0 | 0 | 1 | 0 | 1 |
| 197 | C5 | x | 0 | 1 | 0 | 0 | 0 | 0 | 0 | 0 | 0 | 0 | 0 | 0 | 1 | 1 | 0 |
| 198 | C6 | x | 0 | 1 | 0 | 0 | 0 | 0 | 0 | 0 | 0 | 0 | 0 | 1 | 0 | 0 | 1 |
| 199 | C7 | x | 0 | 1 | 0 | 0 | 0 | 0 | 0 | 0 | 0 | 0 | 0 | 1 | 0 | 1 | 0 |
| 200 | C8 | x | 0 | 1 | 0 | 0 | 0 | 0 | 0 | 0 | 0 | 0 | 0 | 1 | 1 | 0 | 0 |
| 201 | C9 | x | 0 | 1 | 0 | 0 | 0 | 0 | 0 | 0 | 0 | 0 | 1 | 0 | 0 | 0 | 1 |
| 202 | CA | x | 0 | 1 | 0 | 0 | 0 | 0 | 0 | 0 | 0 | 0 | 1 | 0 | 0 | 1 | 0 |
| 203 | CB | x | 0 | 1 | 0 | 0 | 0 | 0 | 0 | 0 | 0 | 0 | 1 | 0 | 1 | 0 | 0 |
| 204 | CC | x | 0 | 1 | 0 | 0 | 0 | 0 | 0 | 0 | 0 | 0 | 1 | 1 | 0 | 0 | 0 |
| 205 | CD | x | 0 | 1 | 0 | 0 | 0 | 0 | 0 | 0 | 0 | 1 | 0 | 0 | 0 | 0 | 1 |
| 206 | CE | x | 0 | 1 | 0 | 0 | 0 | 0 | 0 | 0 | 0 | 1 | 0 | 0 | 1 | 0 | 0 |
| 207 | CF | x | 0 | 1 | 0 | 0 | 0 | 0 | 0 | 0 | 0 | 1 | 0 | 1 | 0 | 0 | 0 |
| 208 | D0 | x | 0 | 1 | 0 | 0 | 0 | 0 | 0 | 0 | 0 | 1 | 1 | 0 | 0 | 0 | 0 |
| 209 | D1 | x | 0 | 1 | 0 | 0 | 0 | 0 | 0 | 0 | 1 | 0 | 0 | 0 | 0 | 0 | 1 |
| 210 | D2 | x | 0 | 1 | 0 | 0 | 0 | 0 | 0 | 0 | 1 | 0 | 0 | 0 | 0 | 1 | 0 |
| 211 | D3 | x | 0 | 1 | 0 | 0 | 0 | 0 | 0 | 0 | 1 | 0 | 0 | 0 | 1 | 0 | 0 |
| 212 | D4 | x | 0 | 1 | 0 | 0 | 0 | 0 | 0 | 0 | 1 | 0 | 0 | 1 | 0 | 0 | 0 |
| 213 | D5 | x | 0 | 1 | 0 | 0 | 0 | 0 | 0 | 0 | 1 | 0 | 1 | 0 | 0 | 0 | 0 |
| 214 | D6 | x | 0 | 1 | 0 | 0 | 0 | 0 | 0 | 0 | 1 | 1 | 0 | 0 | 0 | 0 | 0 |
| 215 | D7 | x | 0 | 1 | 0 | 0 | 0 | 0 | 0 | 1 | 0 | 0 | 0 | 0 | 0 | 0 | 1 |
| 216 | D8 | x | 0 | 1 | 0 | 0 | 0 | 0 | 0 | 1 | 0 | 0 | 0 | 0 | 0 | 1 | 0 |
| 217 | D9 | x | 0 | 1 | 0 | 0 | 0 | 0 | 0 | 1 | 0 | 0 | 0 | 0 | 1 | 0 | 0 |
| 218 | DA | x | 0 | 1 | 0 | 0 | 0 | 0 | 0 | 1 | 0 | 0 | 0 | 1 | 0 | 0 | 0 |
| 219 | DB | x | 0 | 1 | 0 | 0 | 0 | 0 | 0 | 1 | 0 | 0 | 1 | 0 | 0 | 0 | 0 |

FIG. 34

| BEFORE MODULATION | | AFTER MODULATION | | | | | | | | | | | | | | |
|---|---|---|---|---|---|---|---|---|---|---|---|---|---|---|---|---|
| DEC | HEX | Pf | Pe | Pd | Pc | Pb | Pa | P9 | P8 | P7 | P6 | P5 | P4 | P3 | P2 | P1 | P0 |
| 220 | DC | x | 0 | 1 | 0 | 0 | 0 | 0 | 0 | 1 | 0 | 1 | 0 | 0 | 0 | 0 | 0 |
| 221 | DD | x | 0 | 1 | 0 | 0 | 0 | 0 | 0 | 1 | 1 | 0 | 0 | 0 | 0 | 0 | 0 |
| 222 | DE | x | 0 | 1 | 0 | 0 | 0 | 0 | 1 | 0 | 0 | 0 | 0 | 0 | 0 | 0 | 1 |
| 223 | DF | x | 0 | 1 | 0 | 0 | 0 | 0 | 1 | 0 | 0 | 0 | 0 | 0 | 0 | 1 | 0 |
| 224 | E0 | x | 0 | 1 | 0 | 0 | 0 | 0 | 1 | 0 | 0 | 0 | 0 | 0 | 1 | 0 | 0 |
| 225 | E1 | x | 0 | 1 | 0 | 0 | 0 | 0 | 1 | 0 | 0 | 0 | 0 | 1 | 0 | 0 | 0 |
| 226 | E2 | x | 0 | 1 | 0 | 0 | 0 | 0 | 1 | 0 | 0 | 0 | 1 | 0 | 0 | 0 | 0 |
| 227 | E3 | x | 0 | 1 | 0 | 0 | 0 | 0 | 1 | 0 | 0 | 1 | 0 | 0 | 0 | 0 | 0 |
| 228 | E4 | x | 0 | 1 | 0 | 0 | 0 | 0 | 1 | 0 | 1 | 0 | 0 | 0 | 0 | 0 | 0 |
| 229 | E5 | x | 0 | 1 | 0 | 0 | 0 | 0 | 1 | 1 | 0 | 0 | 0 | 0 | 0 | 0 | 0 |
| 230 | E6 | x | 0 | 1 | 0 | 0 | 0 | 1 | 0 | 0 | 0 | 0 | 0 | 0 | 0 | 0 | 1 |
| 231 | E7 | x | 0 | 1 | 0 | 0 | 0 | 1 | 0 | 0 | 0 | 0 | 0 | 0 | 1 | 0 | 0 |
| 232 | E8 | x | 0 | 1 | 0 | 0 | 0 | 1 | 0 | 0 | 0 | 0 | 0 | 1 | 0 | 0 | 0 |
| 233 | E9 | x | 0 | 1 | 0 | 0 | 0 | 1 | 0 | 0 | 0 | 0 | 1 | 0 | 0 | 0 | 0 |
| 234 | EA | x | 0 | 1 | 0 | 0 | 0 | 1 | 0 | 0 | 1 | 0 | 0 | 0 | 0 | 0 | 0 |
| 235 | EB | x | 0 | 1 | 0 | 0 | 0 | 1 | 0 | 1 | 0 | 0 | 0 | 0 | 0 | 0 | 0 |
| 236 | EC | x | 0 | 1 | 0 | 0 | 0 | 1 | 1 | 0 | 0 | 0 | 0 | 0 | 0 | 0 | 0 |
| 237 | ED | x | 0 | 1 | 0 | 0 | 1 | 0 | 0 | 0 | 0 | 0 | 0 | 0 | 0 | 0 | 1 |
| 238 | EE | x | 0 | 1 | 0 | 0 | 1 | 0 | 0 | 0 | 0 | 0 | 0 | 0 | 0 | 1 | 0 |
| 239 | EF | x | 0 | 1 | 0 | 0 | 1 | 0 | 0 | 0 | 0 | 0 | 0 | 0 | 1 | 0 | 0 |
| 240 | F0 | x | 0 | 1 | 0 | 0 | 1 | 0 | 0 | 0 | 0 | 0 | 0 | 1 | 0 | 0 | 0 |
| 241 | F1 | x | 0 | 1 | 0 | 0 | 1 | 0 | 0 | 0 | 0 | 0 | 1 | 0 | 0 | 0 | 0 |
| 242 | F2 | x | 0 | 1 | 0 | 0 | 1 | 0 | 0 | 0 | 0 | 1 | 0 | 0 | 0 | 0 | 0 |
| 243 | F3 | x | 0 | 1 | 0 | 0 | 1 | 0 | 0 | 0 | 1 | 0 | 0 | 0 | 0 | 0 | 0 |
| 244 | F4 | x | 0 | 1 | 0 | 0 | 1 | 0 | 1 | 0 | 0 | 0 | 0 | 0 | 0 | 0 | 0 |
| 245 | F5 | x | 0 | 1 | 0 | 0 | 1 | 1 | 0 | 0 | 0 | 0 | 0 | 0 | 0 | 0 | 0 |
| 246 | F6 | x | 0 | 1 | 1 | 0 | 0 | 0 | 0 | 0 | 0 | 0 | 0 | 0 | 0 | 0 | 1 |
| 247 | F7 | x | 0 | 1 | 1 | 0 | 0 | 0 | 0 | 0 | 0 | 0 | 0 | 0 | 0 | 1 | 0 |
| 248 | F8 | x | 0 | 1 | 1 | 0 | 0 | 0 | 0 | 0 | 0 | 0 | 0 | 0 | 1 | 0 | 0 |
| 249 | F9 | x | 0 | 1 | 1 | 0 | 0 | 0 | 0 | 0 | 0 | 0 | 0 | 1 | 0 | 0 | 0 |
| 250 | FA | x | 0 | 1 | 1 | 0 | 0 | 0 | 0 | 0 | 0 | 0 | 1 | 0 | 0 | 0 | 0 |
| 251 | FB | x | 0 | 1 | 1 | 0 | 0 | 0 | 0 | 0 | 0 | 1 | 0 | 0 | 0 | 0 | 0 |
| 252 | FC | x | 0 | 1 | 1 | 0 | 0 | 0 | 0 | 0 | 1 | 0 | 0 | 0 | 0 | 0 | 0 |
| 253 | FD | x | 0 | 1 | 1 | 0 | 0 | 0 | 0 | 1 | 0 | 0 | 0 | 0 | 0 | 0 | 0 |
| 254 | FE | x | 0 | 1 | 1 | 0 | 0 | 1 | 0 | 0 | 0 | 0 | 0 | 0 | 0 | 0 | 0 |
| 255 | FF | x | 0 | 1 | 1 | 0 | 1 | 0 | 0 | 0 | 0 | 0 | 0 | 0 | 0 | 0 | 0 |

FIG.35A  FIG.35B  FIG.35C  FIG.35D

Byte Data A | Byte Data B | Byte Data C | Byte Data D
D7|D6|D5|D4|D3|D2|D1|D0

↓ TWO-DIMENSIONAL MODULATION

FIG.35E  FIG.35F  FIG.35G  FIG.35H

↓ NO ROTATION / CLOCKWISE ROTATION BY 90° / ROTATION BY 180° / COUNTERCLOCKWISE ROTATION BY 90°

FIG.35I  FIG.35J  FIG.35K  FIG.35L

SYMBOL JOINING

FIG.35M

16 × 16 pixel

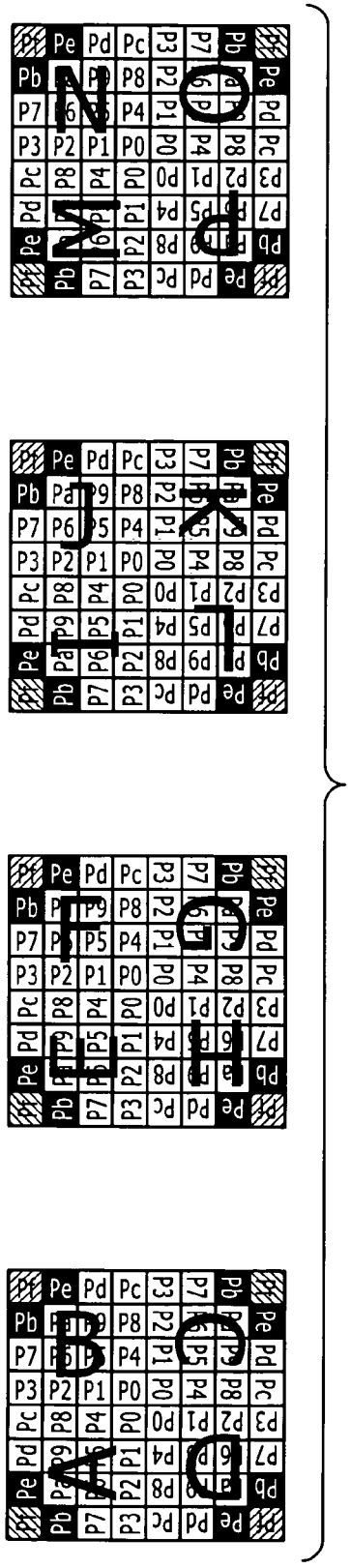
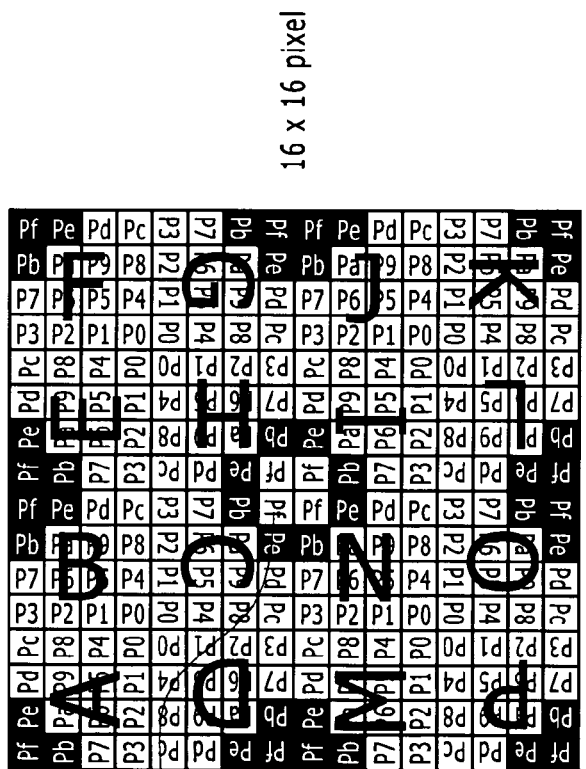
FIG. 36A  FIG. 36B  FIG. 36C  FIG. 36D
FIG. 36E

128 × 128 pixel
60 [Group-SS] + PAGE SEARCH SYMBOL
60 [Group-SS] = 16 × 60 = 960 [Symbols]

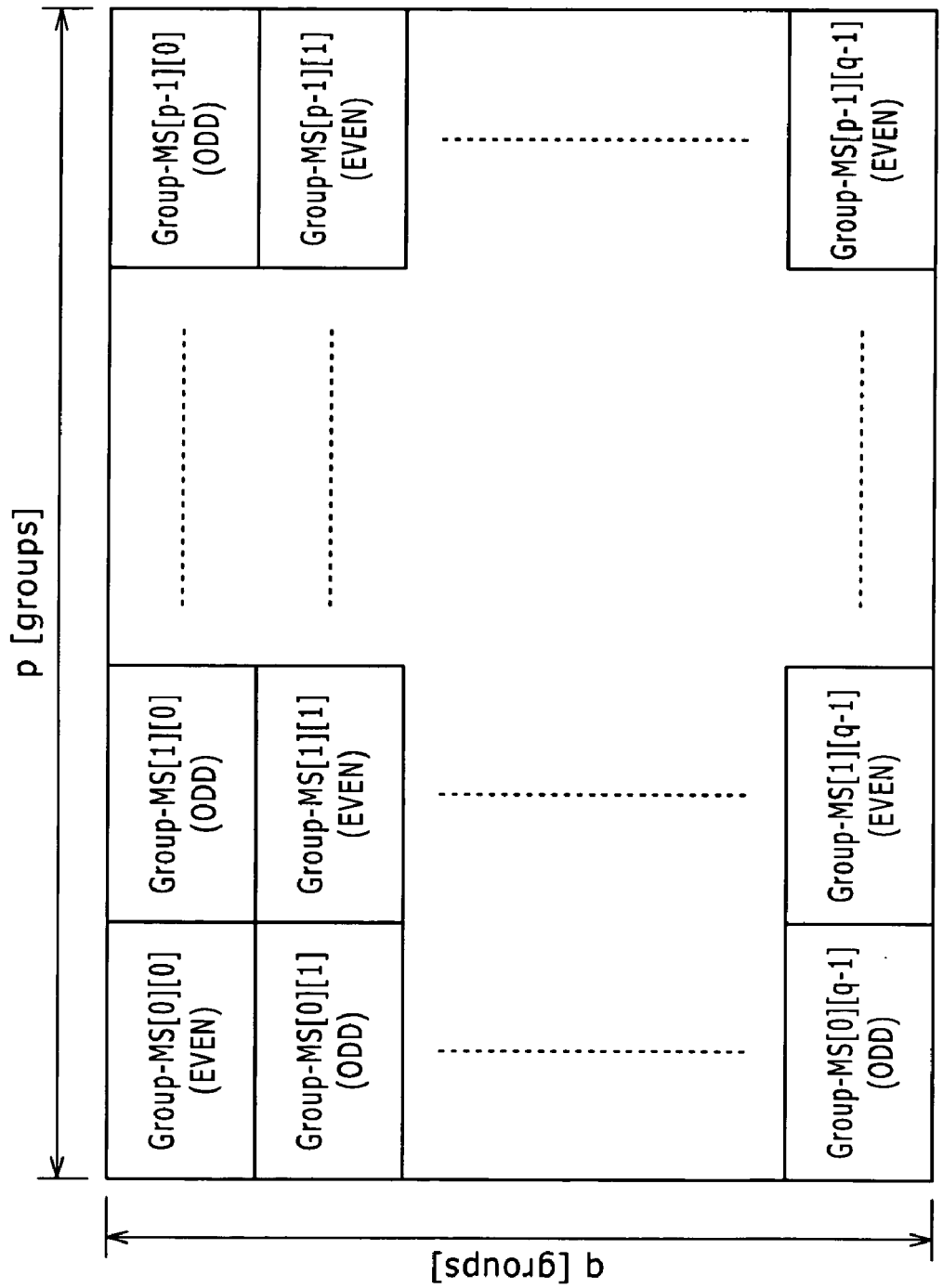

FIG.41  PID = LID = 0/Crosstalk Symbol Number = 0

PID = LID = 0/Crosstalk Symbol Number = 0

FIG. 43   PID = LID = 0/Crosstalk Symbol Number = 0

PID = LID = 0/Crosstalk Symbol Number = 0

Main Sync Symbol (ODD)

Main Sync Symbol (EVEN)

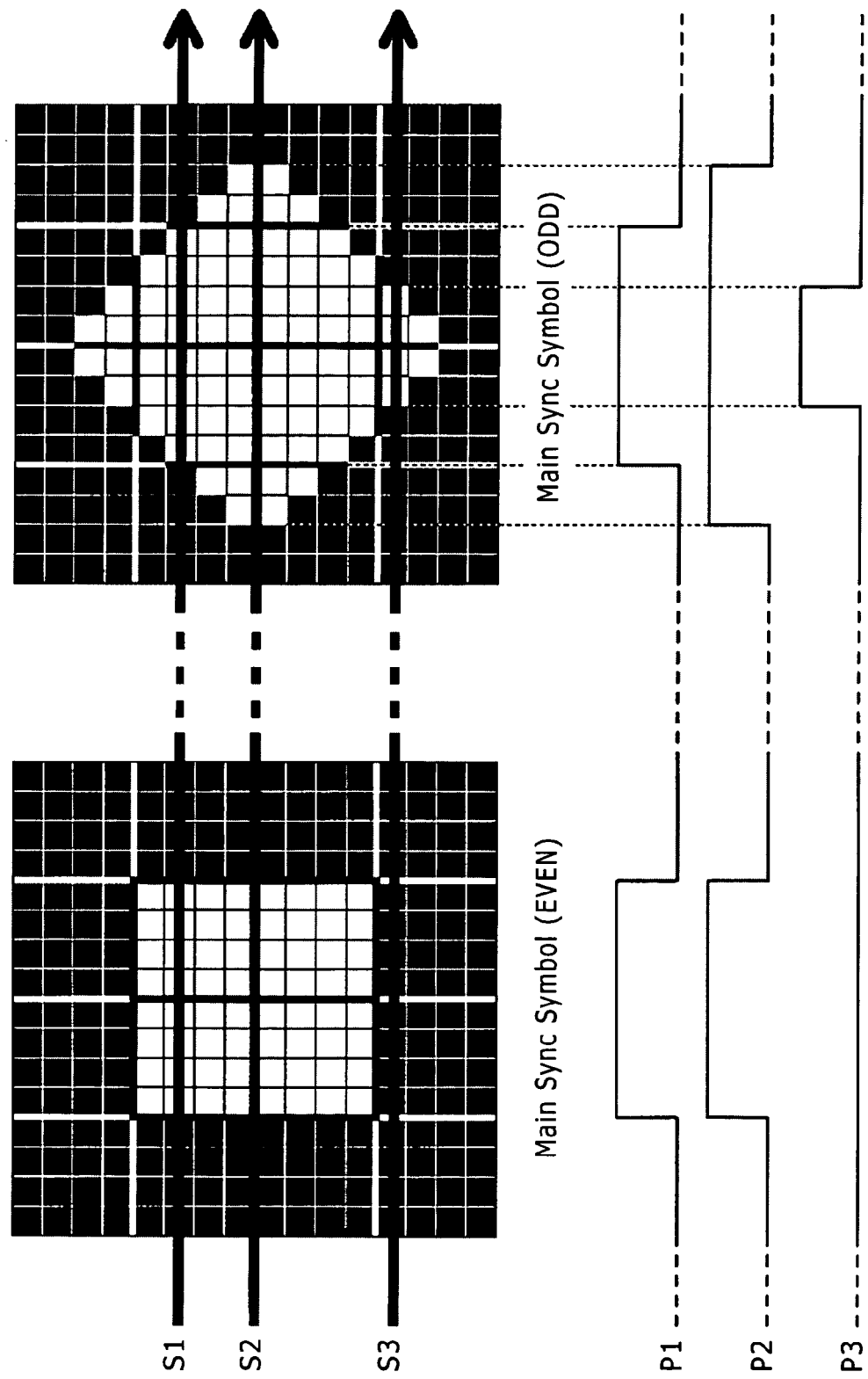

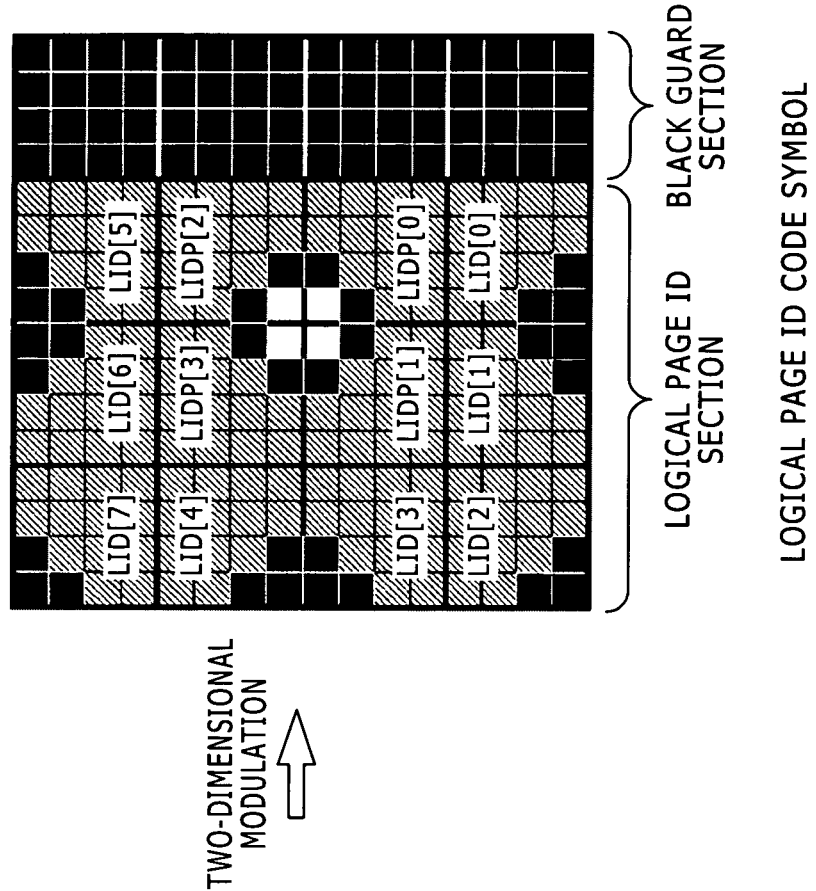
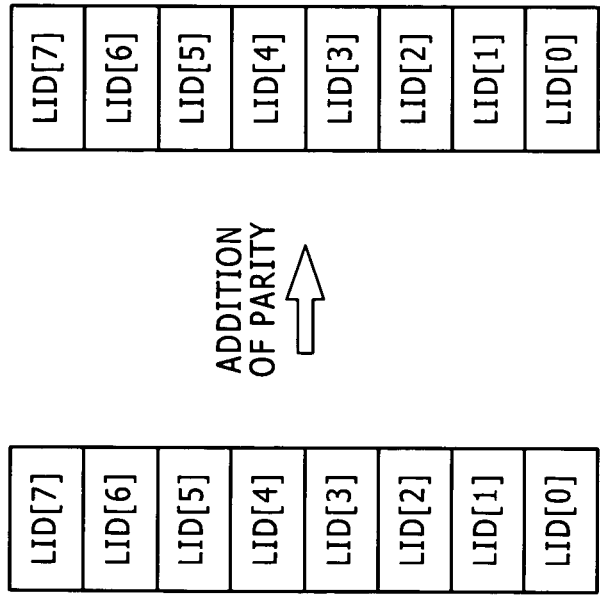

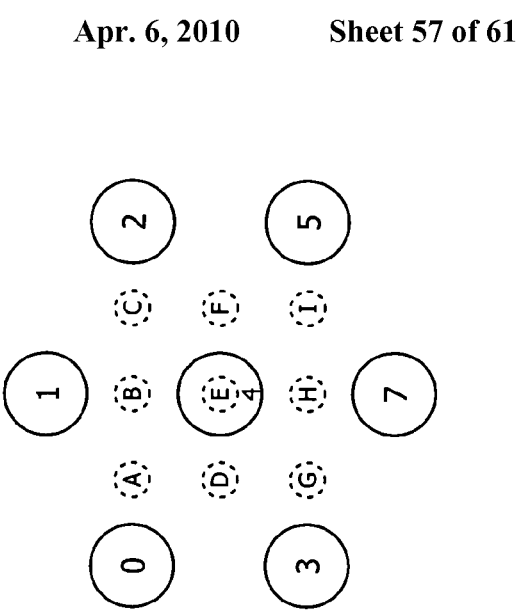
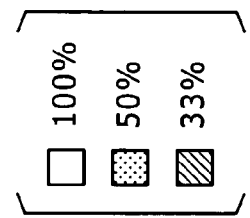
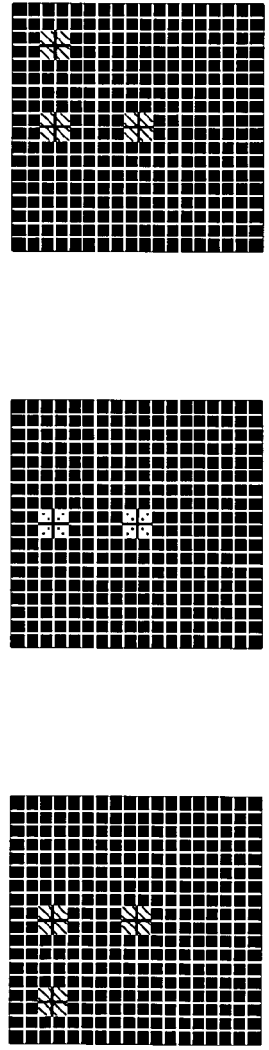
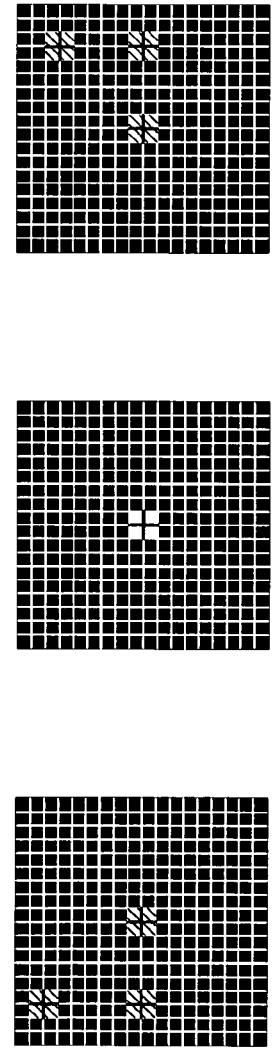
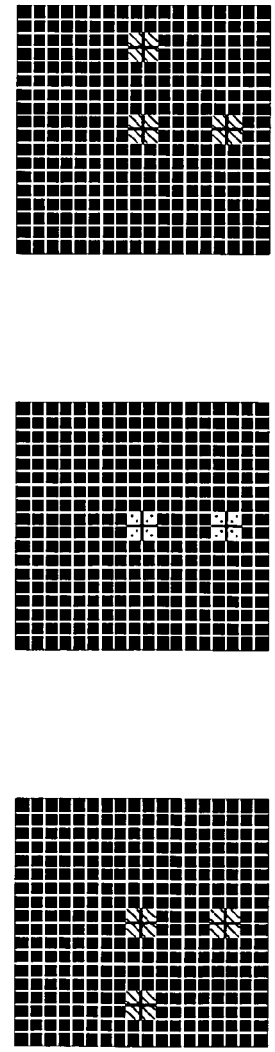

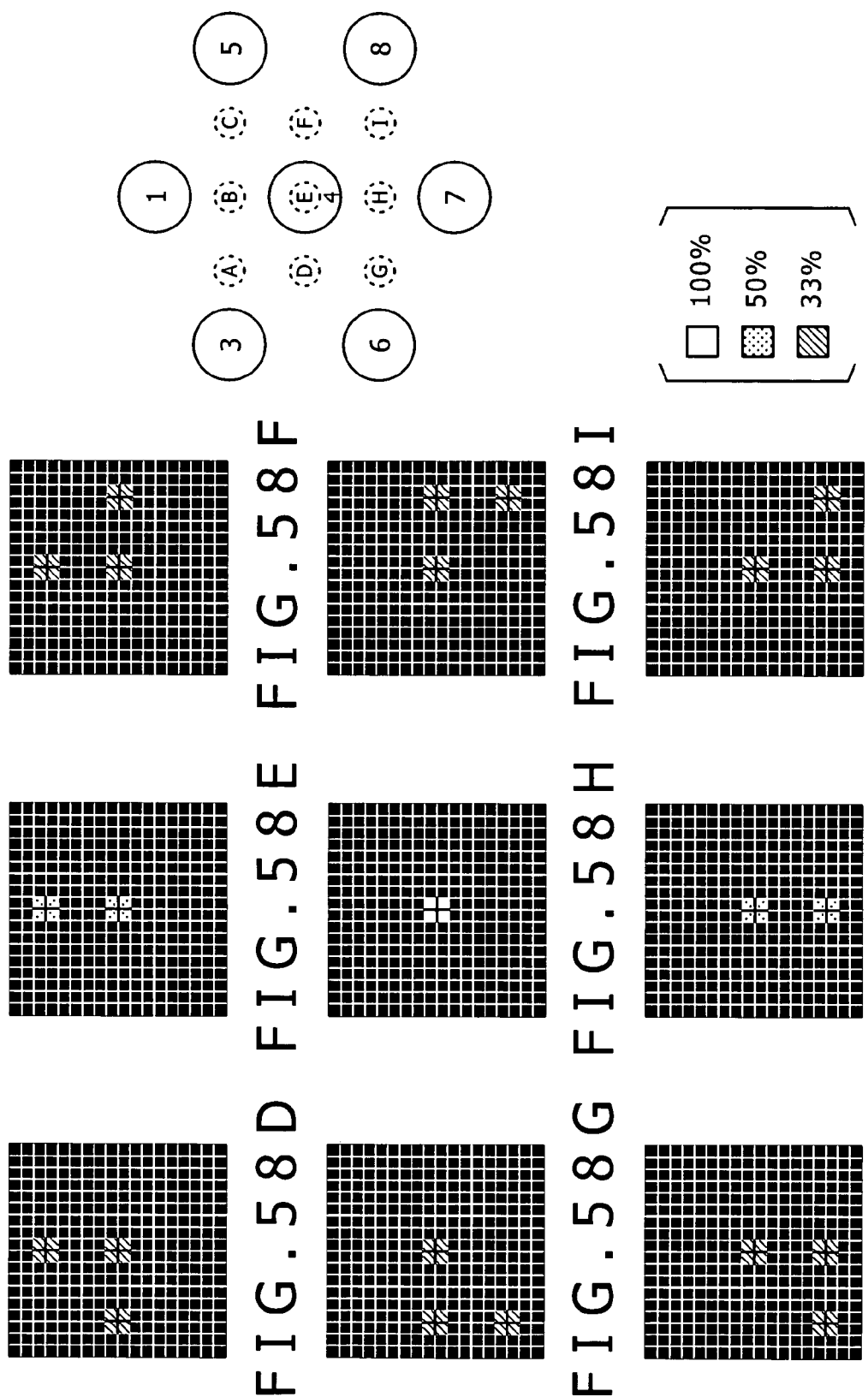

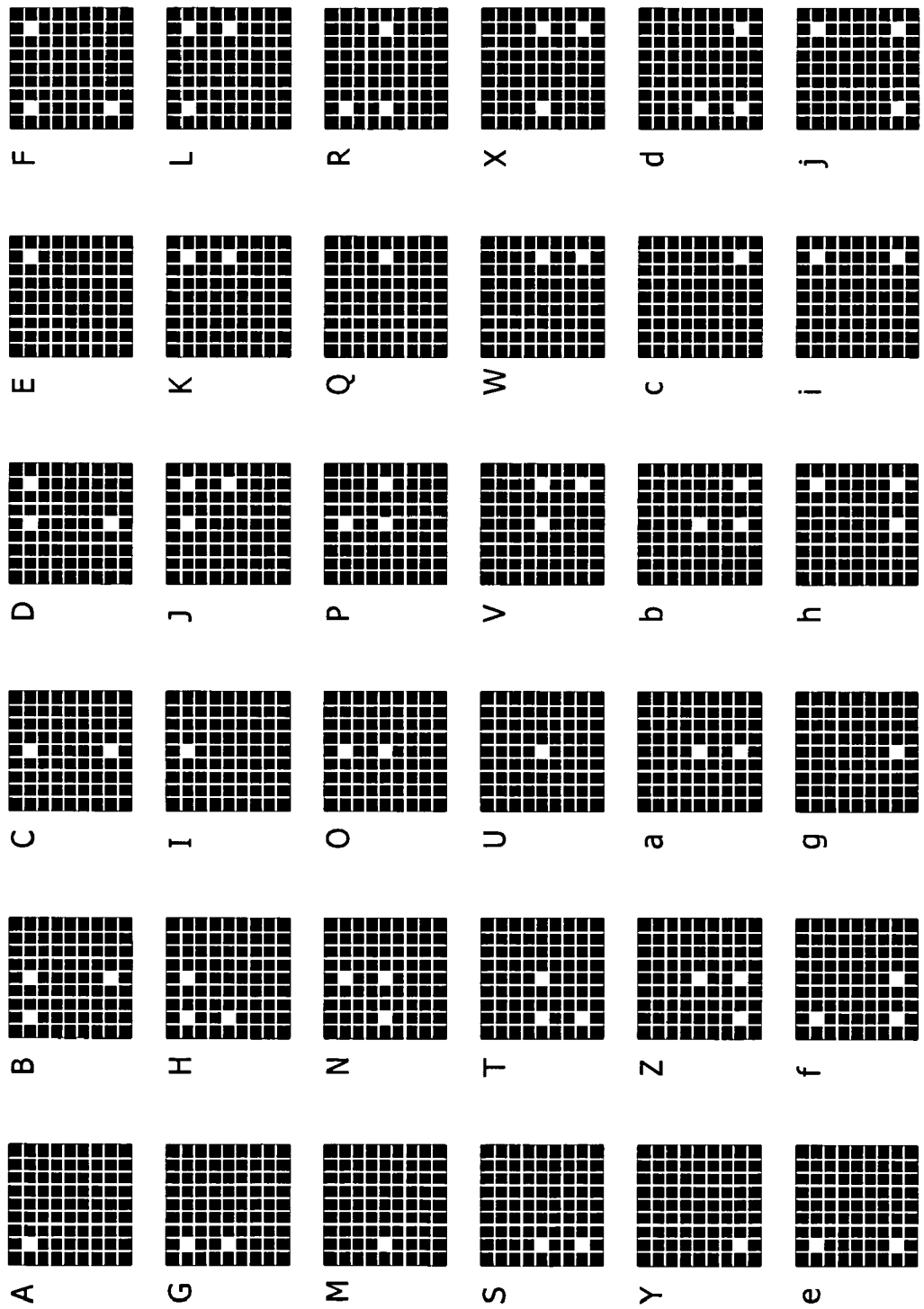

HOLOGRAM RECORDING APPARATUS, HOLOGRAM RECORDING METHOD, AND HOLOGRAM RECORDING MEDIUM

CROSS REFERENCES TO RELATED APPLICATIONS

The present invention contains subject matter related to Japanese Patent Application JP 2005-249084 filed in the Japanese Patent Office on Aug. 30, 2005, the entire contents of which being incorporated herein by reference.

BACKGROUND OF THE INVENTION

1. Field of the Invention

This invention relates to a hologram recording medium and a hologram recording apparatus and a hologram recording method by which sound information of voice, music or the like, image information of still pictures or moving pictures, or information of a text file or the like is recorded as an element hologram after it is two-dimensionally modulated.

2. Description of the Related Art

Referring to, for instance, to Japanese Patent No. 2833975, where information is recorded on a sheet-like recording medium, it typically assumes a one-dimensional code or a two-dimensional code represented by a bar code, a QR code, and a dot code. However, where information is recorded in a one- or two-dimensional code, the amount of information which can be recorded per unit area of a recording medium is as low as several tens to several kilobytes. This is because the recording medium has a physical limit to the recording resolution in variable-density printing of a mere image.

Also a hologram recording medium on which various data are recorded as interference fringes of object light and reference light is known as one of sheet-like recording media. Also it is known that the hologram recording medium allows recording of a very high density and hence of a very large amount of information. Therefore, the hologram recording medium is expected as a very useful storage medium of a large capacity suitable for storage of, for example, computer data and AV (Audio-Visual) content data such as audio data and video data.

In order to record data on a hologram recording medium, the data are converted into two-dimensional page data of an image. Then, the image data are displayed on a liquid crystal panel or the like, and light which passes through the liquid crystal panel is irradiated as object light on the hologram recording medium so as to make an image of the two-dimensional page data. In addition, reference light is irradiated in a predetermined angle to the hologram recording medium. Thereupon, interference fringes produced by the object light and the reference light are recorded as an element hologram in the form of dots or rectangles. In short, one element hologram is a record of one two-dimensional page data.

SUMMARY OF THE INVENTION

Incidentally, a hologram memory typically having a sheet-like shape is considered. Further, a system is considered that computer data, AV content data, or some other data are recorded on the hologram memory and a common user can use a reproduction apparatus as a hologram reader to acquire the data recorded on the hologram memory.

A hologram memory having a sheet-like shape is a recording medium that a large number of element holograms are recorded in a spread manner over a plane as the surface of the medium. A hologram reader is disposed in an opposing relationship to the surface of the recording medium such that it reads data recorded as the element holograms on the surface of the recording medium.

Where a hologram technique is applied, the amount of information which can be recorded per unit area can be increased remarkably when compared with ordinary printing. However, modulation methods into a one- or two-dimensional pattern which are popularly used for a bar code system or a QR (quick Response) code system are intended for information recording on ordinary two-dimensional prints. Meanwhile, application of such modulation methods to hologram recording has not been taken into consideration. Thus, setting of an appropriate synchronization pattern with action particularly upon reproduction taken into consideration is demanded.

Therefore, it is desirable to provide a synchronizing signal adding method suitable for recording and reproduction of information where a hologram recording medium is used. Particularly, it is desirable to provide a synchronizing signal adding method suitable where a large amount of information is recorded on a sheet-like medium by hologram printing.

According to an embodiment of the present invention, a recording apparatus for recording data as element holograms on a hologram recording medium includes two-dimensional modulation means, synchronization signal generation means, and physical page generation means. The two-dimensional modulation means is configured to convert the recording data into a two-dimensional code symbol for each predetermined data unit amount. The synchronization signal generation means is configured to generate a plurality of main synchronization symbols each from a two-dimensional pattern. The physical page generation means is configured to generate a plurality of group main syncs each from the two-dimensional code symbols obtained by the conversion by the two-dimensional modulation means and a main synchronization symbol selected in a predetermined order from the plurality of main synchronization symbols generated by the synchronization signal generation means. The physical page generation means also two-dimensionally arranges the generated group main syncs to generate a physical page.

According to another embodiment of the present invention, recording method records recording data as element holograms on a hologram recording medium. The recording method includes the steps of converting the recording data into a two-dimensional code symbol for each predetermined data unit amount, and generating a plurality of main synchronization symbols each from a two-dimensional pattern. The recording method further includes the steps of generating a plurality of group main syncs each from the two-dimensional code symbols and a main synchronization symbol selected in a predetermined order from the plurality of main synchronization symbols, and two-dimensionally arranging the generated group main syncs to generate a physical page.

According to a further embodiment of the present invention, hologram recording medium on which recording data are recorded as element holograms includes a recording data recording region and a synchronization signal recording region. The recording data recording region is configured to record the recording data converted into a two-dimensional code symbol for each predetermined data unit amount. The synchronization signal recording region is configured to record a main synchronization symbol for establishing synchronism for each predetermined amount of the two-dimensional code symbols.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 3A is a block diagram illustrating processes of a scrambled data page generator of the hologram recording system;

FIG. 3B is a block diagram illustrating processes of an inner page encoder of the hologram recording system;

FIG. 3C is a block diagram illustrating processes of an outer page encoder of the hologram recording system;

FIG. 3D is a block diagram illustrating processes of a hologram Unit Matrix generator of the hologram recording system;

FIG. 4 is a flow diagram illustrating the processes of the scrambled page data generator;

FIG. 5 is a schematic view illustrating input data;

FIG. 6 is a diagrammatic view illustrating a pre-processing page generation process;

FIG. 7 is a diagrammatic view illustrating a sector dividing process;

FIG. 8 is a diagrammatic view showing pre-processing sectors;

FIG. 9 is a diagrammatic view illustrating an EDC addition process;

FIG. 27 is a schematic view showing two-dimensional code symbols to be excepted;

FIGS. 28 to 34 are views showing a two-dimensional modulation table;

FIGS. 35A, 35B, 35C, and 35D are diagrammatic views illustrating byte data to be used for generating a group;

FIGS. 35E, 35F, 35G, and 35H are diagrammatic views illustrating the byte data after two-dimensional modulation;

FIG. 35I is a diagrammatic view illustrating the byte data where it is not rotated after the two-dimensional modulation;

FIG. 35J is a diagrammatic view illustrating the byte data where it is rotated by 90 degrees in the clockwise direction after the two-dimensional modulation;

FIG. 35K is a diagrammatic view illustrating the byte data where it is rotated by 180 degrees after the two-dimensional modulation;

FIG. 35L is a diagrammatic view illustrating the byte data where it is rotated by 90 degrees in the counterclockwise direction after the two-dimensional modulation;

FIG. 35M is a diagrammatic view illustrating symbol joining in generation of a group;

FIGS. 36A, 36B, 36C, and 36D are diagrammatic views illustrating first, second, third and fourth groups in generation of a group sub sync, respectively;

FIG. 36E is a diagrammatic view illustrating joining of the groups of FIGS. 36A to 36D in the generation of a group sub sync;

FIG. 39 is a diagrammatic view illustrating a physical page;

FIG. 47 is a schematic diagrammatic view illustrating the main synchronization symbols and a reproduction signal;

FIG. 48A is a diagrammatic view illustrating a logical page ID to be incorporated in a logical page ID code symbol;

FIG. 48B is a diagrammatic view illustrating a logical page ID code to be incorporated in the logical page ID code symbol to which an parity is added;

FIG. 48C is a schematic view showing a logical page ID code symbol;

FIG. 50A is a diagrammatic view showing a tetragonal lattice as an element hologram array;

FIG. 50B is a diagrammatic view showing an orthorhombic lattice as an element hologram array;

FIGS. 57A to 57I are schematic views showing reproduction images of a further crosstalk detection symbol upon reproduction at different positions respectively;

FIG. 57J is a diagrammatic view illustrating a relationship between element holograms and tracking upon reproduction of the crosstalk detection symbol;

FIGS. 58A to 58I are schematic views showing reproduction images of a still further crosstalk detection symbol upon reproduction at different positions respectively;

FIG. 58J is a diagrammatic view illustrating a relationship between element holograms and tracking upon reproduction of the crosstalk detection symbol;

FIG. 61 is a schematic view showing reproduction images of the crosstalk detection symbol upon the even-numbered column.

DETAILED DESCRIPTION OF THE PREFERRED EMBODIMENT

A preferred embodiment of the present invention is described in detail below in the following order.

1. Recording and Reproduction of the Hologram Memory

2. Outline of the Entire Data Encoding Process

3. Data Page Generation Process

4. Intra-Page Encoding Process

5. Inter-Page Encoding Process

6. Hologram Array Generation Process

7. Effects of the Embodiment

1. Recording and Reproduction of the Hologram Memory

First, basic recording and reproduction action of a hologram memory 3 is described with reference to FIGS. 1A and 1B.

Figure 1A:
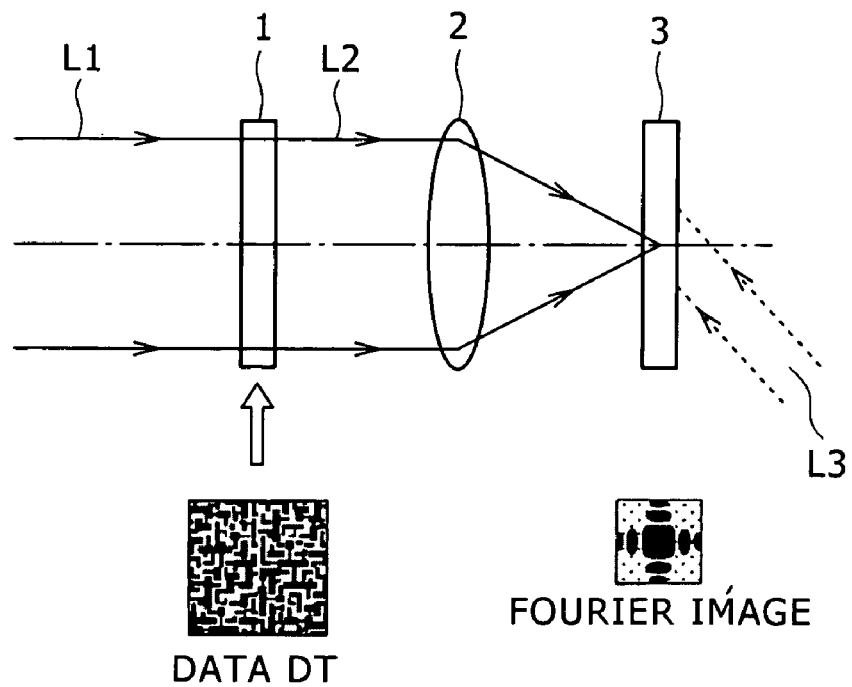
FIG. 1A is a schematic view of a hologram memory upon recording according to an embodiment of the present invention.

FIG. 1A illustrates a manner of data recording on the hologram memory 3. In order to record content data or data as a computer program or the like on the hologram memory 3, the entire recording data are encoded into a large number of data for one page.

One data DT as a unit of the encoded data is converted, for example, into such image data of a two-dimensional barcode as shown in FIG. 1A and is displayed as a two-dimensional page data image on a liquid crystal panel 1.

Laser light L1 outputted from a predetermined light source and typically converted into parallel light passes through the liquid crystal panel 1 on which the two-dimensional page data image is displayed. Thereupon, the laser light L1 is converted into object light L2 of an image representative of the two-dimensional data image.

The object light L2 is condensed by a condenser lens 2 and focused as a spot on the hologram memory 3.

At this time, recording reference light L3 is irradiated at a predetermined angle upon the hologram memory 3. Consequently, the object light L2 and the reference light L3 interfere with each other to form interference fringes, which are recorded as a dot-shaped element hologram.

It is to be noted that, where the condenser lens 2 is used in this manner, the data recorded as an element hologram form a Fourier image of the image of the recording data by a Fourier transform action of the condenser lens 2.

One element hologram is recorded on the hologram memory 3 in this manner, and data DT of encoding units are successively converted into two-dimensional page data similarly and displayed on the liquid crystal panel 1. Consequently, the data DT are individually recorded as element holograms on the hologram memory 3.

Figure 45:
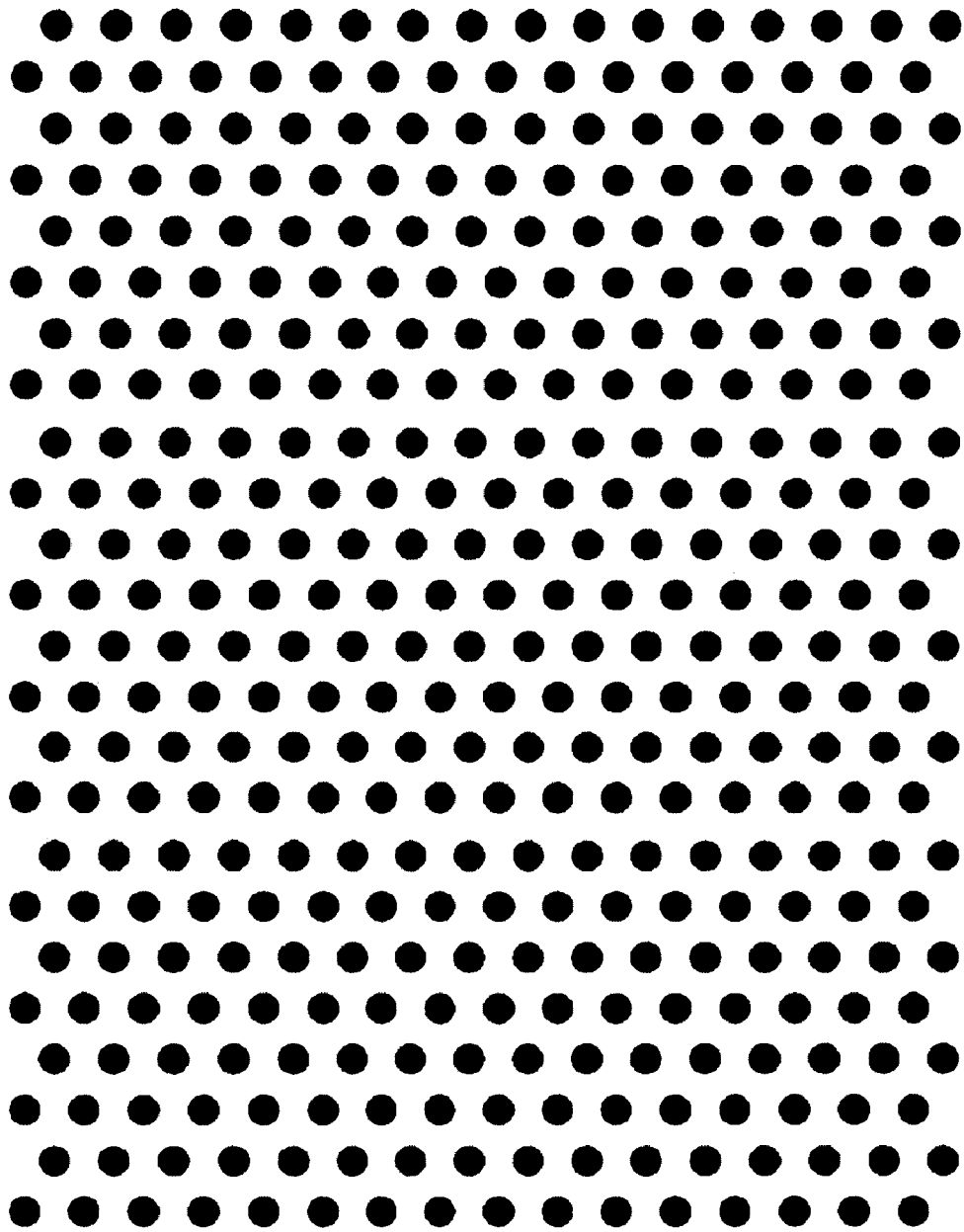
FIG. 45 is a schematic view showing a hologram unit matrix.

Upon recording of each element hologram, the position of the hologram memory 3 (hologram material) is fed (or the recording optical system is fed) by a feeding mechanism not shown to successively displace the recording position of the element hologram a little on the plane of the hologram memory 3. Consequently, a large number of elementary holograms are recorded on the hologram memory 3 typically in the form of a sheet so as to be disposed in a direction of the plane of the hologram memory 3. Referring to FIG. 45, one element hologram is represented by a mark "●", and a large number of such element holograms are formed as seen in FIG. 45.

Figure 1B:
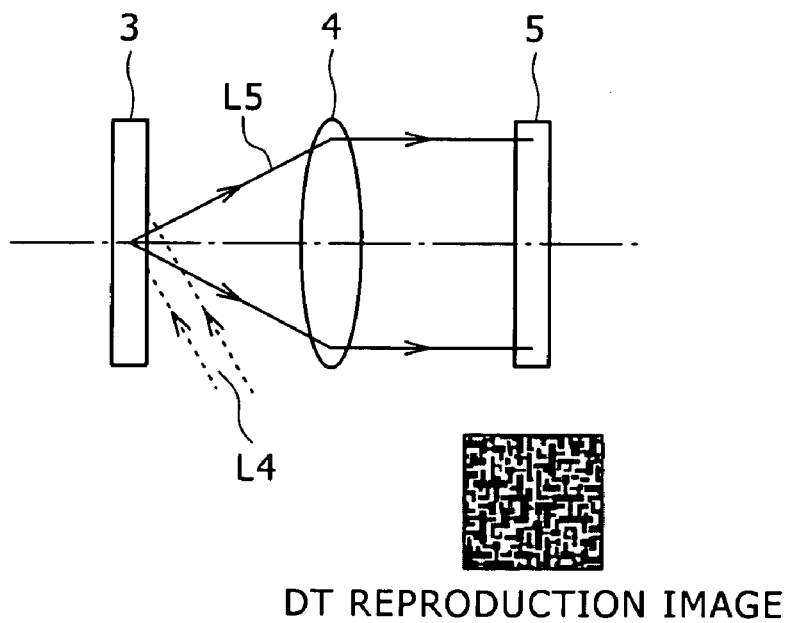
FIG. 1B is a schematic view of the hologram memory upon reproduction.

The hologram memory 3 on which element holograms are recorded in this manner are reproduced in such a manner as seen in FIG. 1B. Referring to FIG. 1B, a collimator lens 4 and an imager 5 are provided in a reproduction apparatus as a hologram reader not shown.

Reproduction reference light L4 is irradiated at an irradiation angle same as that upon recording on the hologram memory 3. By the irradiation of the reproduction reference light L4, the image recorded as the element holograms is obtained as a reproduction image. In other words, an image of the two-dimensional page data appears at a place conjugate with that of the liquid crystal panel 1 upon recording. The image is read by the imager 5.

In particular, reproduction image light L5 from the hologram memory 3 is converted into parallel light by the collimator lens 4 and enters the imager 5 which may be formed typically from a CCD (Charge-Coupled Device) image pickup element array or a CMOS (Complementary Metal-Oxide Semiconductor) image pickup element array. Since the Fourier image on the hologram memory 3 is inverse-Fourier-transformed into an image of two-dimensional page data by the collimator lens 4, a reproduction image as the two-dimensional page data is read by the imager 5.

The imager 5 generates a reproduction image signal in the form of an electric signal representative of the reproduction image. A decoding process is performed for the reproduction image signal to obtain original data, that is, the data prior to conversion into two-dimensional page data for recording.

Such data reading out is successively performed similarly for a large number of element holograms on the hologram memory 3 to obtain original content data or the like recorded on the hologram memory 3.

It is to be noted that angle multiplex recording is known as a recording method for such a hologram memory 3 as described above. The angle multiplex recording is a method of multiplex-recording element holograms at the same position on a plane by varying the angle of the recording reference light L3.

For example, if an element hologram is recorded in such a manner as seen in FIG. 1A and then the irradiation angle of the recording reference light L3 is varied, then another element hologram can be recorded at the same position on the plane of the hologram memory 3.

In other words, by varying the angle of the recording reference light L3, the plane of the hologram memory 3 can be used as multiple planes thereby to achieve multiplex recording, and the recording capacity can be increased significantly thereby. For example, a large number of such elementary hologram array planes as shown in FIG. 45 are formed.

Upon reproduction of the angle-multiplex-recorded hologram memory 3, the reproduction reference light L4 should be irradiated at angles same as the recording reference light angles upon recording. In particular, an element hologram recorded by irradiating the recording reference light L3 at a first angle can be read out by irradiating the reproduction reference light L4 at the same first angle. On the other hand, another element hologram recorded by irradiating the recording reference light L3 at a second angle can be read out by irradiating the reproduction reference light L4 at the same second angle.

It is to be noted that the hologram memory 3 on which data are recorded in the form of element holograms as described above can be duplicated readily in a mass by close contact copying.

Accordingly, the hologram memory 3 having element holograms recorded on a hologram material as seen in FIG. 1A may be used as it is as a hologram memory to be provided to general users. However, the hologram memory 3 may otherwise be used for duplication of a large number of hologram memories by close contact copying.

For example, a system may be assumed that computer data, AV content data, or some other data are recorded on hologram recording media and such hologram recording data are distributed widely such that a general user can acquire the data recorded on the hologram memory 3 using a reproduction apparatus such as a hologram reader, which is not shown. In this instance, it is preferable to generate a hologram master medium in such a manner as described hereinabove with reference to FIG. 1A and distribute a hologram memory duplicated from the master medium such that the data are read out through the operation described hereinabove with reference to FIG. 1B by the user side.

2. Outline of the Entire Data Encoding Process

Figure 2:
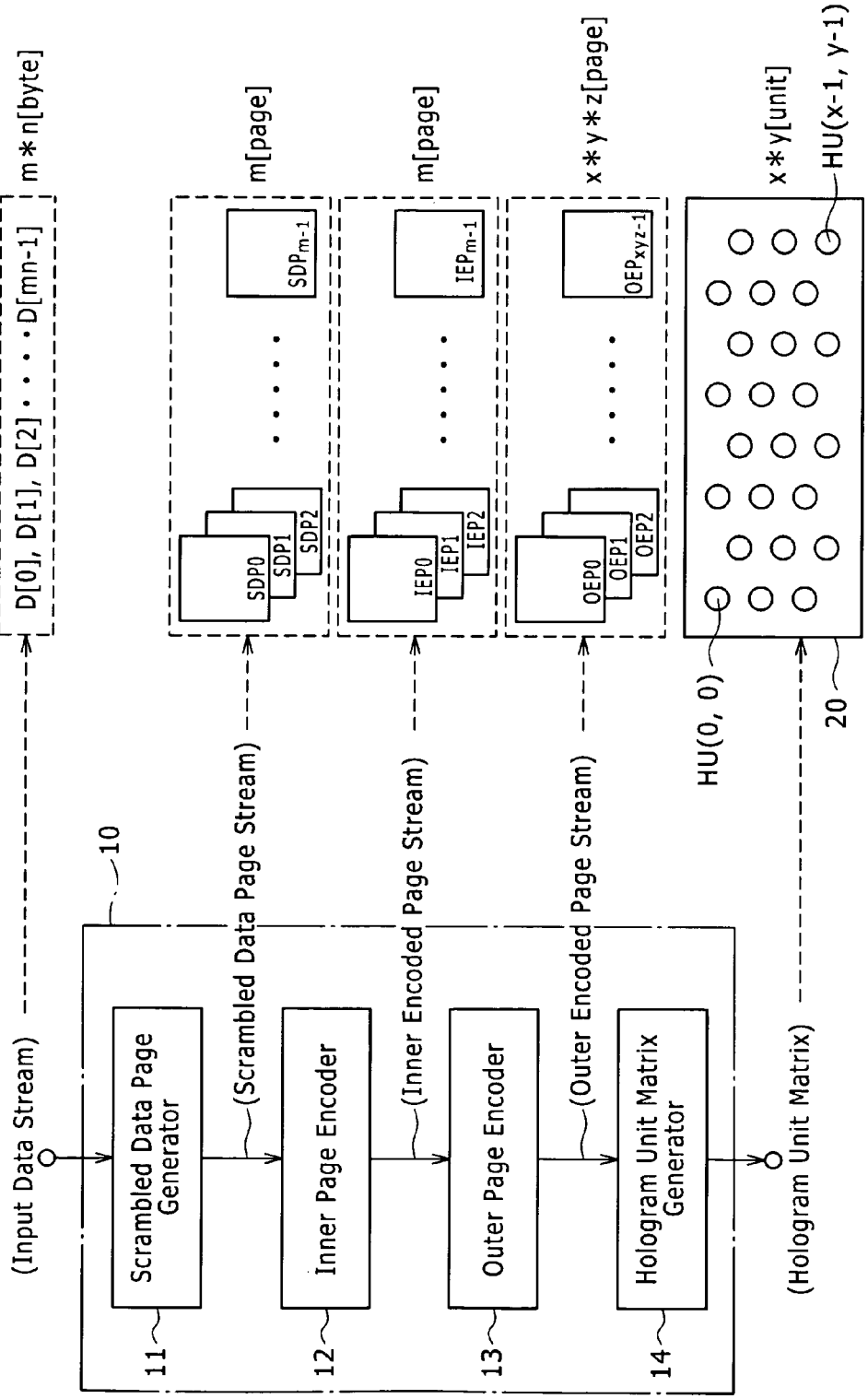
FIG. 2 is a block diagram showing a configuration of a hologram recording system and illustrating processes performed by the hologram recording system according to an embodiment of the present invention.

In the following, an encoding process of data to be recorded on the hologram memory 3 is described. FIG. 2 shows a configuration of a recording system and illustrates a manner of an encoding process executed by several components.

Referring to FIG. 2, an input data stream illustrated is stream data of original data (input data) to be recorded on the hologram memory 3.

The input data may be various data including, for example, audio contents, video contents, computer programs, and computer data.

The recording system 10 shown includes a scrambled data page generator 11, an inner page encoder 12, an outer page encoder 13, and a hologram unit matrix generator 14. The scrambled data page generator 11 performs a data page generation process for input data supplied thereto as a recording object. The inner page encoder 12 performs an intra-page encoding process. The outer page encoder 13 performs an inter-page encoding process. The hologram unit matrix generator 14 performs a hologram array generation process to generate a hologram memory 3.

The input data which are object data of encoding have a size of m×n bytes as a unit. The input data of units of m×n bytes are denoted by D[0], D[1], . . . , and D[nm−1]. Here, m is the page number of data to be encoded, and n is the number of data per one page.

The input data are inputted to the scrambled data page generator 11. The scrambled data page generator 11 performs a scramble process for the input data to generate data for m pages, that is, scrambled data pages SDP0, SDP1, . . . , and SDPm−1. The scrambled data page generator 11 outputs the scrambled data pages SDP0, SDP1, . . . , and SDPm−1 as a scrambled data page stream.

The scrambled data pages SDP0, SDP1, . . . , and SDPm−1 are inputted to the inner page encoder 12. The inner page encoder 12 performs an intra-page encoding process for the scrambled data pages inputted thereto to generate data for m pages, that is, inner encoded pages IEP0, IEP1, . . . and, IEPm−1. Then, the inner page encoder 12 outputs the inner encoded pages IEP0, IEP1, . . . , and IEPm−1 as an inner encoded page stream.

The stream data of the inner encoded pages IEP0, IEP1, . . . , and IEPm−1 are inputted to the outer page encoder 13. The outer page encoder 13 performs an inter-page encoding process for the inner encoded pages inputted thereto to generate data for x·y·z pages, that is, outer encoded pages OEP0, OEP1, . . . , and OEPxyz−1. Then, the outer page encoder 13 outputs the outer encoded pages OEP0, OEP1, . . . , and OEPxyz−1 as an outer encoded page stream.

The stream data of the outer encoded pages OEP0, OEP1, . . . , and OEPxyz−1 are inputted to the hologram unit matrix generator 14. The hologram unit matrix generator 14 performs an element program formation process for the outer encoded pages to generate a hologram unit matrix 20 in which element holograms HU(0, 0), . . . , and HU(x−1, y−1) of x·y units are recorded. The hologram unit matrix 20 has element holograms recorded on a hologram material by the action described hereinabove with reference to FIG. 1A, and may be used as the hologram memory 3 itself or as a master medium for duplication of the hologram memory 3.

In the embodiment of the present specification, the hologram unit matrix 20 is used to generally represent a large number of element holograms (=hologram units) recorded so as to be arrayed on a hologram material.

FIGS. 3A to 3D illustrate processing steps at the components of the recording system 10.

In particular, FIG. 3A illustrates processes of the scrambled data page generator 11. Referring to FIG. 3A, the scrambled data page generator 11 successively performs a pre-processing page generation process A1, a sector dividing process A2, an EDC addition process A3, a scramble process A4, and a page joining process A5. The scrambled data page generator 11 outputs a stream (Scrambled Data Page Stream) of resulting scrambled data pages SDP.

FIG. 3B illustrates processes of the inner page encoder 12. Referring to FIG. 3B, the inner page encoder 12 successively performs a data array conversion process B1, an intra-page encoding process B2, an intra-page interleave process B3, and a data array inverse conversion process B4. The inner page encoder 12 outputs a stream (Inner Encoded Page Stream) of resulting intra-encoded pages IEP.

FIG. 3C illustrates processes of the outer page encoder 13. Referring to FIG. 3C, the outer page encoder 13 successively performs a page array conversion process C1, an inter-page encoding process C2, a page duplication process C3, an inter-page interleave process C4, and a page array re-conversion process C5. The outer page encoder 13 outputs a stream (Outer Encoded Page Stream) of resulting outer encoded pages OEP.

FIG. 3D illustrates processes of the hologram unit matrix generator 14. Referring to FIG. 3D, the hologram unit matrix generator 14 performs a page ID generation process D1, a page ID encoding process D2, a synchronizing signal generation process D3, and a crosstalk detection symbol generation process D4. The hologram unit matrix generator 14 further performs first and second two-dimensional modulation processes D5 and D6, a page search symbol generation process D7, a physical page generation section D8, and an element hologram arraying process D9. The hologram unit matrix generator 14 thereby performs such recording of element holograms as described hereinabove with reference to FIG. 1A to generate the hologram unit matrix 20.

3. Data Page Generation Process

The data page Generation process of the scrambled data page generator 11 is described in detail.

FIG. 4 illustrates the processes A1 to A5 of the scrambled data page generator 11 described hereinabove with reference to FIG. 3A.

The pre-processing page generation process A1 is performed for input data to generate pre-processing pages (Raw Pages).

The sector dividing process A2 is performed to generate pre-processing sectors (Raw Sectors) from the pre-processing pages (Raw Pages).

The EDC addition process A3 is performed to generate sectors with EDC from the pre-processing sectors (Raw Sectors).

The scramble process A4 is performed to generate scrambled data sectors from the sectors with EDC.

The page joining process A5 is performed to generate scrambled data pages from the scrambled data sectors.

The individual processes are described in order.

First, the pre-processing page generation process A1 is performed for raw bytes as input data D[0], D[1], . . . , and D[nm−1]. The term "raw byte" signifies data before processed.

The input data (raw bytes) are formed from a group of m×n data.

In the pre-processing page generation process A1, the data group as the raw bytes is successively divided into data sequences of a unit of n bytes to generate pre-processing pages (Raw Pages) illustrated in FIG. 6. In particular, such Raw Page[0], Raw Page[1], . . . , and Raw Page[m−1] for m pages as seen in FIG. 6 are generated. For example, the pre-processing page Raw Page[0] is formed from n bytes of the input data D[0], . . . , and D[n−1]. Also any other pre-processing page is formed form n bytes.

Then, the pre-processing pages Raw Page[0], Raw Page [1], . . . , and Raw Page[m−1] are divided into "s" pre-processing sectors by the sector dividing process A2. In particular, as seen in FIG. 7, the pre-processing page Raw Page [0] is divided into "s" pre-processing sectors including pre-processing sectors Raw Sector[0] [0], Raw Sector [0] [1], . . . , and Raw Sector [0] [s−1]. Similarly, the pre-processing page Raw Page[1] is divided into "s" pre-processing sectors including pre-processing sectors Raw Sector [1] [0], Raw Sector [1] [1], . . . , and Raw Sector [1] [s−1]. Also the other pre-processing pages up to the pre-processing page Raw Page [m−1] are divided similarly.

As all of the pre-processing pages are divided into "s" pre-processing sectors, totaling m×s pre-processing sectors Raw Sector[1] [0], . . . , and Raw Sector[m−1] [s−1] are formed. This is illustrated in FIG. 8. In FIG. 8, the configuration of each of the pre-processing sectors Raw Sector[1] [0], . . . , and Raw Sector[m−1] [s−1] is represented by input data.

The pre-processing sectors are processing units for an EDC (Error Detection Code) hereinafter described and are formed from t bytes (t=n/s). For example, the Raw Page[0] is formed from t bytes of the input data D[0], . . . , and D[t−1].

Then, an EDC (Error Detection Code) is added to each of the pre-processing sectors Raw Sector[1] [0], . . . , and Raw Sector[m−1] [s−1] by the EDC addition process A3.

FIG. 9 illustrates a configuration of the pre-processing sectors to each of which an EDC (error Detection code) of u bytes is added. For example, an EDC parity of u bytes E[0], E[1], . . . , and E[u−1] is added to the input data of the t bytes D[0], . . . , and D[t−1] to form a sector with EDC [0] [0]. An EDC parity is added also to the other pre-processing sectors. As a result, Sector with EDC [0] [0], Sector with EDC[0] [1], . . . , and Sector with EDC[m−1] [s−1] of m×s sectors with EDC are formed.

Figure 10:
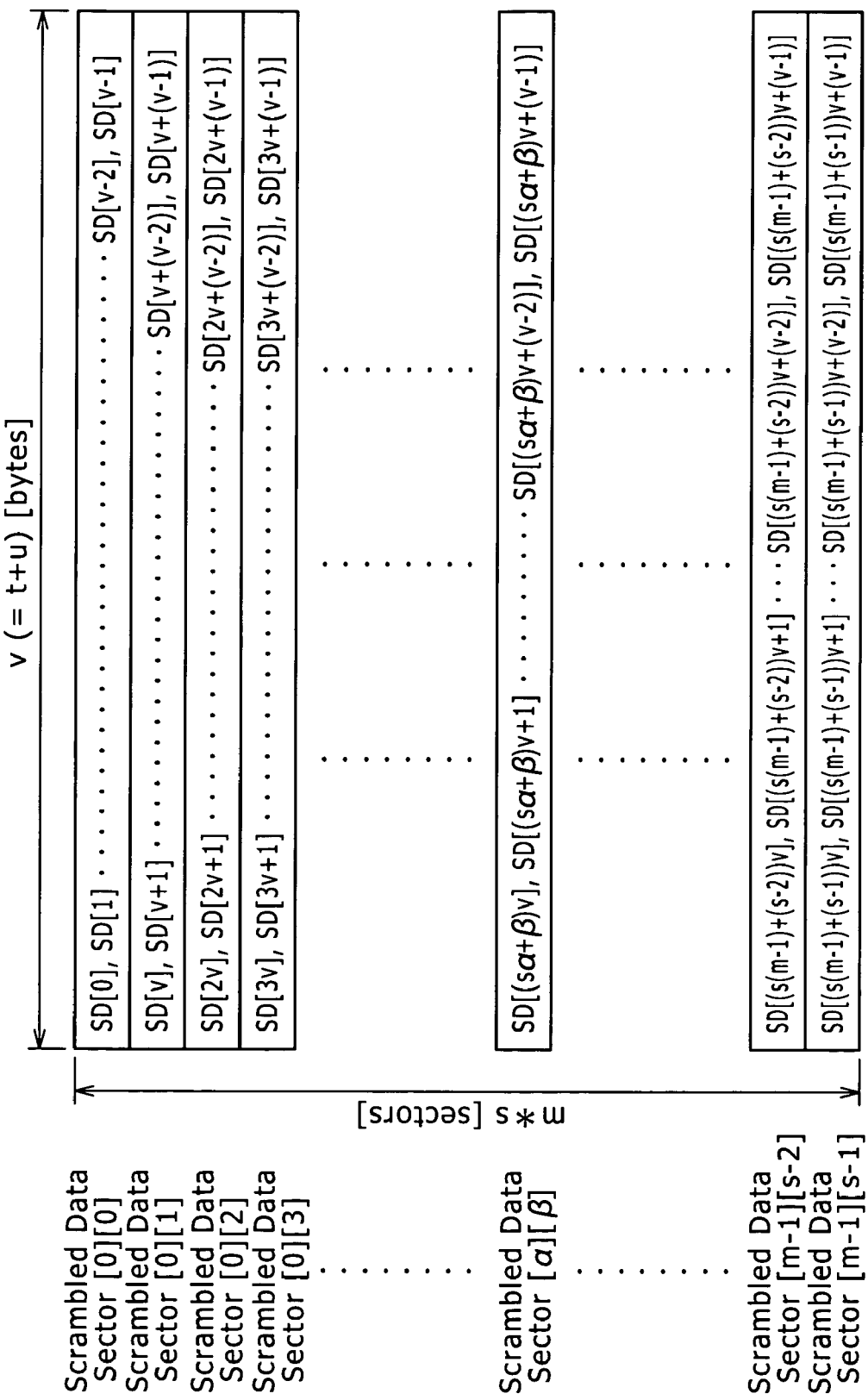
FIG. 10 is a diagrammatic view showing scrambled data sectors.

Then, by the scramble process A4, Sector with EDC[0] [0], Sector with EDC[0] [1], . . . , and Sector with EDC[m−1] [s−1] are subject to a scramble process so that scrambled data sectors shown in FIG. 10 are generated.

As can be seen from FIGS. 9 and 10, byte data of each sector with EDC are converted into scrambled byte data SD.

For example, the input data D[0], ..., and D[t−1] and the EDG parity E[0], E[1], ..., and E[u−1] which form the Sector with EDC[0] [0] shown in FIG. 9 are scrambled to form the Scrambled Data Sector[0] [0] composed of byte data SD[0], SD [1], ..., and SD[v−1] of FIG. 10. It is to be noted that the number of the v bytes which form a scrambled data sector is the number (t+u) of bytes which form a sector with EDC.

Also the other sectors with EDC are subject to a scramble process. Consequently, Scrambled Data Sector[0] [0], Scrambled Data Sector[0] [1], ..., and Scrambled Data Sector [m−1] [s−1] of m×s scrambled data are formed.

Figure 11:
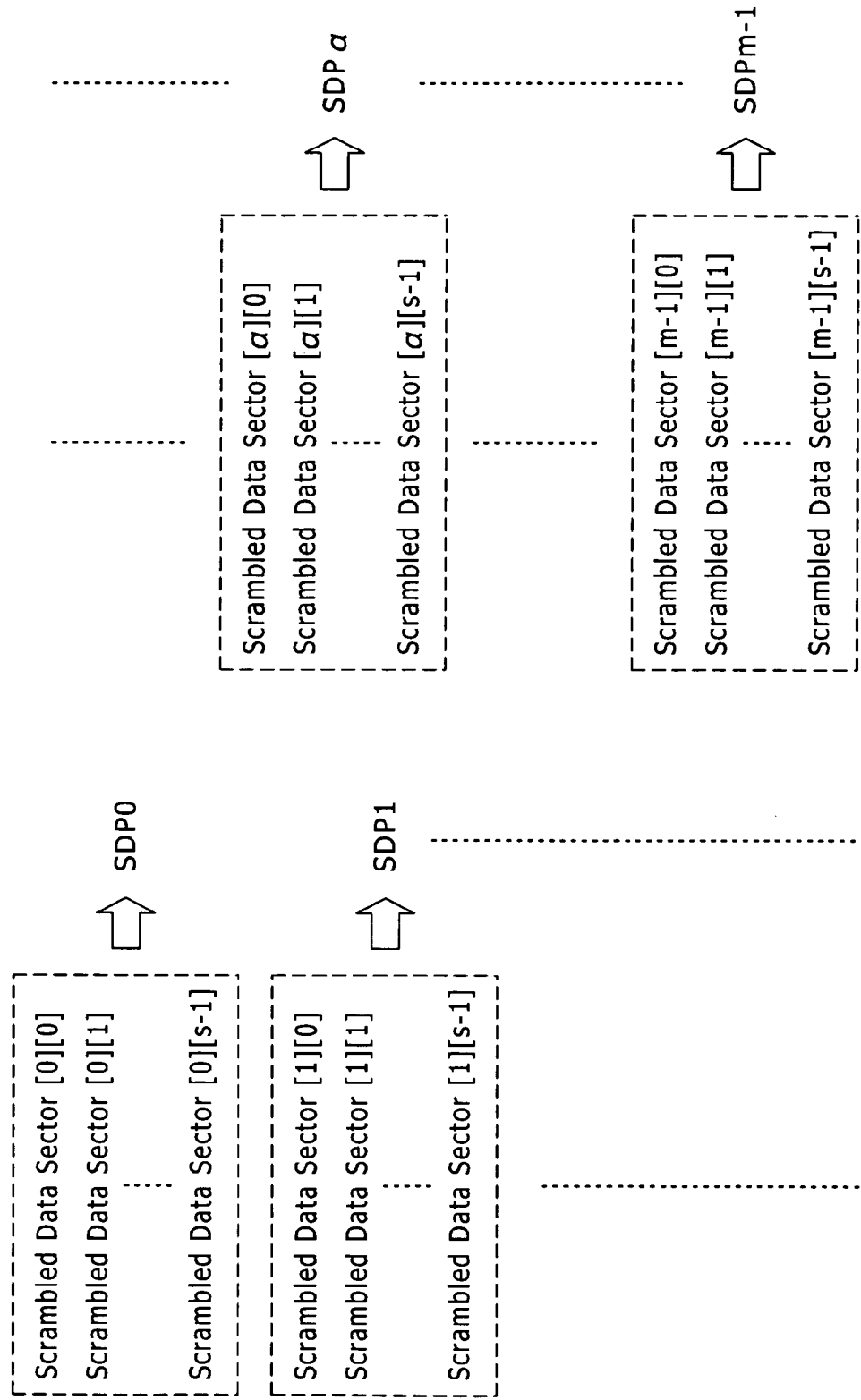
FIG. 11 is a diagrammatic view illustrating a page joining process.

The page joining process A5 is performed for the scrambled data sectors. In this instance, the "s" sectors are coupled into one page to generate scrambled data pages SDP as seen in FIG. 11.

In particular, the scrambled data sectors Scrambled Data Sector [0] [0], ..., and Scrambled Data Sector [0] [s−1] are joined together to form a scrambled data page SDP0. The scrambled data sectors are successively joined in a similar manner until a scrambled data page SDPm−1 is formed.

Figure 12:
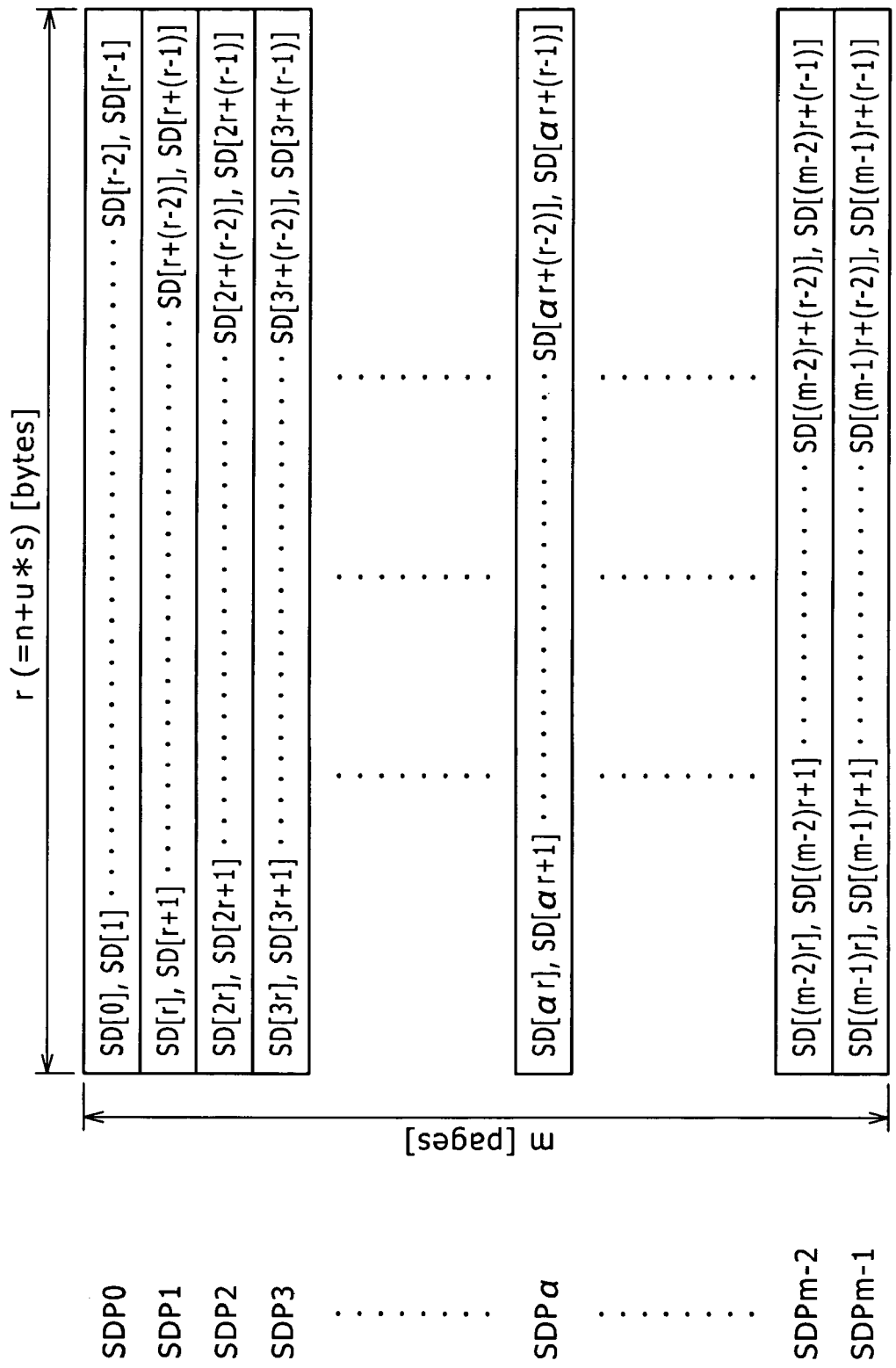
FIG. 12 is a diagrammatic view showing scrambled data pages.

FIG. 12 shows a configuration of the "m" scrambled data pages SDP0, SDP1, ..., and SDPm−1.

Each scrambled data page is formed from "r" bytes. Thus, r=n+u×s bytes.

As described hereinabove with reference to FIG. 2, the scrambled data pages SDP0, SDP1, ..., and SDPm−1 are supplied from the scrambled data page generator 11 to the inner page encoder 12.

4. Intra-Page Encoding Process

The scrambled data pages SDP0, SDP1, ..., and SDPm−1 obtained by the data page generation process described above by the scrambled data page generator 11 are subject to an intra-page encoding process by the inner page encoder 12.

Figure 13:
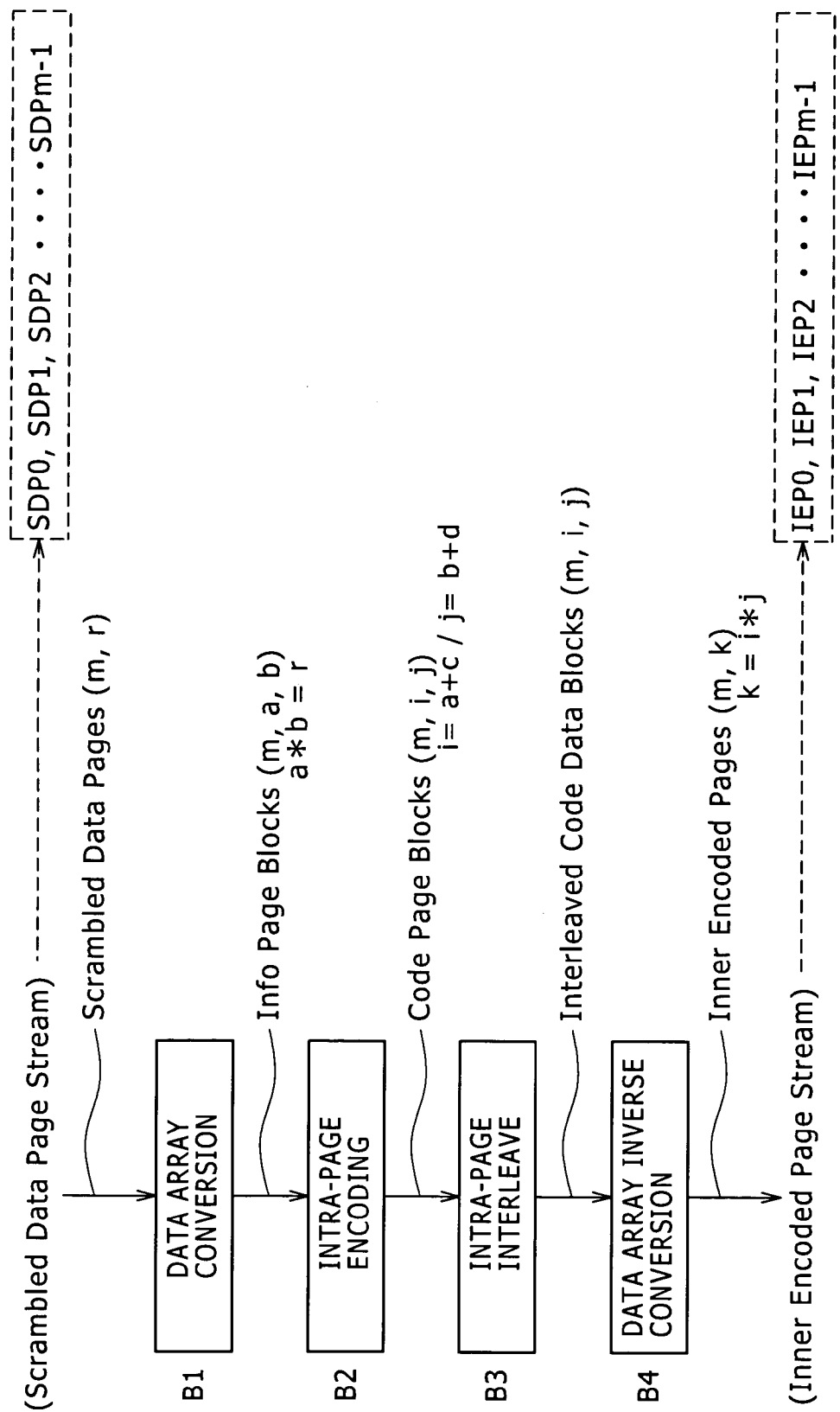
FIG. 13 is a flow diagram illustrating the processes of the inner page encoder.

FIG. 13 illustrates the processes B1 to B4 of the inner page encoder 12 mentioned hereinabove with reference to FIG. 3B.

By the data array conversion process B1, information data blocks (Info Data Blocks) are generated from the scrambled data pages SDP.

By the intra-page encoding process B2, code data blocks are generated from the information data blocks (Info Data Blocks).

By the intra-page interleave process B3, interleaved code data blocks are generated from the code data blocks.

By the data array inverse conversion process B4, inner encoded pages are generated from the interleaved code data blocks.

The processes mentioned are successively described in more detail below.

The scrambled data pages SDP0, SDP1, ..., and SDPm−1 inputted to the inner page encoder 12 are subject to array conversion by the data array conversion process B1 to generate information data blocks (Info Data Blocks) so as to allow subsequent intra-page encoding.

Figure 14:
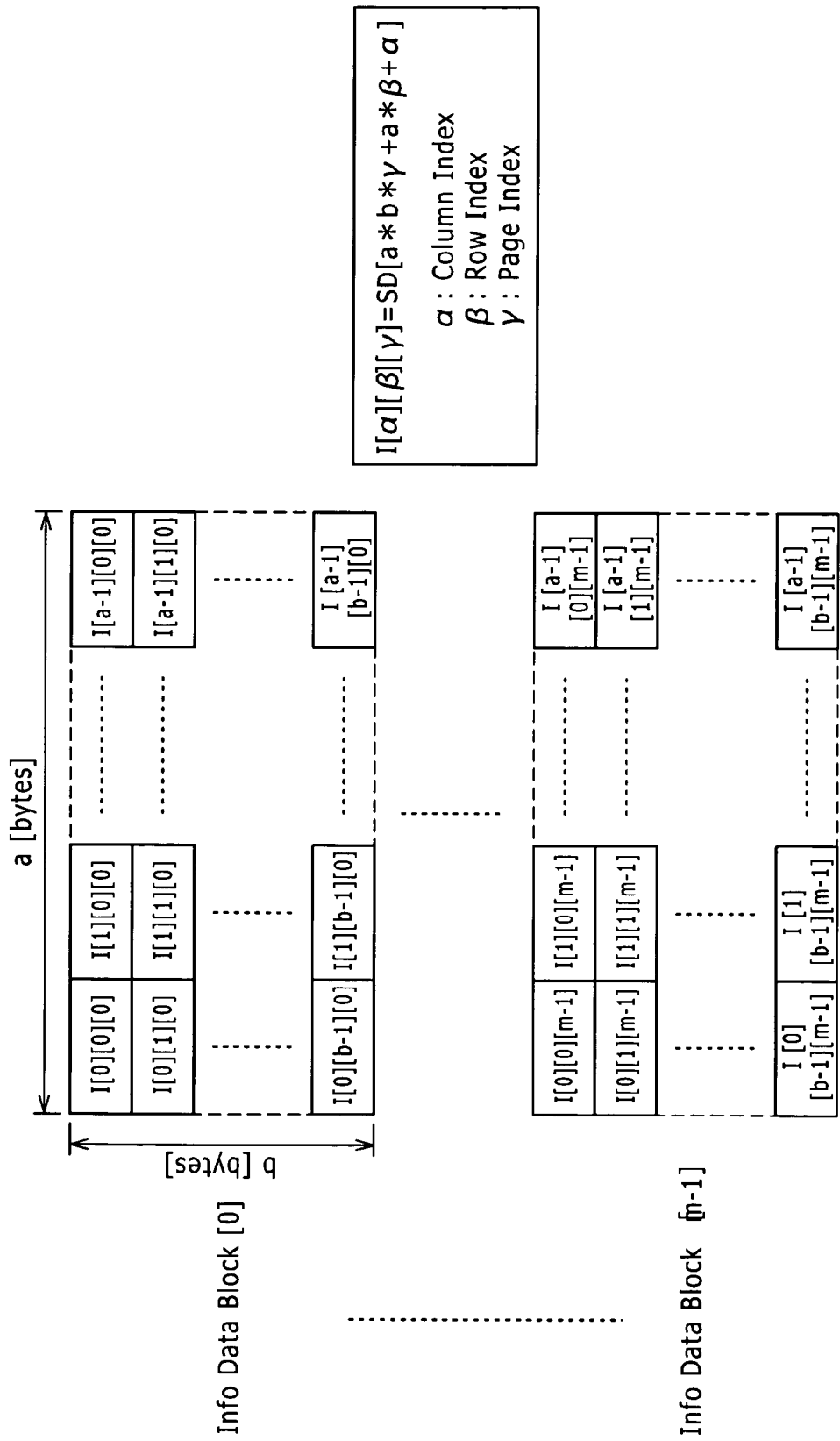
FIG. 14 is a diagrammatic view illustrating a data array conversion process.

FIG. 14 illustrates an example that component bytes of the scrambled data pages are arranged in a matrix of horizontal "a" bytes×vertical "b" bytes in order to perform two-dimensional product encoding. It is to be noted that a×b=r. The term "r bytes" represents the number of component bytes of a scrambled data page as described hereinabove with reference to FIG. 12.

For example, if the data SD[0], ..., and SD[r−1] which compose the scrambled data page (Scrambled Data Page [0]=SDP0) of FIG. 12 are re-arranged into a matrix of horizontal "a" bytes×vertical "b" bytes, then the information data block (Info Data Block [0]) of FIG. 14 is obtained, and the data after the array conversion are represented by I[0] [0] [0], ..., and I[a−1] [b−1] [0].

The scrambled data pages SDP0, SDP1, ..., and SDPm−1 are subject to the array conversion in this manner to form Info Data Block [0], Info Data Block [1], ..., and Info Data Block [m−1].

It is to be noted that, of the representation I[α] [β] [γ], α represents a column index (column number), β a row index (row number), and γ a page index (page number).

The data SD and the data I[α] [β] [γ] after the array conversion have a corresponding relationship of I[α] [β] [γ]= [a·b·γ+a·β+α].

Figure 15:
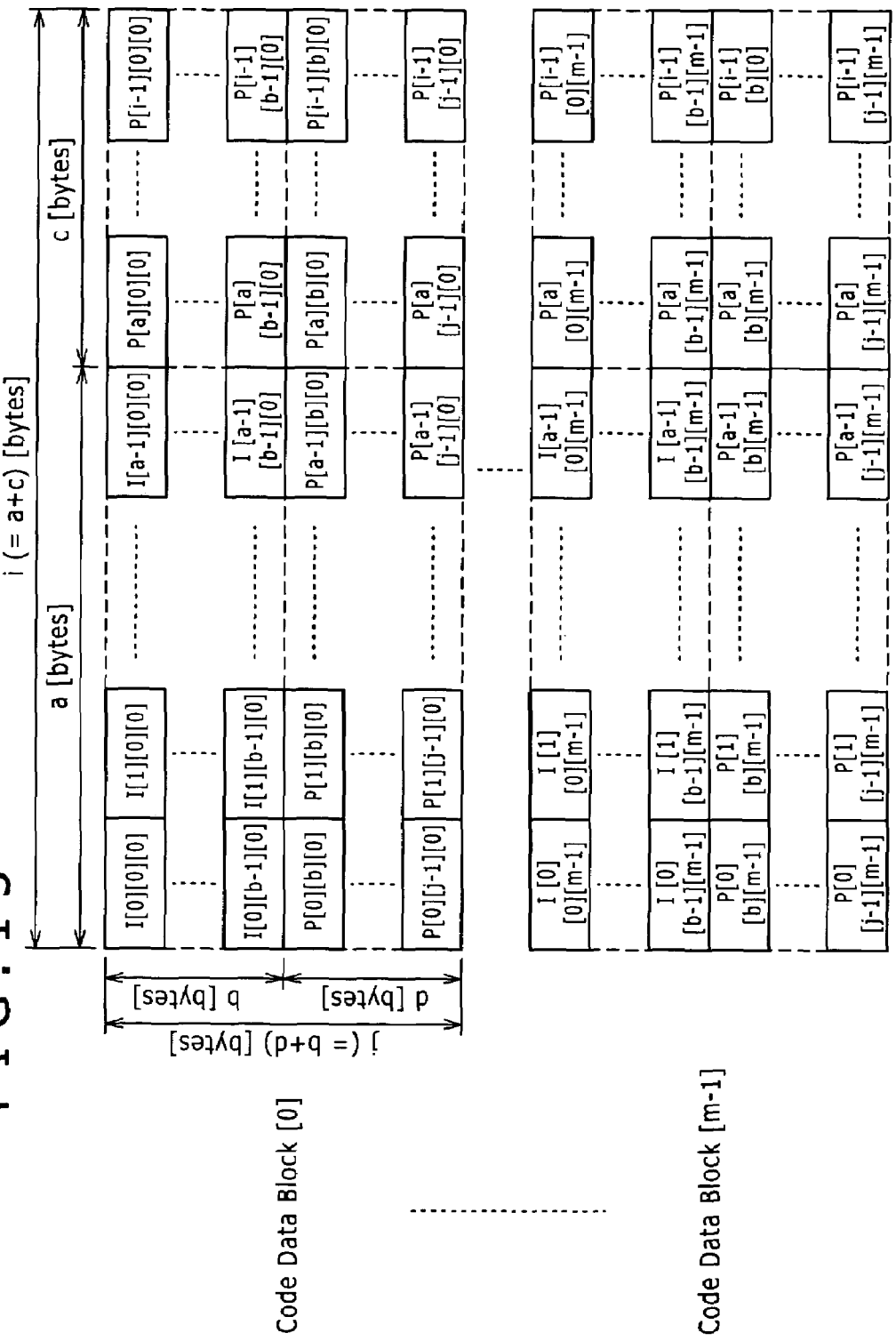
FIG. 15 is a diagrammatic view illustrating an intra-page encoding process.

Then, by the intra-page encoding process B2, addition of a correction parity to the information data blocks (Info Data Blocks) is performed to generate code data blocks. FIG. 15 illustrates an example that parities P of c bytes are added in the horizontal direction and parities P of d bytes are added in the vertical direction.

For example, parities P[a] [0] [0], ... of c bytes are added in the horizontal direction and parities P[0] [b] [0], ... of d bytes are added in the vertical direction as seen in FIG. 15 to the information data block (Info Data Block [0]) of FIG. 14 to generate a code data block (Code Data Block [0]) of i×j bytes. Here, i=a+c, and j=b+d.

Parities P are added similarly also to the other information data blocks. Consequently, Code Data Block [0], ..., and Code Data Block [m−1] of "m" code data are generated.

The Code Data Block [0], ..., and Code Data Block [m−1] generated in this manner are subject to an interleave process, which is completed in the page, by the intra-page interleave process B3.

Figure 16:
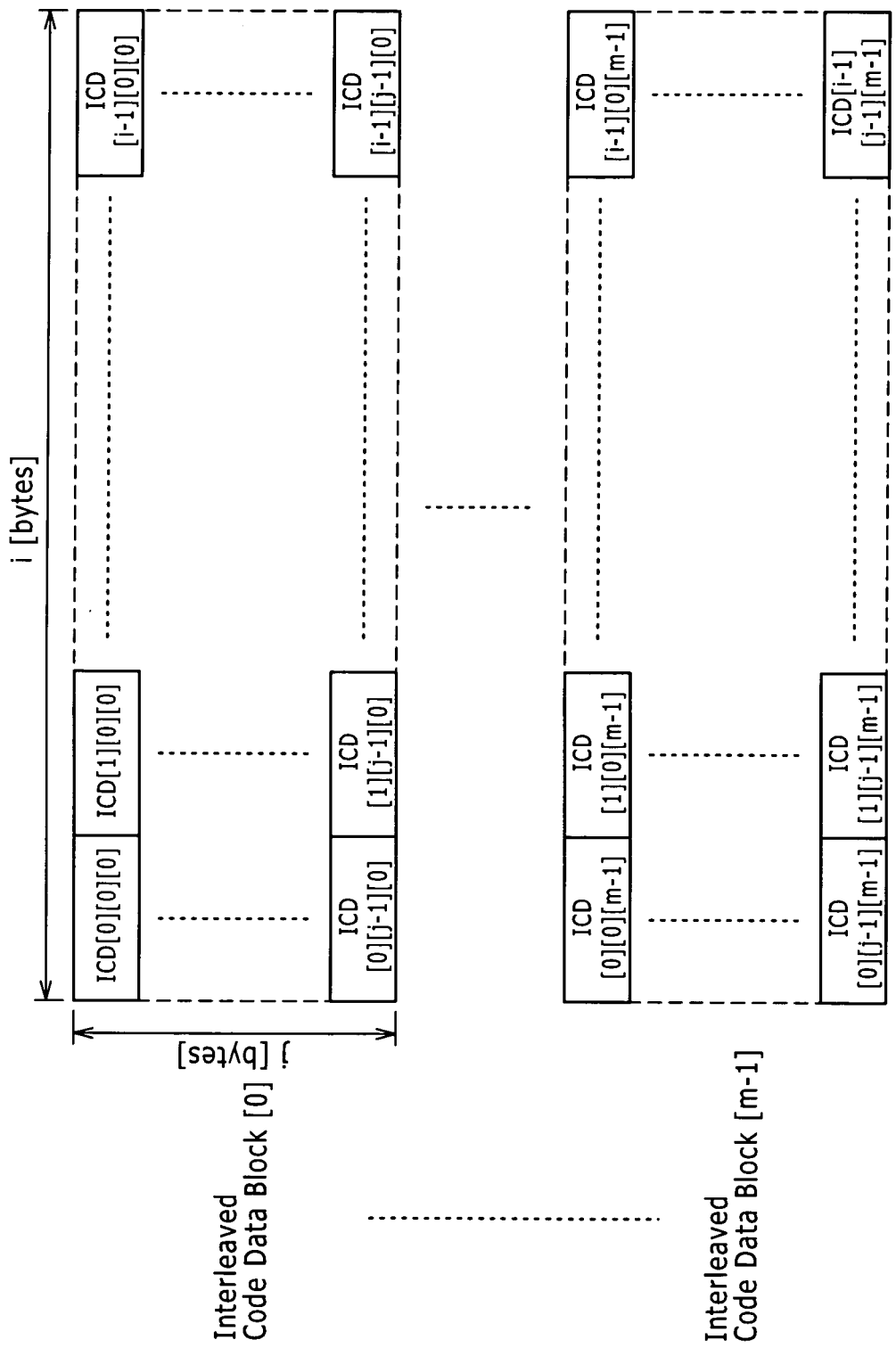
FIG. 16 is a diagrammatic view illustrating an intra-page interleave process.

FIG. 16 shows Interleaved Code Data Block [0], ..., and Interleaved Code Data Block [m−1] obtained by intra-page-interleaving Code Data Block [0], ..., and Code Data Block [m−1], respectively.

For example, if the data I[0] [0] [0], ..., and P[i−1] [j−1] [0] which compose the Code Data Block [0] shown in FIG. 15 are interleaved, then data ICD[0] [0] [0], ..., and ICD[i−1] [j−1] [0] shown in FIG. 16 are obtained and make an Interleaved Code Data Block [0] of i×j bytes.

The m interleaved code data blocks generated in such a manner as described above with reference to FIG. 16 are subject to inverse conversion in the data array thereof into those of the original page units by the data array inverse conversion B4 to generate inner-encoded pages IEP.

Figure 17:
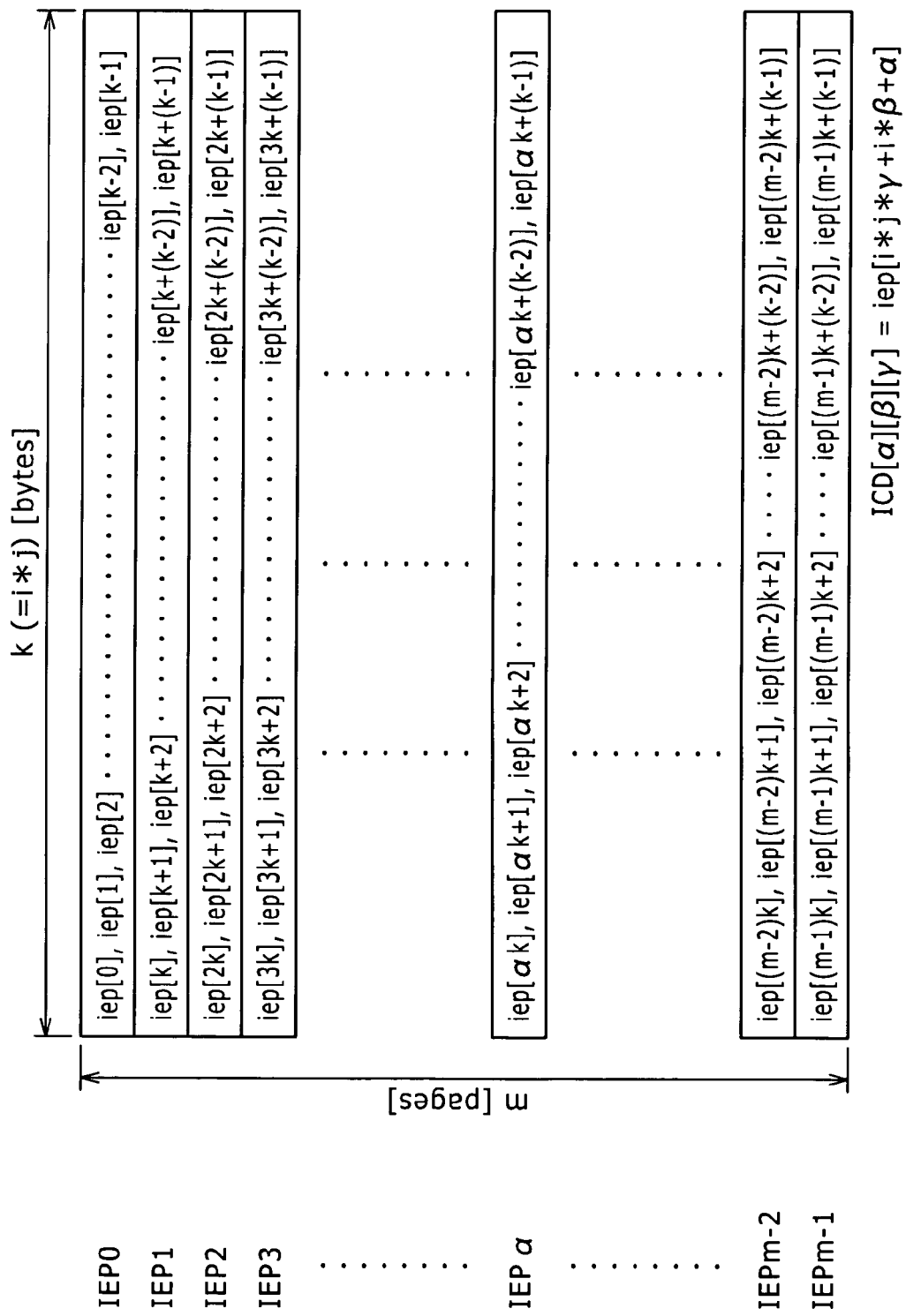
FIG. 17 is a diagrammatic view showing inner encoded pages.

FIG. 17 illustrates the inner-encoded pages IEP0, ..., and IEPm−1. In the example shown, "m" inner-encoded pages of k bytes (k=i×j) are generated.

For example, the Interleaved Code Data Block [0] of FIG. 16 is inverse converted in the array into an inner encoded page IEP0 of data Iep[0], ..., and Iep[k−1] of k bytes of FIG. 17. Also the succeeding interleaved code data blocks are successively inverse-converted in the array to generate inner encoded pages IEP1, ..., and IEPm−1 of k bytes shown in FIG. 17.

The inner encoded pages IEP0, IEP1, ..., and IEPm−1 are outputted from the inner page encoder 12 and supplied to the outer page encoder 13 as described hereinabove with reference to FIG. 2.

5. Inter-Page Encoding Process

The inner encoded pages IEP0, IEP1, ..., and IEPm−1 obtained by the intra-page encoding process by the inner page encoder 12 are subject to an inter-page encoding process by the outer page encoder 13.

Figure 18:
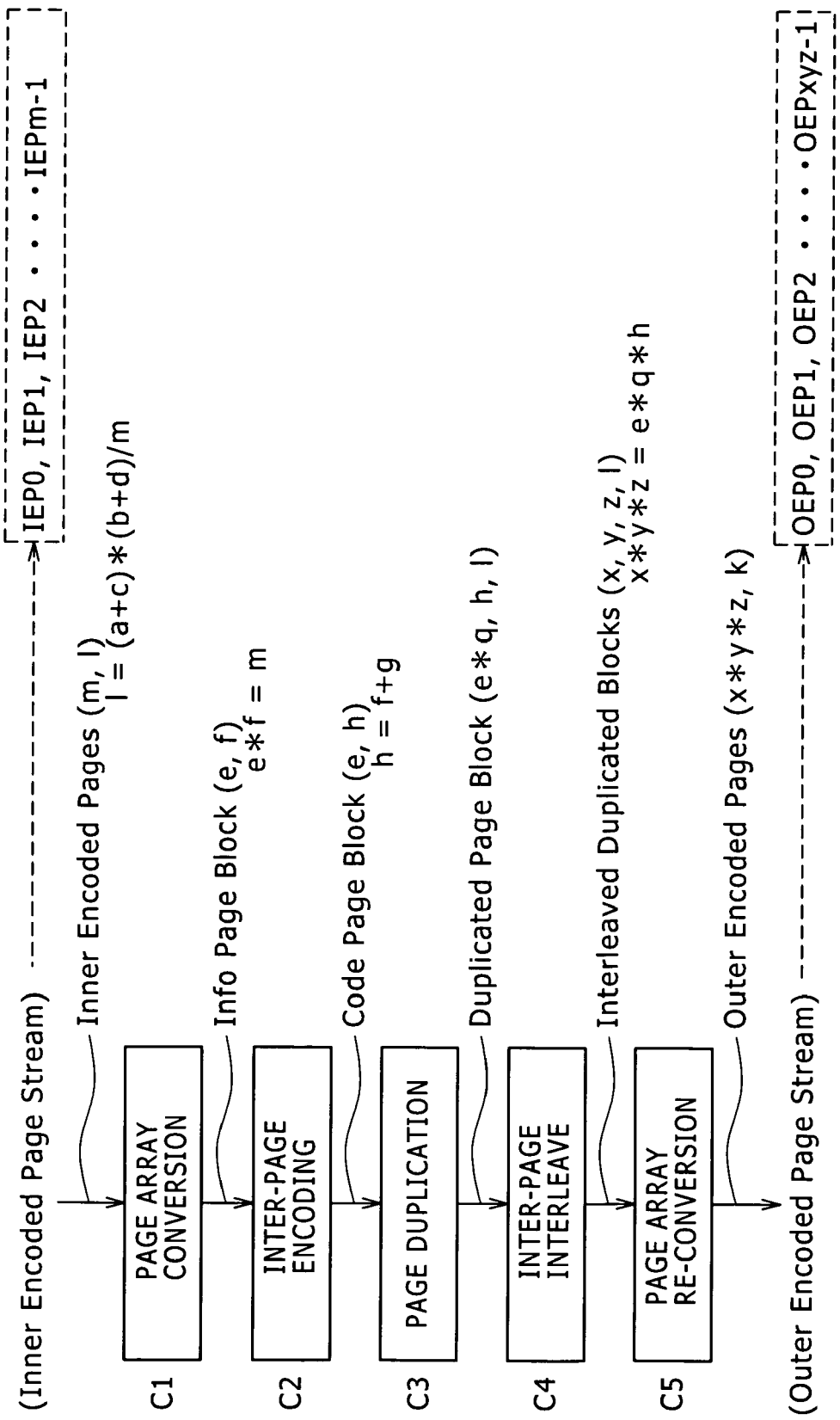
FIG. 18 is a flow diagram illustrating the processes of the outer page encoder.

FIG. 18 illustrates the processes C1 to C5 of the outer page encoder 13 mentioned hereinabove with reference to FIG. 3C.

By the page array conversion process C1, information page blocks (Info Page Blocks) are generated from the intra-encoded pages IEP.

By the inter-page encoding process C2, code page blocks are generated from the information page blocks (Info Page Blocks).

By the page duplication process C3, a duplicated page block is generated from the code page blocks.

By the inter-page interleave process C4, interleaved duplicated page blocks are generated from the duplicated page block.

By the page array re-conversion process C5, outer encoded pages are generated from the interleaved duplicated page blocks.

The individual processes are described in more detail.

The inner encoded pages IEP0, IEP1, . . . , and IEPm−1 inputted to the outer page encoder 13 are subject to array conversion to generate an information page block (Info Page Block) to allow subsequent inter-page encoding.

Figure 19:
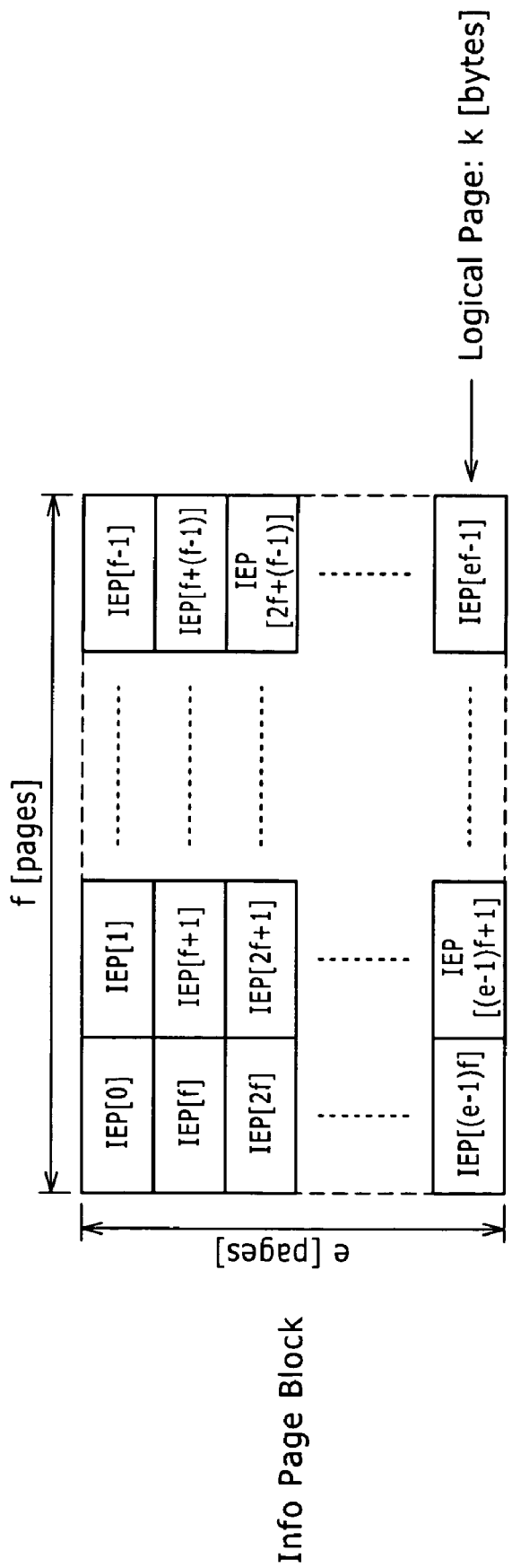
FIG. 19 is a diagrammatic view illustrating a page array conversion process.

FIG. 19 shows an example of the information page block obtained by array conversion of the inner encoded pages IEP0, IEP1, . . . , and IEPm−1 into a matrix of horizontal f pages×vertical e pages. The inner encoded pages obtained by the array conversion are represented by IEP[0], IEP[1], . . . , and IEP[ef−1].

Figure 20:
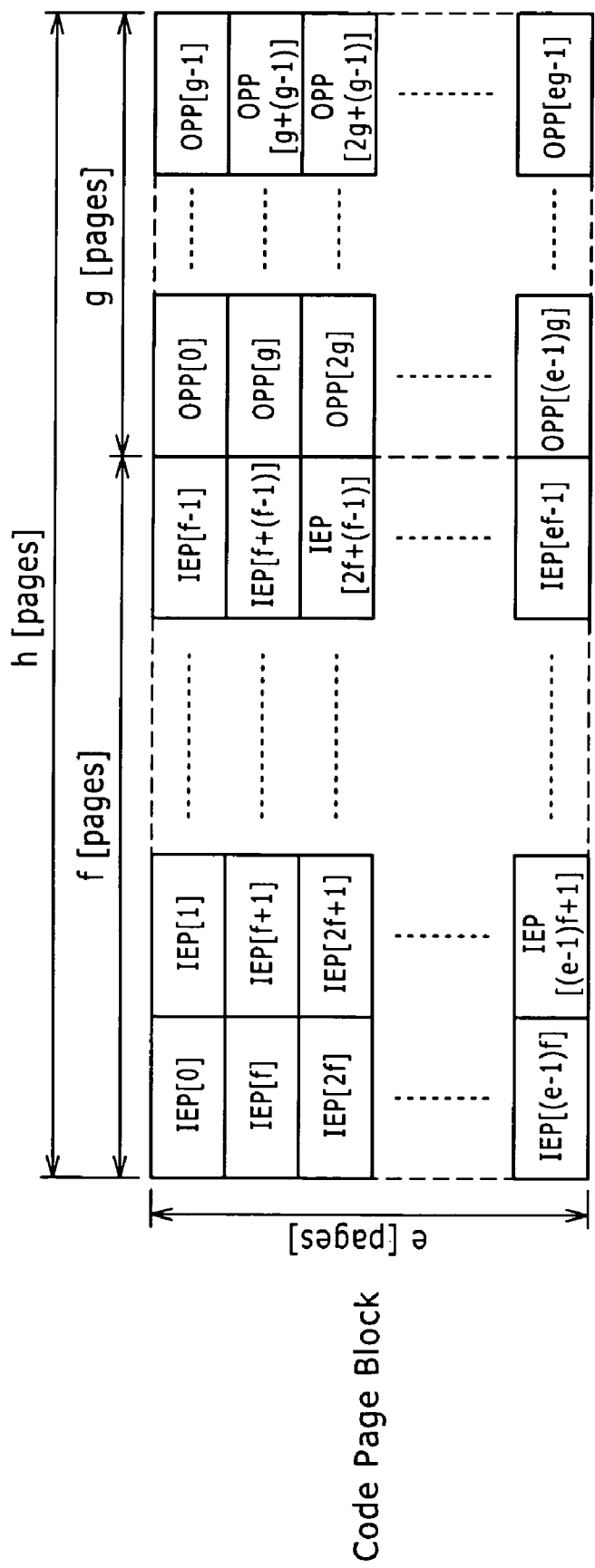
FIG. 20 is a diagrammatic view illustrating an inter-page encoding process.

Then, by the inter-page encoding process C2, addition of correction parity pages between pages is performed for the information page block (Info Page Block) to generate a code page block. FIG. 20 shows an example of a code page block generated by addition of outer parity pages OPP[0], . . . , and OPP[eg−1] of g pages in the horizontal direction.

Figure 21:
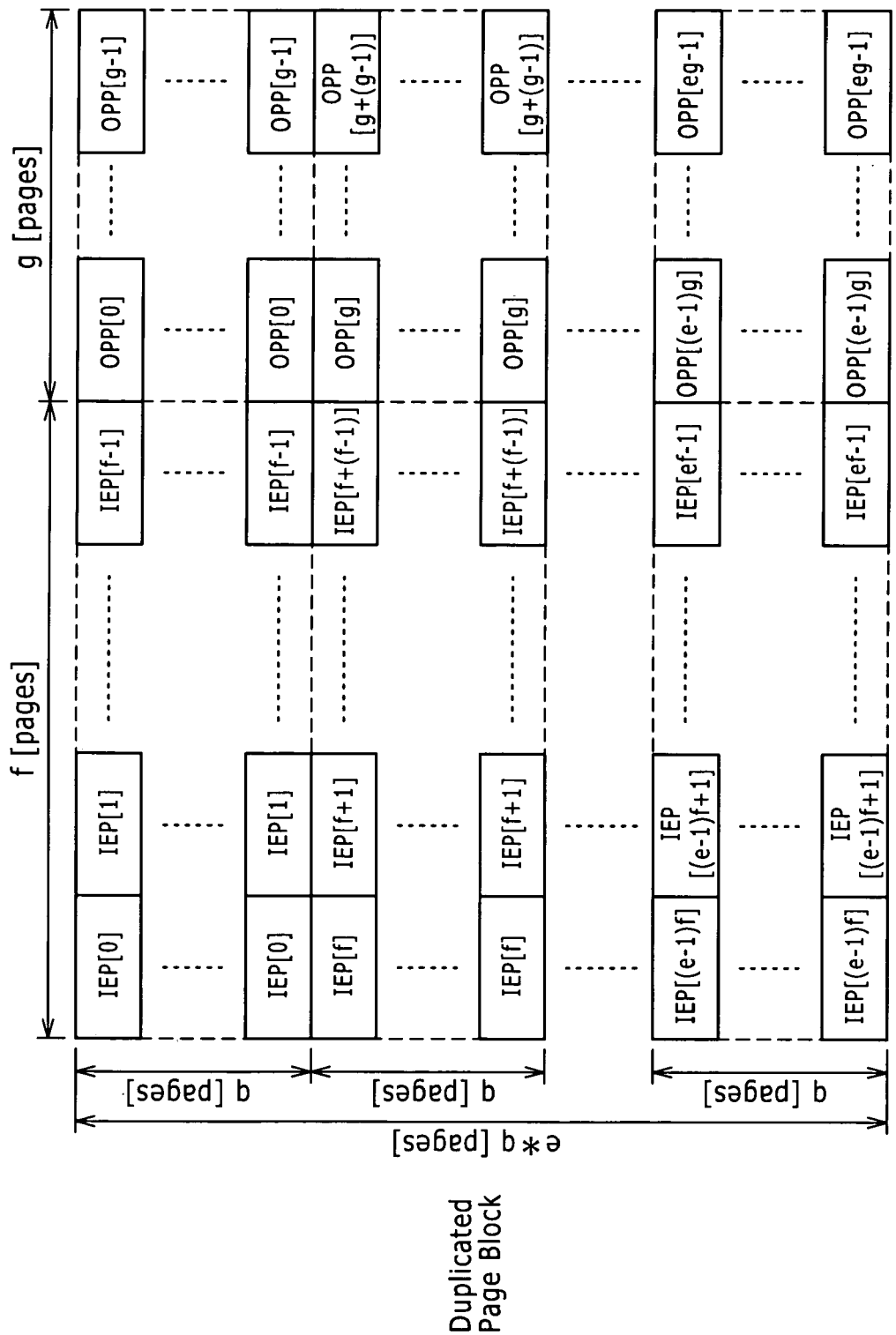
FIG. 21 is a diagrammatic view illustrating a page duplication process.

Each code page block is subject to duplication of each page into a plurality of pages by the page duplication process C3 to generate a duplicated page block (Duplicated Page Block). FIG. 21 shows an example of a duplicated page block that each code page in the code page block is duplicated into "q" pages. Each code page here is one of the inner coded pages IEP[0], IEP[1], . . . , and IEP[ef−1] and the outer parity pages OPP[0], . . . , and OPP[eg−1].

The duplication is performed such that the code pages IEP[0], IEP[1], . . . , and IEP[f−1] and OPP[0], . . . , and OPP[g−1] of the first row in the vertical e pages of FIG. 20 are duplicated so as to make "q" rows (vertical q pages) as seen in FIG. 21.

Similarly, the code pages IEP[f], IEP[f+1], . . . , and IEP[f+(f−1)] and OPP[g], . . . , and OPP[g+(g−1)] in the second row from among the vertical e pages of FIG. 20 are duplicated to as to make q rows (vertical q pages).

Duplication is performed similarly also for the other code pages so that a duplicated page block of vertical e×q pages of FIG. 21 is generated.

Figure 22:
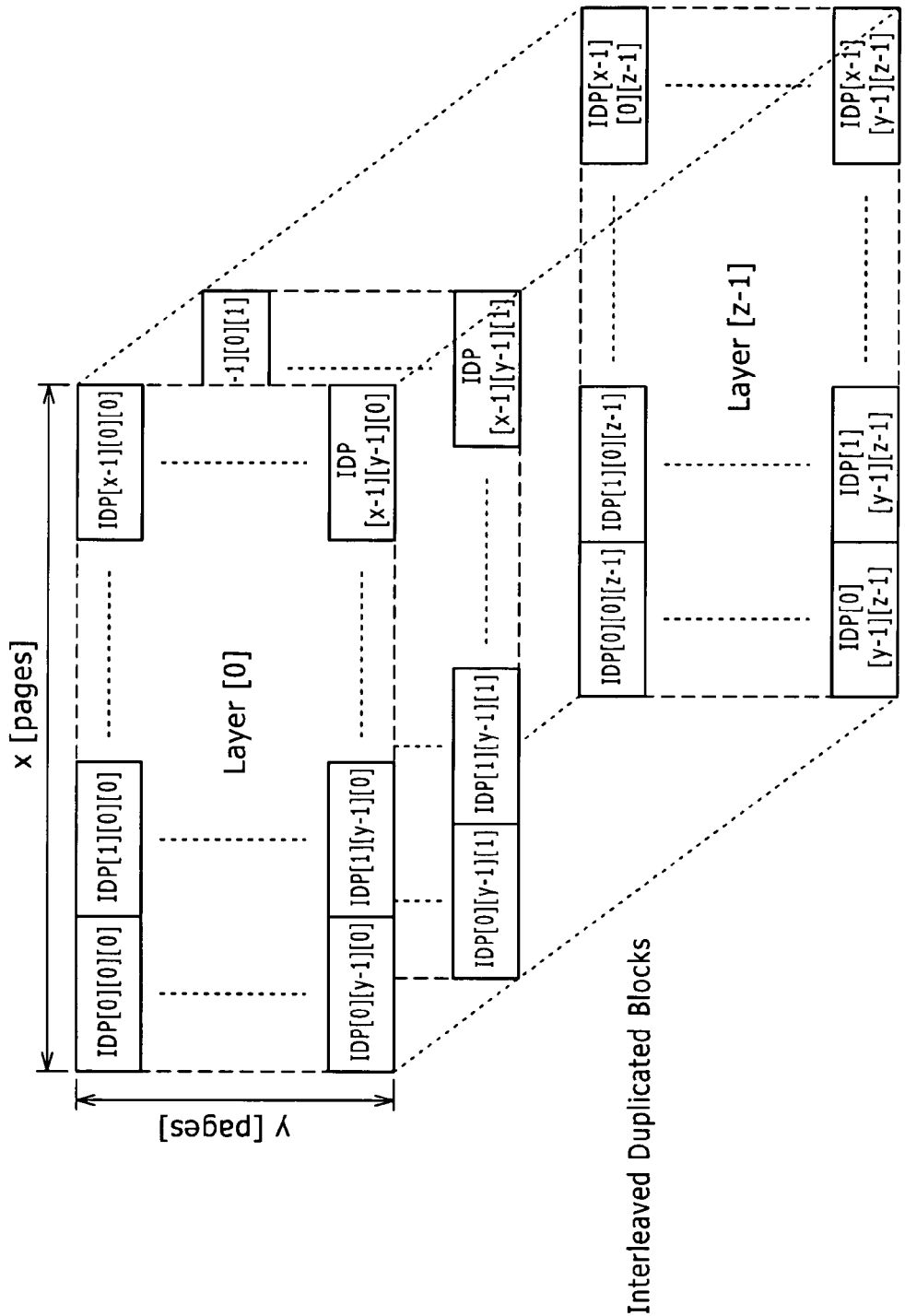
FIG. 22 is a diagrammatic view illustrating an inter-page interleave process.

For the duplicated page block, an interleaving process across pages is performed by the inter-page interleave process C4 so that interleaved page duplicated blocks (Interleaved Duplicated Blocks) shown in FIG. 22 are generated.

FIG. 22 illustrates an example of interleaved page duplicated blocks obtained by executing interleaving and array conversion in x pages in the horizontal direction×y pages in the vertical direction×z pages in the angle duplication direction.

In FIG. 22, each page block in the angle duplication direction is represented as layer, and the layers of the z pages are represented by Layer[0], and Layer[z−1].

In the page block of each layer, interleaved pages are represented by IDP [x] [y] [z]. For example, the pages in the layer Layer[0] are represented by IDP[0] [0] [0], . . . , and IDP[x−1] [y−1] [z−0].

Then, the interleaved page duplicated blocks (Interleaved Duplicated Block) are subject to conversion of the page array back into those of page units to generate outer encoded pages OEP by the page array re-conversion process C5.

Figure 23:
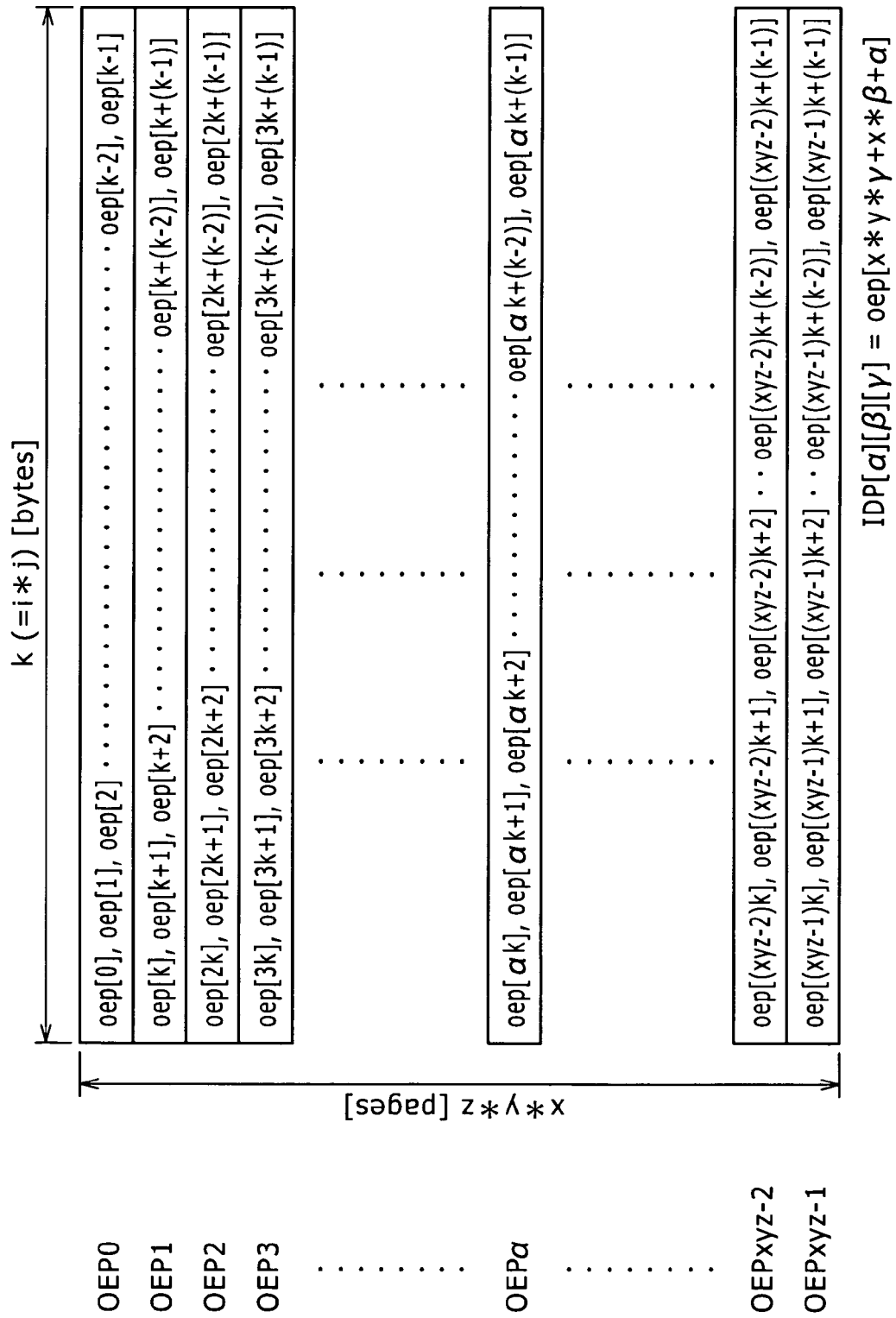
FIG. 23 is a diagrammatic view showing an outer encoded page.

FIG. 23 shows outer encoded pages OEP0, . . . , and OEPxyz−1. This is the example of x·y·z outer encoded pages of k bytes.

Thus, the interleaved page duplicated blocks (Interleaved Duplicated Blocks) of FIG. 22 are subject to page array re-conversion so that an outer encoded page OEP0 which includes outer coded data oep[0], . . . , and oep[k−1], outer encoded page OEP1 including outer coded data oep[k], . . . , and oep[k+(k−1)], . . . , and other outer encoded pages are generated as seen in FIG. 23.

The outer encoded pages OEP0, . . . , and OEPxyz−1 are outputted from the outer page encoder 13 as described hereinabove with reference to FIG. 2 and supplied to the hologram unit matrix generator 14.

6. Hologram Array Generation Process

The outer encoded pages OEP0, OEP1, . . . , and OEPxyz−1 are supplied to the hologram unit matrix generator 14, by which a hologram unit matrix 20 is formed on a hologram material which eventually forms a hologram memory or a master medium.

Figure 24:
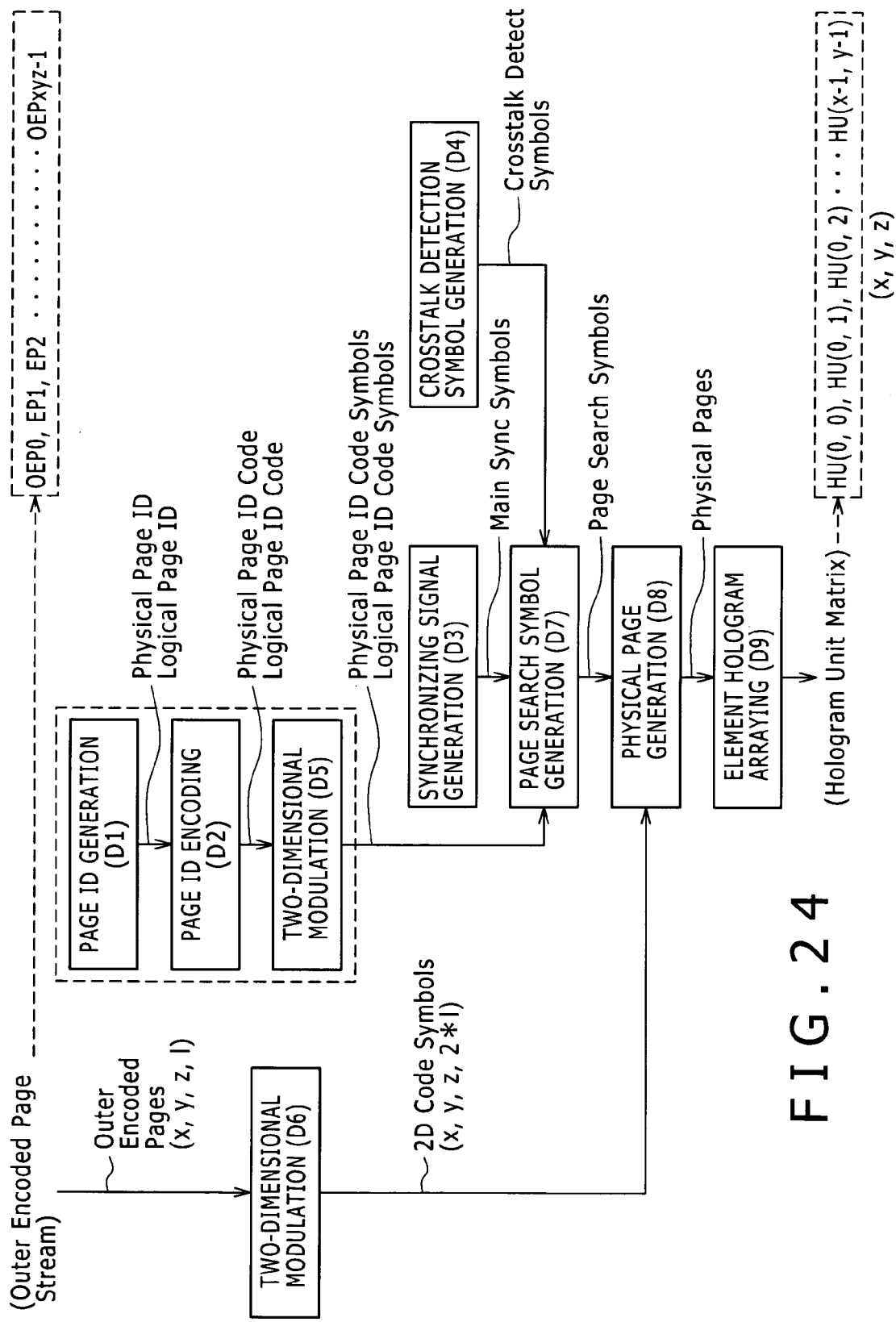
FIG. 24 is a flow diagram illustrating the processes of the hologram unit matrix generation section.

FIG. 24 illustrates processes of the hologram unit matrix generator 14 and illustrates the processes illustrated in FIG. 3D in more detail.

As shown in FIG. 24, the stream data (Outer Encoded Page Stream) of the outer encoded pages OEP0, OEP1, . . . , and OEPxyz−1 from the outer page encoder 13 are converted into two-dimensional code symbols (2D Code Symbols) by the first two-dimensional modulation process D6.

Further, the hologram unit matrix generator 14 generates a physical page ID and a logical page ID by the page ID generation process D1. The physical page ID and the logical page ID are encoded by the page ID encoding process D2 to form a physical page ID code and a logical page ID code, respectively.

Further, the physical page ID code and the logical page ID code are subject to the second two-dimensional modulation process D5 so that they are converted into physical page ID code symbols and logical page ID code symbols, respectively.

The hologram unit matrix generator 14 generates main synchronization symbols (Main Sync Symbols) for detecting a cutting out position of a two-dimensional symbol by the synchronizing signal generation process D3.

Further, the hologram unit matrix generator 14 generates crosstalk detect symbols by the crosstalk detection symbol generation process D4.

The physical page ID code symbols, logical page ID code symbols, main synchronization symbols (Main Sync Symbols) and crosstalk detect symbols are synthesized to generate page search symbols by the page search symbol generation process D7.

The page search symbols and the two-dimensional code symbols (2D Code Symbols) described hereinabove are synchronized to generate physical pages by the physical page generation process D8. Then, the physical pages are recorded as element holograms on the hologram material by the element hologram arraying process D9 thereby to form such a hologram unit matrix 20 on which element holograms HU(0, 0), . . . , and HU(x−1, y−1) as seen in FIG. 2 are recorded. In particular, while the physical pages are successively displayed on the liquid crystal panel 1, element holograms are successively recorded on the hologram material in the form of interference fringes of object light L2 and recording reference light L3 as described hereinabove with reference to FIG. 1A. In this instance, while the irradiation angle of the recording reference light L3 is successively varied, the physical pages are successively recorded to form element holograms in accordance with the angle multiplex method.

The processes by the hologram unit matrix generator 14 are successively described below.

By the two-dimensional modulation process D6, the outer encoded page OEP0, OEP1, . . . , and OEPxyz−1 from the outer page encoder 13 are converted into two-dimensional code symbols (2D Code Symbols).

FIGS. 25A to 25D illustrate two-dimensional modulation processes.

Figure 25:
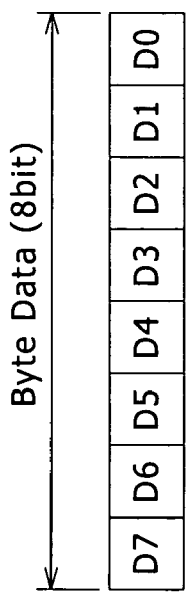
FIG. 25A is a diagrammatic view showing byte data in principle obtained by two-dimensional code symbol modulation from a byte code.
FIG. 25B is a diagrammatic view showing a two-dimensional code symbol in principle obtained by the two-dimensional code symbol modulation from the byte code.
FIG. 25C is a diagrammatic view showing byte data of a particular example of obtained by the two-dimensional code symbol modulation from a byte code.
FIG. 25D is a diagrammatic view showing a two-dimensional code symbol of a particular example obtained by the two-dimensional code symbol modulation from the byte code.

Byte data of a binary code of eight bits of D0 to D7 illustrated in FIG. 25A are converted into a two-dimensional code symbol as a two-dimensional pattern of 4×4 pixels (picture elements) of FIG. 25B. The pixels P0, P1, . . . , and Pf of the two-dimensional pattern are selectively set to a white level or a black level in response to the values of the byte data, that is, 8-bit values of D0 to D7.

As an example, byte data of a value "01011010", that is, "5Ah" ("h" represents a hexadecimal notation), is illustrated in FIG. 25C, and the byte data is converted into a two-dimensional code symbol of FIG. 25D. In the example shown, the three pixels P1, P7, and P9 have the white level, and the other pixels have the black level.

In order to represent byte data of eight bits, $$2^8=256\ [\text{Symbol}]$$

two-dimensional code symbols are necessary. Here, "C" represents combination, and if the number of different combinations of three from among 13 pixels is determined, then $$13C3=286$$

Therefore, if the number of pixels of the two-dimensional code symbol is equal to or greater than 13, then the 256 combinations described above can be represented.

Consequently, since 4×4−13=3, three pixels may be applied to application other than the representation of byte data.

Figure 26:
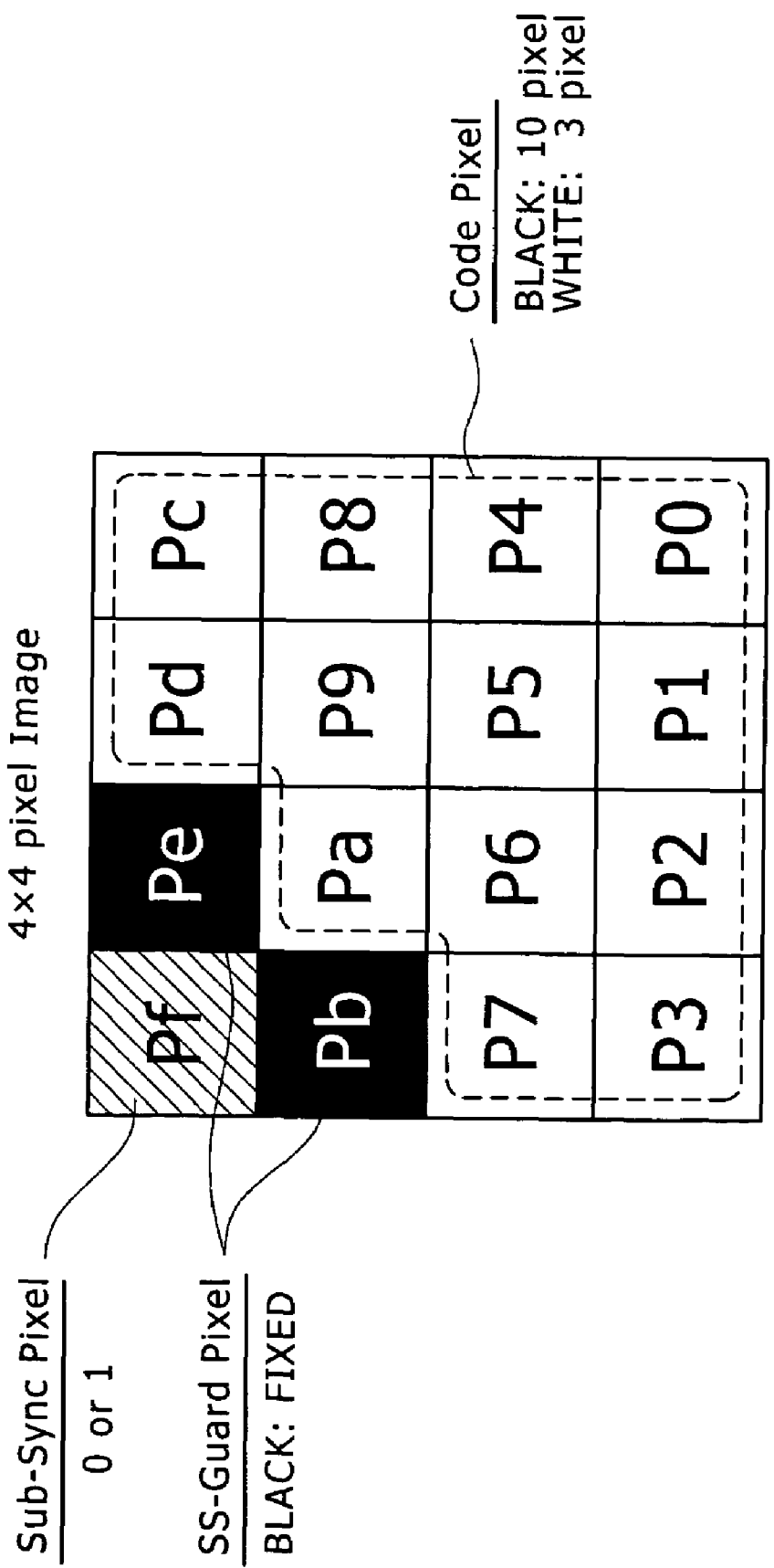
FIG. 26 is a diagrammatic view showing a two-dimensional code symbol.

Therefore, as seen in FIG. 26, from among the 4×4 pixels, the pixel Pf is determined as a Sub-Sync Pixel and allocated to a pixel for an auxiliary synchronization pattern. To the pixel Pf, one of the white level and the black level is allocated upon generation of a group sub sync (Group-SS) hereinafter described.

Meanwhile, the pixels Pb and Pe are determined as sub sync guard pixels (SS-Guard Pixel) for guarding the sub sync pixel. The pixels Pb and Pe normally have the black level.

Then, the remaining 13 pixels, that is, the pixels P0, . . . , and Pa, Pc, Pd are determined as code pixels, and three pixels from among the 13 pixels are set to the white level while 10 pixels are set to the black level in accordance with byte data to be modulated.

Here, since 13C3−2^8=286−256=30 [symbols] 30 non-code symbols can be defined.

Figure 27:
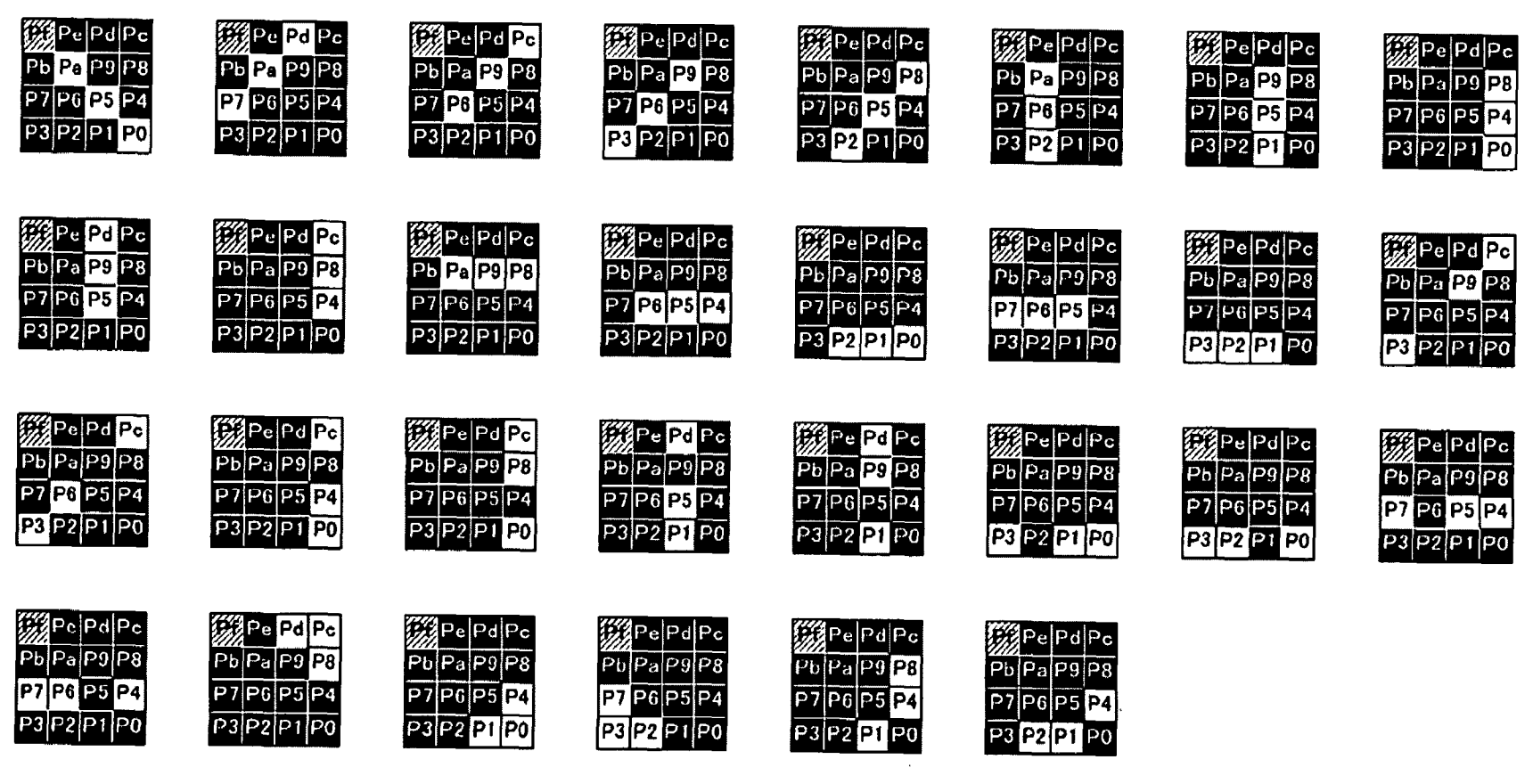

FIG. 27 shows an example of 30 two-dimensional symbols to be excepted in order to restrict the run length.

The 256 two-dimensional patterns other than the 30 two-dimensional patterns to be excepted are allocated to the byte data values "00h" to "FFh".

FIGS. 28, 29, 30, 31, 32, 33, and 34 show two-dimensional patterns individually representing the byte data values "00h" to "FFh". In other words, FIGS. 28 to 34 show a conversion table from byte data into a two-dimensional code symbol. It is to be noted that, in FIGS. 28 to 34, the value "0" of a pixel represents the black level, and the value "1" represents the white level.

For example, the byte data value "5Ah" is allocated to a pattern that the pixels P1, P7, and P9 have the white level as seen in FIG. 30, and therefore, it corresponds to the two-dimensional code symbol of FIG. 25D.

In short, 30 patterns in which white levels appear continuously in the vertical or horizontal direction or an oblique direction are excepted. Then, a two-dimensional code symbol is generated as a pattern selected in the conversion table of FIGS. 28 to 34 in response to the value of binary data of 1 byte from among the remaining 256 patterns.

While data of one byte is converted into a two-dimensional code symbol of 4×4 pixels as described above, a group R (Group-R: Group rotated, rotated group) is generated from four bytes, that is, from four two-dimensional code symbols of 4×4 pixels.

A generation process of a group R is illustrated in FIGS. 35A to 35M.

FIGS. 35A, 35B, 35C, and 35D represent four bytes as byte data A, byte data B, byte data C, and byte data D.

Each byte data is converted into a two-dimensional pattern of 4×4 pixels in accordance with the modulation table described above. Two-dimensional patterns generated in response to the values of the byte data A, B, C, and D are shown in FIGS. 35E, 35F, 35G, and 35H, respectively.

Each of the four two-dimensional patterns is subject to a rotation operation in the following manner.

Two-dimensional pattern of the byte data A, not rotated→FIG. 35I.

Two-dimensional pattern of the byte data B, rotated clockwise by 90°→FIG. 35J.

Two-dimensional pattern of the byte data C, rotated by 180°→FIG. 35K.

Two-dimensional pattern of the byte data D, rotated counterclockwise by 90°→FIG. 35L.

Then, the four symbols of FIGS. 35I, 35J, 35K, 35L, are joined to form the group R of 8×8 pixels shown in FIG. 35M.

While a group R is formed from data of four bytes in such a manner as described above, patterns of four such groups R are synthesized to generate a group sub sync (Group-SS).

FIGS. 36A to 36E illustrate a generation method of a group sub sync.

FIGS. 36A, 36B, 36C, and 36D illustrate four groups R. In particular, FIG. 36A illustrates a group R generated from the byte data A, B, C, and D; FIG. 36B illustrates another group R generated from the byte data E, F, G, and H; FIG. 36C illustrates a further group R generated from the byte data I, J, K, and L; and FIG. 36D illustrates a still further group R generated from the byte data M, N, O, and P.

The four groups R described are joined together to generate a group sub sync of 16×16 pixels as seen in FIG. 36E. At this time, since the white level of the pixel Pf of the two-dimensional pattern of 4×4 pixels regarding the byte data C, H, I, and N is assigned, the four pixels Pf of 2×2 pixels which gather together at the center of the group sub sync as seen in FIG. 16E form a white region of four pixels. This makes a sub sync pattern.

On the other hand, the black level is allocated to the pixels Pf of the other byte data A, B, D, E, F, G, J, K, L, M, O, and P so that the frequency of a white pixel on the group sub sync is suppressed.

Such group sub syncs as described above are successively formed by the two-dimensional modulation process D6 and passed to the physical page generation process D8 of FIG. 24.

In the two-dimensional modulation process D6, the two-dimensional code symbols of 4×4 pixels are generated such that the pixel Pf at a particular corner portion of each two-dimensional code symbol may make a sub synchronization pixel.

Thereafter, regarding four two-dimensional code symbols as a set, a necessary rotational process is performed for each of the four two-dimensional code symbols, whereafter the four two-dimensional code symbols are synthesized to generate a rotational group (group R) of 8×8 pixels. The pixels Pf are positioned at the four corners.

Further, four such rotational groups (groups R) are synthesized such that they are arranged in two rows and in two columns to generate a group sub sync. The group sub sync has a sub synchronization pattern that the four pixels Pf are the white level and are gathered into 2×2 pixels at the center of the arrangement after the synthesis.

Figure 37:
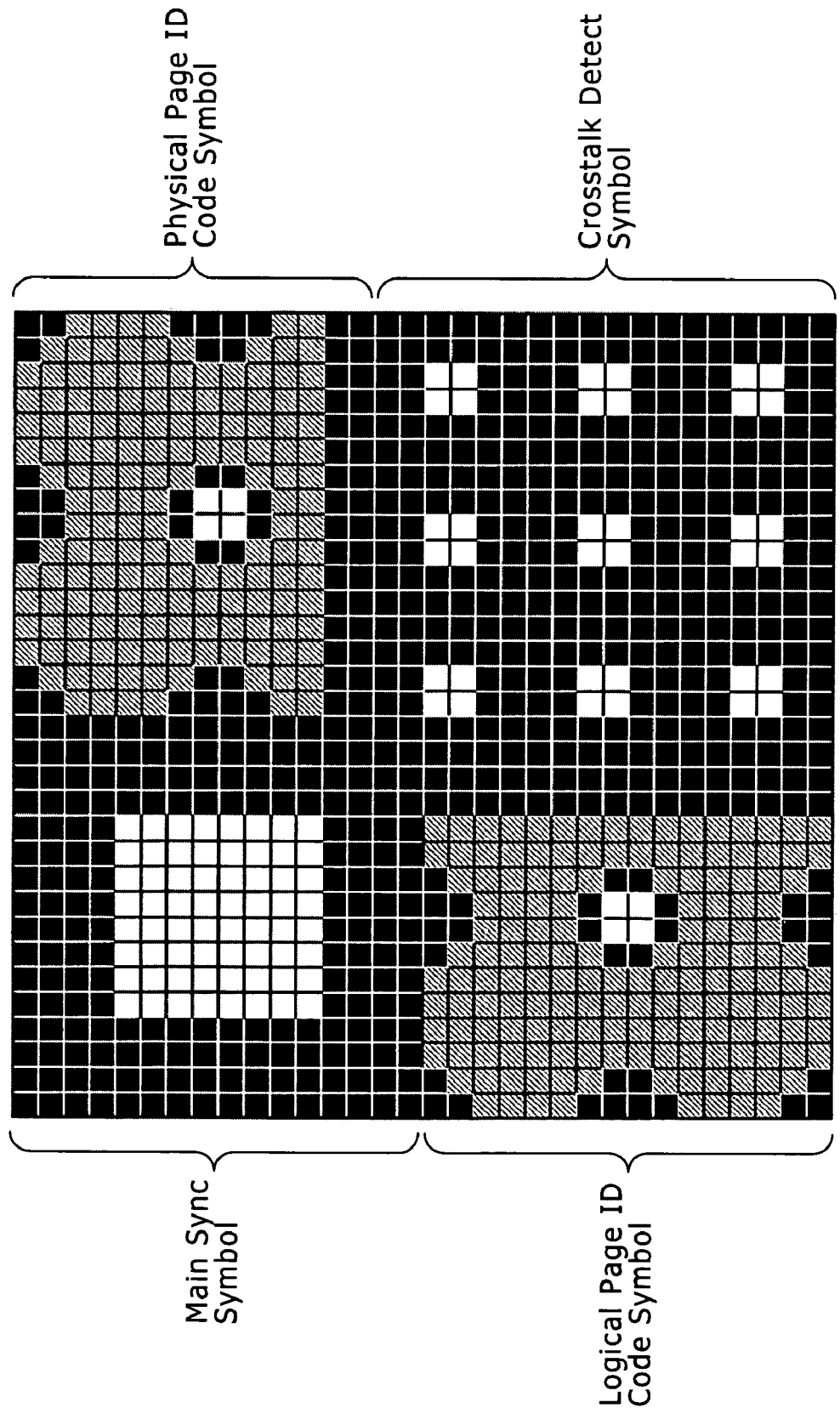
FIG. 37 is a schematic view illustrating a page search symbol.

On the other hand, while a page search symbol is generated by the page search symbol generation process D7 of FIG. 24, the page search symbol is formed by synthesis of physical page ID code symbols, logical page ID code symbols, main synchronization symbols (Main Sync Symbols) and crosstalk detect symbols as seen in FIG. 37. The page search symbol is formed from 32×32 pixels, that is, from a number of pixels equal to the total number of the four group sub syncs.

While the individual symbols in the page search symbol are hereinafter described, by the physical page generation process D8, the page search symbol and the group sub sync are synthesized to form a group main sync (Group-MS), and a physical page is formed from a set of such group main syncs.

Figure 38B:
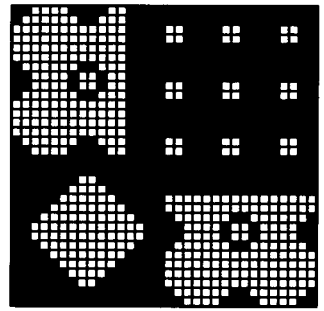
FIG. 38B is a schematic view illustrating a page search symbol where the group main sync is an odd-numbered group main sync.
Figure 38A:
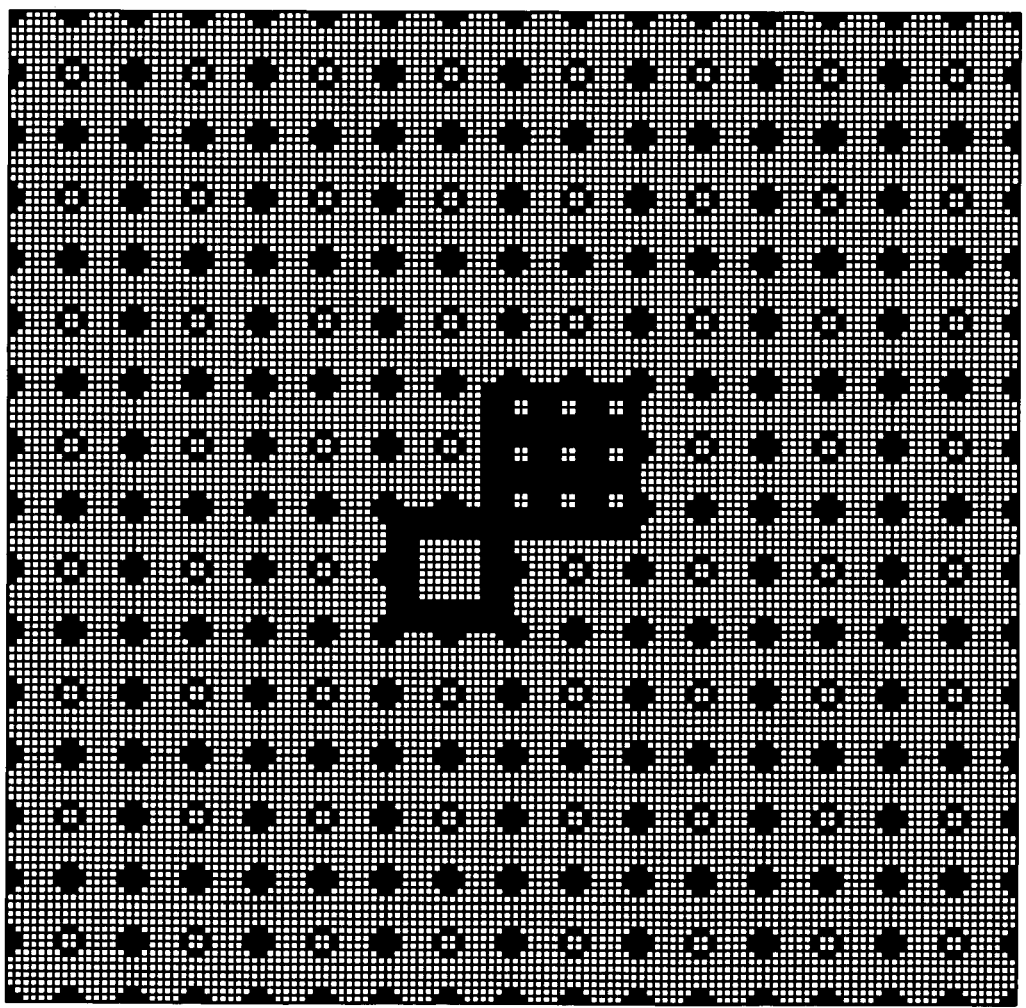
FIG. 38A is a schematic view illustrating a group main sync where it is an even-numbered group main sync.

A group main sync is shown in FIG. 38A. The group main sync is formed from group sub syncs arrayed in eight horizontal rows and eight vertical columns.

However, in this instance, although 64 group sub syncs can be arrayed, 2×2 group sub syncs (32×32 pixels) at an arbitrary position are set blank, and a page search symbol is inserted at the position. FIG. 38 illustrates an example that such a page search symbol as shown in FIG. 37 is disposed at pixels (32×32 pixels) of four central group sub syncs.

In particular, while a page search symbol having a main synchronization symbol is disposed in an array of group sub syncs, the page search symbol is formed from a number of pixels equal to an integral number of times the number of group sub syncs of 16×16 pixels.

The group main sync configured in such a manner as described above is formed from 128×128 pixels and particularly from 60 group sub syncs and one page search symbol.

Since one group sub sync is formed from 16×16 pixels and includes 1-byte data represented by 16 pixels for 16 bytes as described hereinabove, the group main sync includes data of 16×60=960 bytes (960 symbols).

It is to be noted that, in the group main sync, the positions of the center of gravity of the main synchronization symbols and the sub synchronization patterns (four pixels of the white level at the center of the group sub syncs) have the regularity in both of the vertical direction and the horizontal direction.

Such group main syncs are arrayed on a two-dimensional plane to form a physical page. An example of a configuration of a physical page is shown in FIG. 39.

FIG. 39 illustrates an example that group main synchs Group-MS[0] [0], . . . , and Group-MS[p−1] [q−1] are arranged such that p groups are arranged horizontally and q groups are arranged vertically to form a physical page.

In the physical page generation section D8 of FIG. 24, such physical pages are generated and passed to the element hologram arraying process D9. In other words, the physical pages are displayed as the two-dimensional page data of FIG. 1 on the liquid crystal panel 1.

It is to be noted that, in the physical page of FIG. 39, "EVEN" or "ODD" is applied to each of the group main syncs such that the group main sync is an even-numbered group main sync or an odd-numbered group main sync. Further, odd-numbered group main syncs and even-numbered group main syncs are arranged alternately in both of the vertical direction and the horizontal direction.

An even-numbered group main sync and an odd-numbered group main sync are different in the main synchronization symbols in the page search symbol. For example, since the page search symbol of FIG. 37 is inserted in an even-numbered group main sync, the group main sync becomes such as shown in FIG. 38A. On the other hand, such a page search symbol as shown in FIG. 38B is inserted in each odd-numbered group main sync. As can be recognized from the comparison between FIGS. 38A and 38B, the group main syncs are different in the pattern of the main synchronization symbol from each other.

Actual examples of the physical page are shown in FIGS. 40, 41, 42, 43, and 44. In particular, FIGS. 40 to 44 show physical pages that the horizontal and vertical group numbers p and q are set to p=4 and q=3 such that group main syncs of four groups are arrayed in the horizontal direction and group main syncs of three groups are arranged in the vertical direction. Since one group main sync includes 128×128 pixels, the physical pages are formed from 512×384 pixels.

Figure 40:
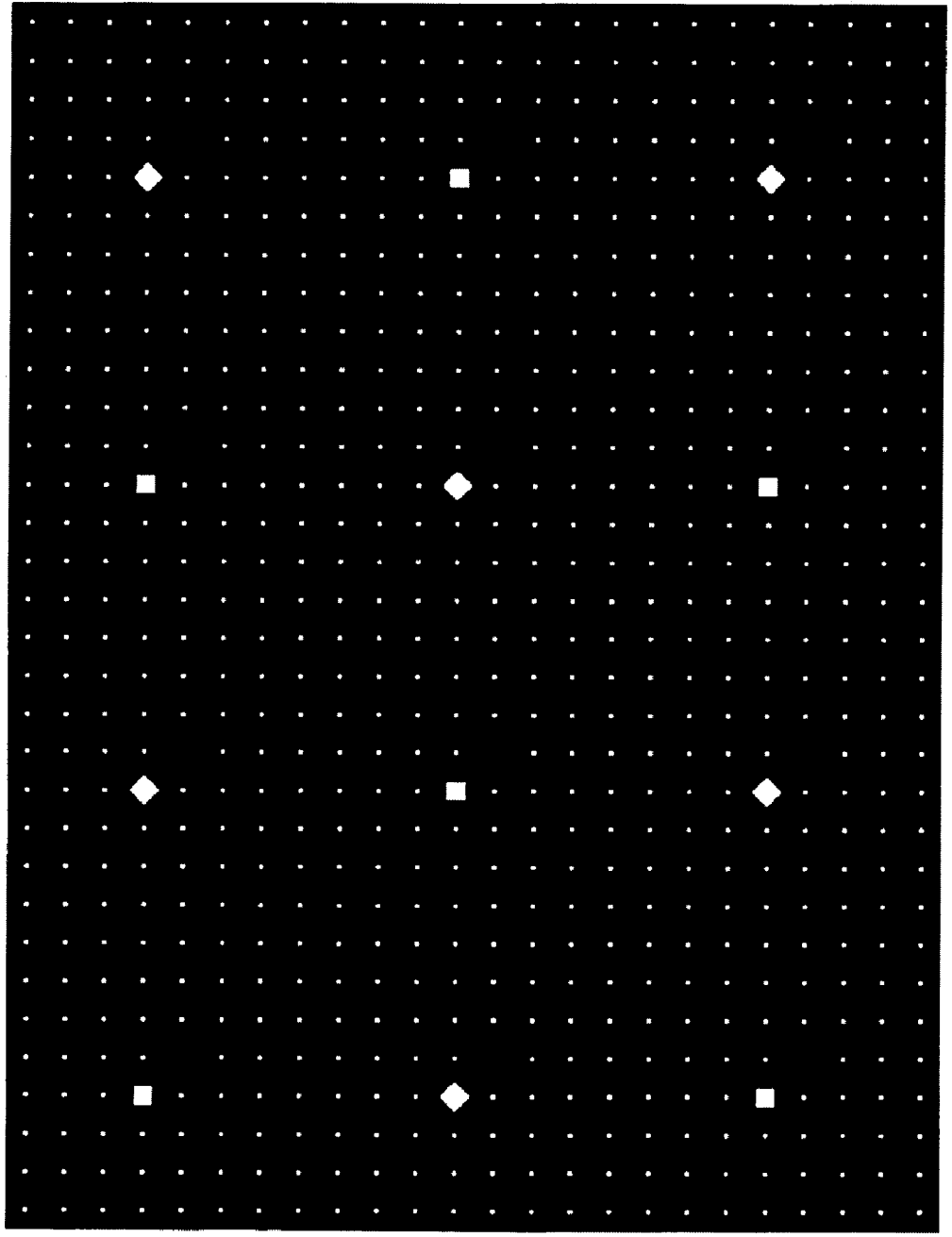
FIG. 40 is a schematic view showing a physical page for a preamble.

FIG. 40 shows an example of a preamble page.

Figure 41:
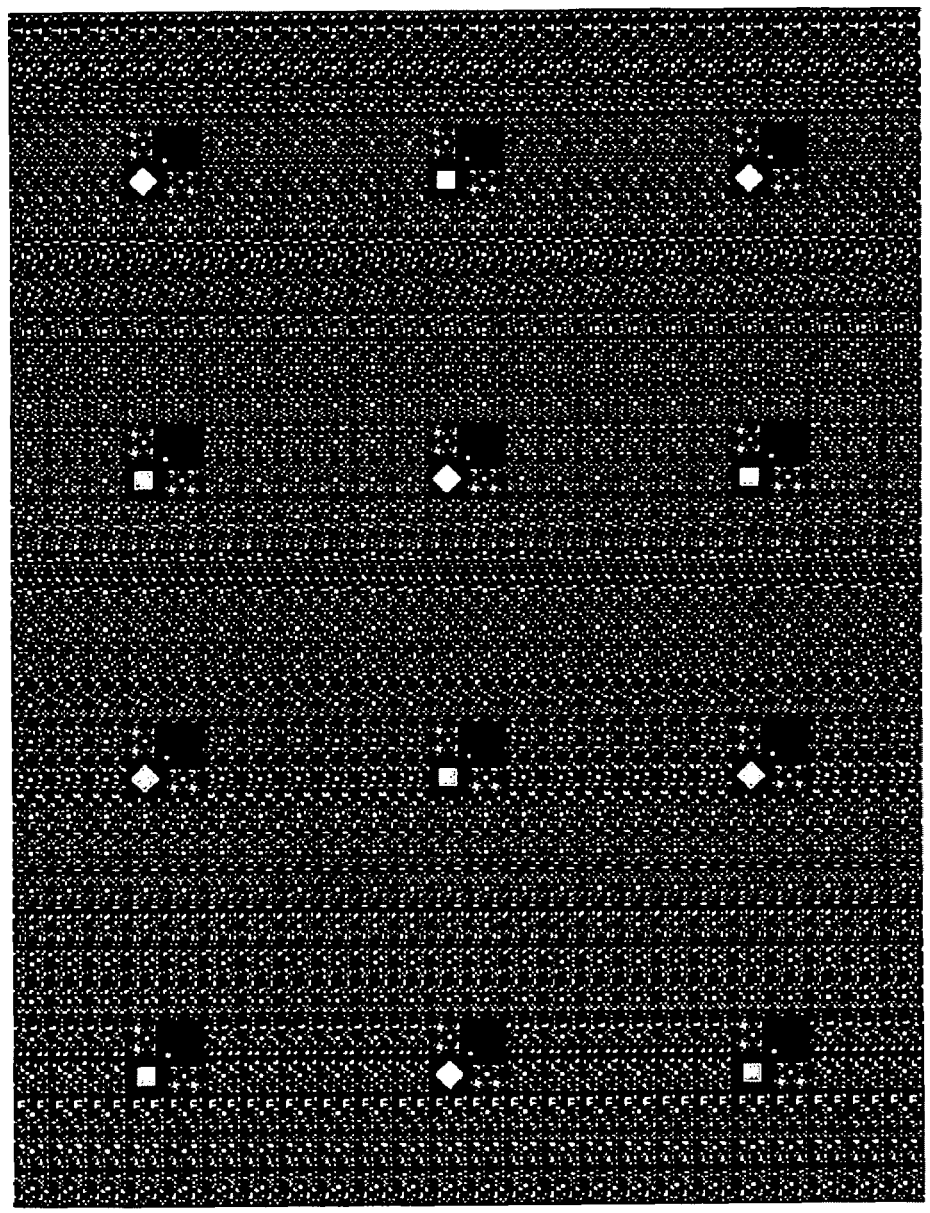
FIG. 41 is a schematic view showing a physical page for increment data.

FIG. 41 illustrates an example of increment data modulation.

Figure 42:
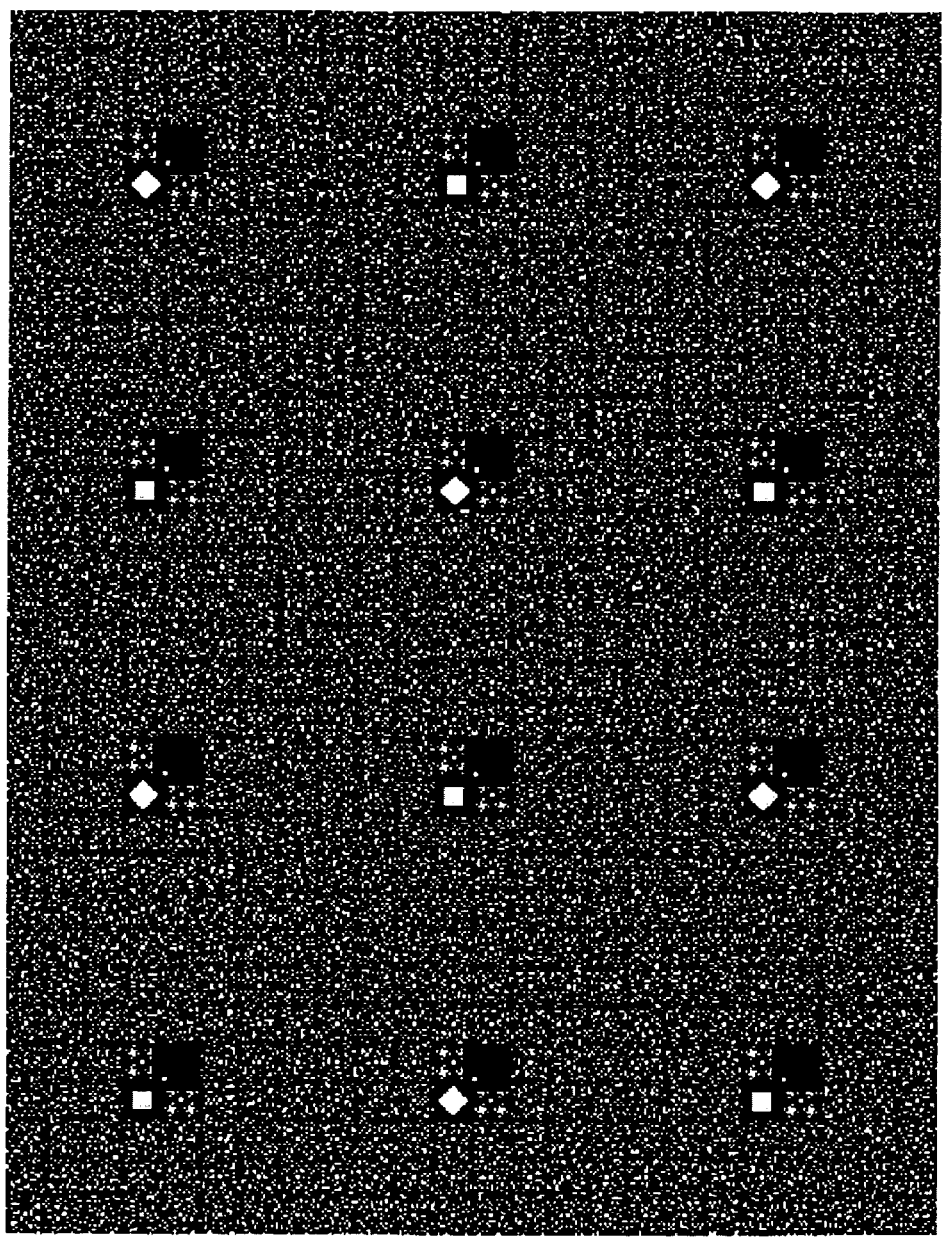
FIG. 42 is a schematic view showing a physical page for random data.

FIG. 42 illustrates an example of random data modulation.

Figure 43:
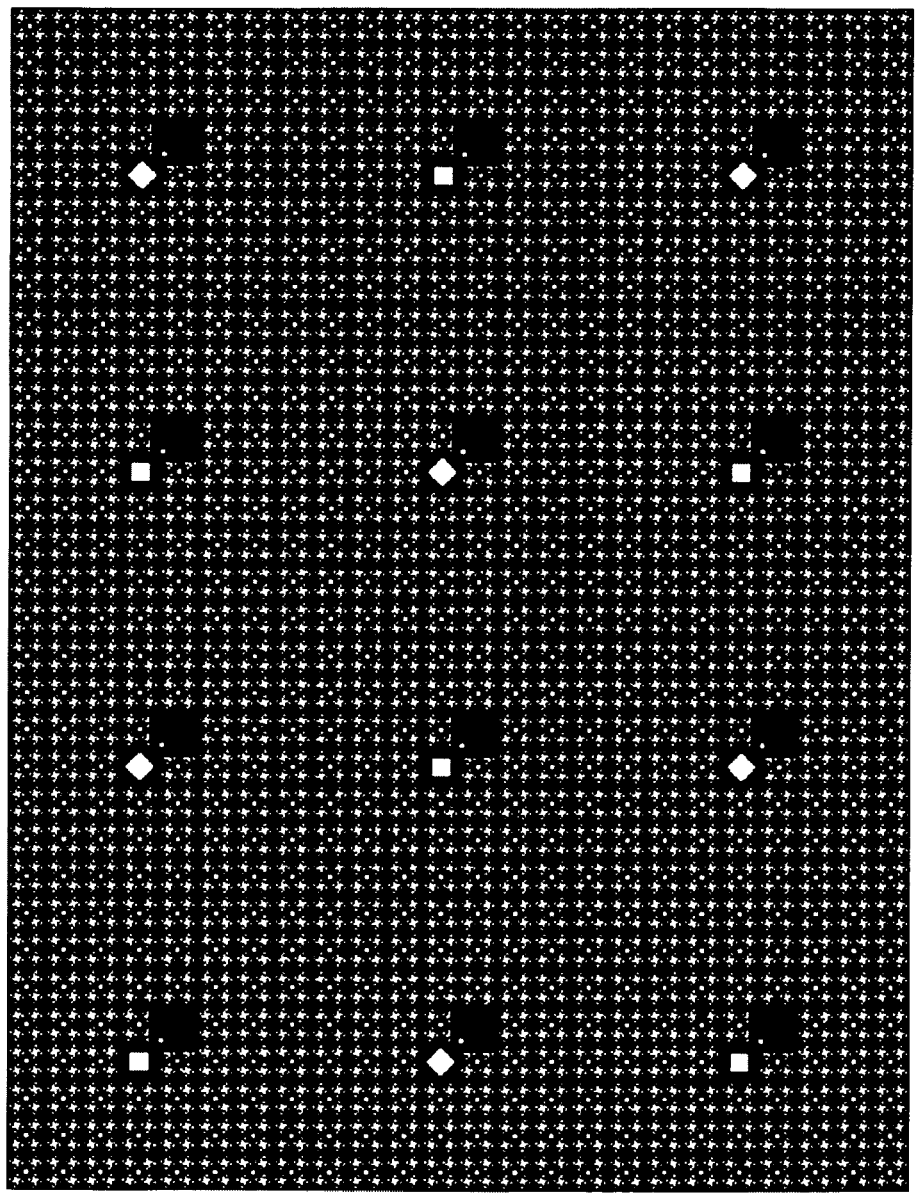
FIG. 43 is a schematic view showing a physical page for ooh fixed data.

FIG. 43 illustrates an example of 00h fixed data modulation.

Figure 44:
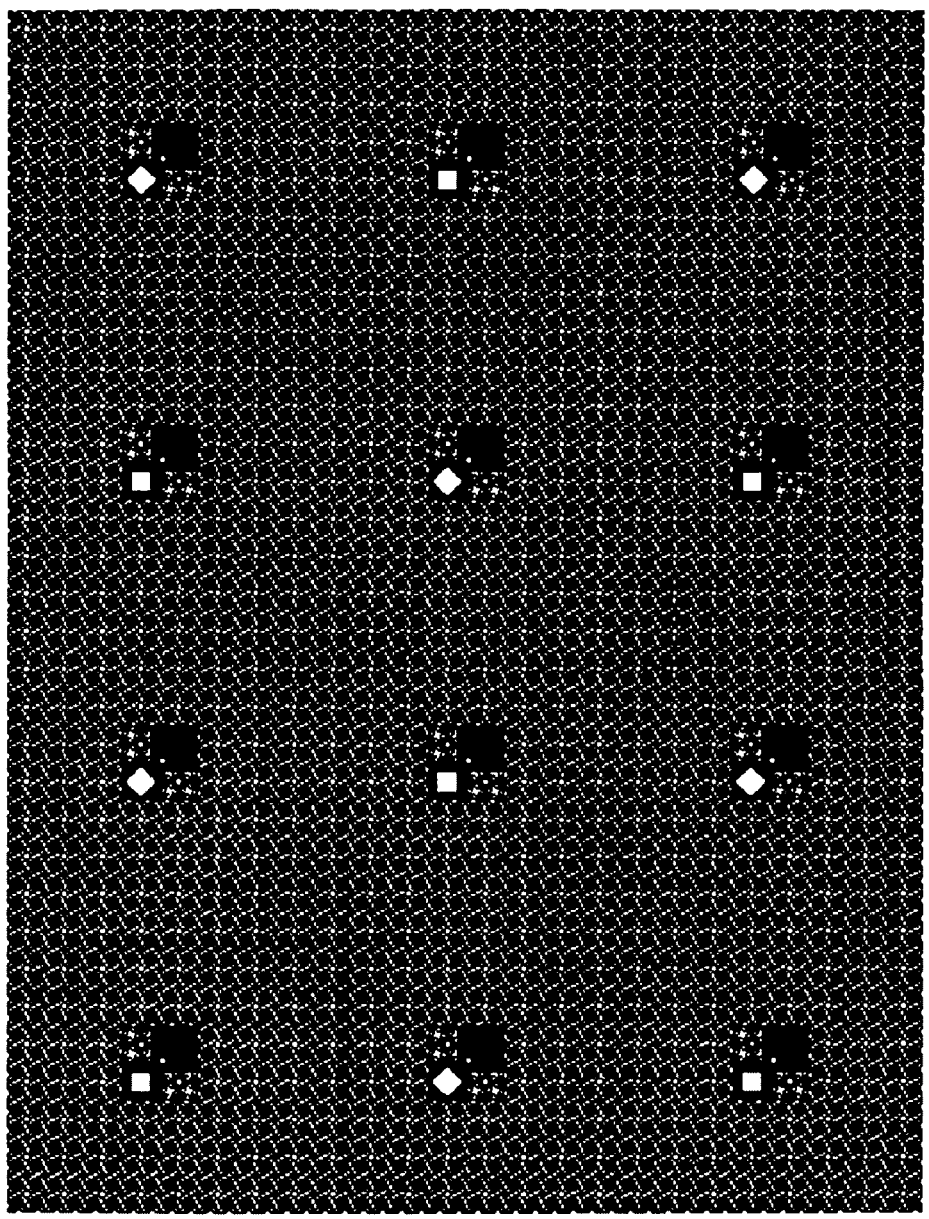
FIG. 44 is a schematic view showing a physical page for FFh fixed data.

FIG. 44 illustrates an example of FFh fixed data modulation.

Such physical pages as described above are successively displayed on the liquid crystal panel 1 as described hereinabove in FIG. 1A, and object light L2, which is to make an image of the physical page, and recording reference light L3 interfere with each other. Consequently, interference fringes are recorded as one element hologram. As the physical pages are recorded successively as element holograms, such element holograms are formed as indicated by a mark ● in FIG. 45 on a plane of the hologram material. A hologram unit matrix that element holograms are disposed two-dimensionally in this manner is formed.

Now, a main synchronization symbol formed by the synchronizing signal generation process D3 of FIG. 24 is described. The main synchronization symbol included in a page search symbol as described above is used for different applications between a group main sync for an odd-numbered group main sync and an even-numbered group main sync.

Figure 46B:
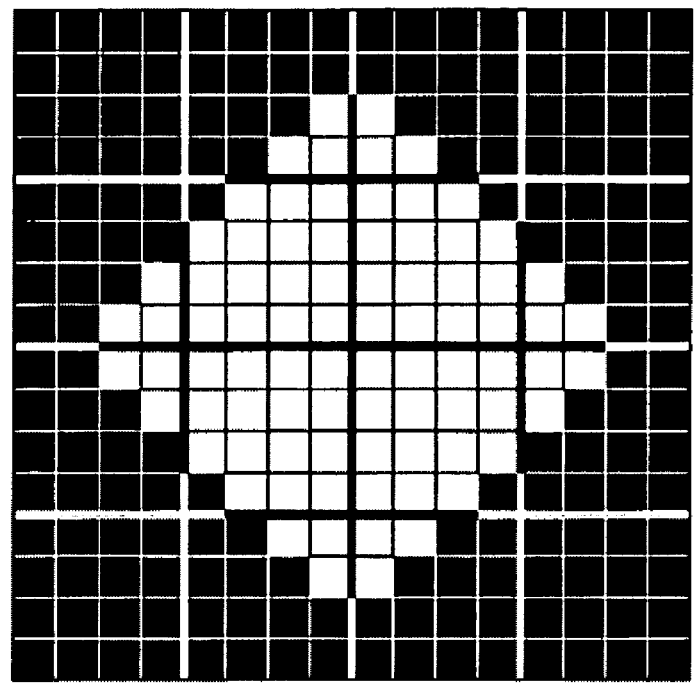
FIG. 46B is a schematic view showing a main synchronization symbol added to an odd-numbered group main sync.
Figure 46A:
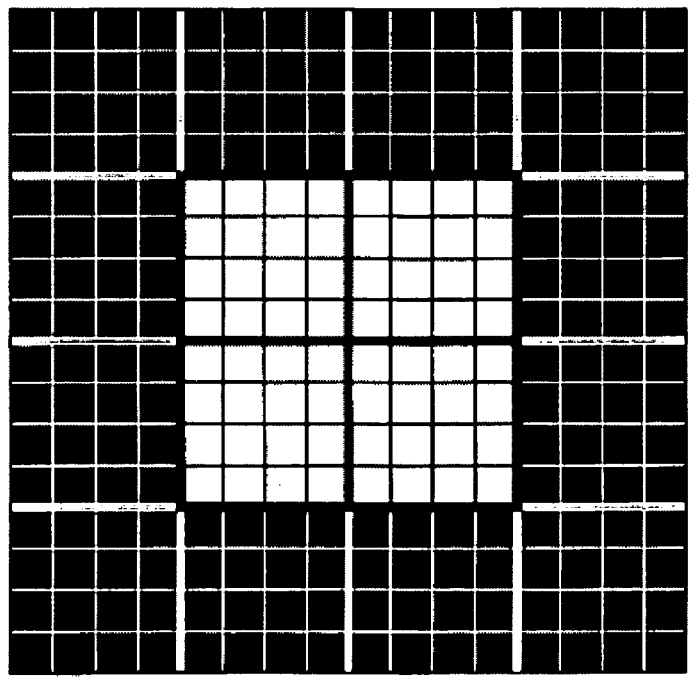
FIG. 46A is a schematic view showing a main synchronization symbol added to an even-numbered group main sync.

FIG. 46A shows a main synchronization symbol added to an even-numbered group main sync, and FIG. 46B shows a main synchronization symbol added to an odd-numbered group main sync.

The main synchronization symbol of an even-numbered group main sync of FIG. 46A has a two-dimensional pattern of 16×16 pixels that 8×8 pixels at the center have the white level while all of the surrounding pixels have the black level.

The main synchronization symbol of an odd-numbered group main sync of FIG. 46B has a two-dimensional pattern. The white level is allocated to those pixels in a two-dimensional pattern of 16×16 pixels such that the pixels are arranged in a diamond shape at a central portion of the pattern.

In this manner, the main synchronization symbol is formed from a white level pixel group having a size greater than a two-dimensional code symbol of 4×4 pixels.

FIG. 47 illustrates a reproduction waveform of even- and odd-numbered main synchronization symbols. FIG. 47 illustrates, as scanning loci S1, S2, and S3, loci along which reproduction reference light L4 is irradiated upon reproduction, and illustrates reproduction waveforms (detection waveforms of the white/black patterns) obtained corresponding to the scanning loci S1, S2, and S3 as reproduction waveforms P1, P2, and P3, respectively. In the reproduction waveforms, a signal of the H level is obtained from a pixel of the white level.

As can be seen from FIG. 47, different reproduction waveforms are obtained in accordance with the scanning position depending upon the patterns of the even- and odd-numbered main synchronization symbols. In other words, a reproduction position (scanning position) with respect to a recording pattern can be detected by deciding the width of the H level of a reproduction waveform from each main synchronization symbol.

It is to be noted that, while two different examples of a main synchronization symbol are illustrated in FIGS. 46A and 46B, three or more main synchronization patterns may be set and allocated to different group main syncs. Further, the two-dimensional patterns as the main synchronization symbols are not limited to those of FIGS. 46A and 46B. Any pattern types for main synchronization symbols may be set as two-dimensional patterns from which different reproduction waveforms are obtained depending upon different scanning loci as described above.

Now, a physical page ID code symbol and a logical page ID code symbol generated by the page ID generation process D1, page ID encoding process D2, and two-dimensional modulation process D5 of FIG. 24 are described.

FIGS. 48A to 48C illustrate a process of a logical page ID. The logical page ID is an identification number allocated uniquely to each of the intra-encoded pages IEP (IEP [0], IEP [1], . . . , and IEP [ef−1]) and the outer parity pages OPP (OPP[0], . . . , and OPP [eg−1]). The intra-encoded pages IEP and the outer parity pages OPP form a code page block shown in FIG. 20 before the page duplication process C3 by the outer page encoder 13 is performed.

FIG. 48A illustrates an example of a logical page ID where a unique address of eight bytes is added. Reference characters LID[0], . . . , and LID[7] denote 1-byte values which form the logical page ID. An address value of the eight bytes of LID[0], . . . , and LID[7] is generated by the page ID generation process D1.

A parity is added to the address value of eight bytes by the page ID encoding process D2. FIG. 48B illustrates an example that a parity (LIDP[0], . . . , and LIDP[3]) of four bytes to be used for error detection and correction is added to the logical page ID of eight bytes.

The logical page ID code to which the parity is added is converted into a logical page ID code symbol by the second two-dimensional modulation process D5. FIG. 48C illustrates the logical page ID code symbol.

The values of the bytes LID[0], . . . , and LID[7] and LIDP[0], . . . , and LIDP[3] are each converted into a two-dimensional pattern of 4×4=16 pixels in accordance with the values and arrayed in a logical page ID section as a region of horizontal 12 pixels and vertical 16 pixels. Further, a region for horizontal four pixels and vertical 16 pixels corresponding to four symbols at the right end in FIG. 48C is formed as a black guard section that all pixels have the black level. The black guard section is a region for assuring a symbol distance from a crosstalk detection symbol which is positioned adjacent thereto as seen in FIG. 37.

Figures 49A, 49B, 49C:
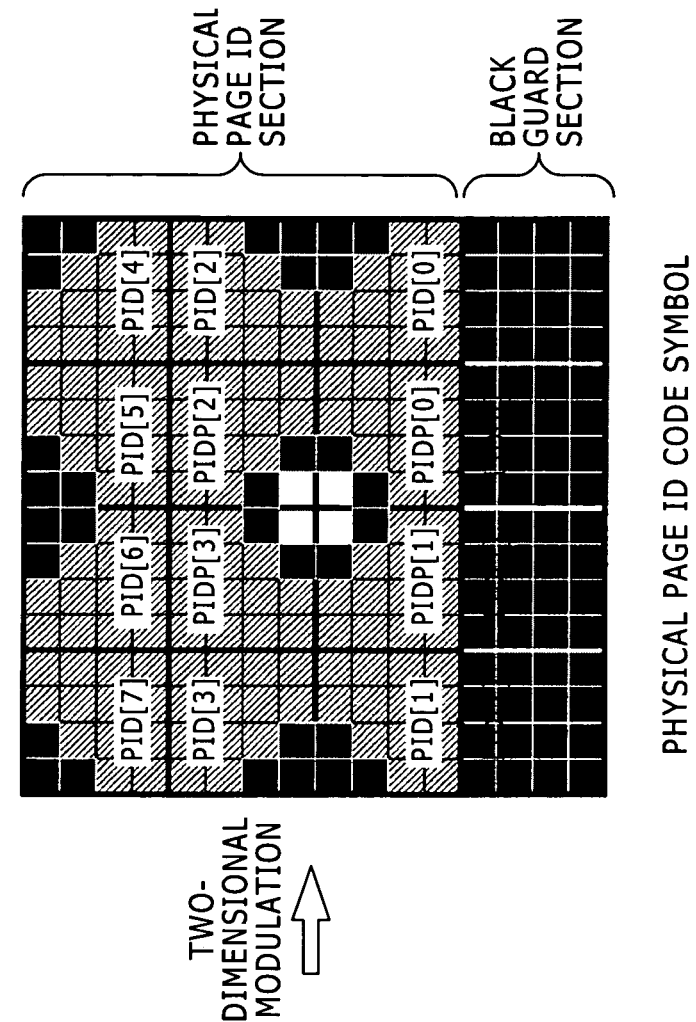
FIG. 49A is a diagrammatic view illustrating a physical page ID to be incorporated in a physical page ID code symbol.
FIG. 49B is a diagrammatic view illustrating a physical page ID code to be incorporated in the physical page ID code symbol to which the parity is added.
FIG. 49C is a schematic view showing a physical page ID code symbol.

FIGS. 49A to 49C illustrate a process of a physical page ID. The physical page ID is an identification number allocated uniquely to each of the intra-encoded pages IEP (IEP[0], IEP[1], . . . , and IEP[ef−1]) and the outer parity pages OPP (OPP[0], . . . , and OPP[eg−1]) which form a duplicated page block shown in FIG. 21 after the page duplication process C3 by the outer page encoder 13 is performed.

In other words, physical page IDs independent of each other are applied to pages duplicated by the page duplication process C3 even if the pages are logically quite same.

FIG. 49A illustrates an example of a physical page ID where a unique address of eight bytes is added. Reference characters PID[0], . . . , and PID[7] denote 1-byte values which form the physical page ID. An address value of the eight bytes of PID[0], . . . , and PID[7] is generated by the page ID generation process D1.

A parity is added to the address value of eight bytes by the page ID encoding process D2. FIG. 49B illustrates an example that a parity (PIDP[0], . . . , and PIDP[3]) of four bytes to be used for error detection and correction is added to the physical page ID of eight bytes.

The physical page ID code to which the parity is added is converted into a physical page ID code symbol by the two-dimensional modulation process D5. FIG. 49C illustrates the physical page ID code symbol.

The values of the bytes PID[0], . . . , and PID[7] and PIDP[0], . . . , and PIDP[3] are each converted into a two-dimensional pattern of 4×4=16 pixels in accordance with the values and arrayed in a physical page ID section as a region of horizontal 16 pixels and vertical 12 pixels. Further, a region of horizontal 16 pixels and vertical 4 pixels corresponding to four symbols at the lower end in FIG. 49C is formed as a black guard section that all pixels have the black level. The black guard section is a region for assuring a symbol distance from a crosstalk detection symbol which is positioned adjacent thereto as seen in FIG. 37.

Now, a crosstalk detection symbol generated by the crosstalk detection symbol generation process D4 of FIG. 24 is described.

Figures 50A, 50B:
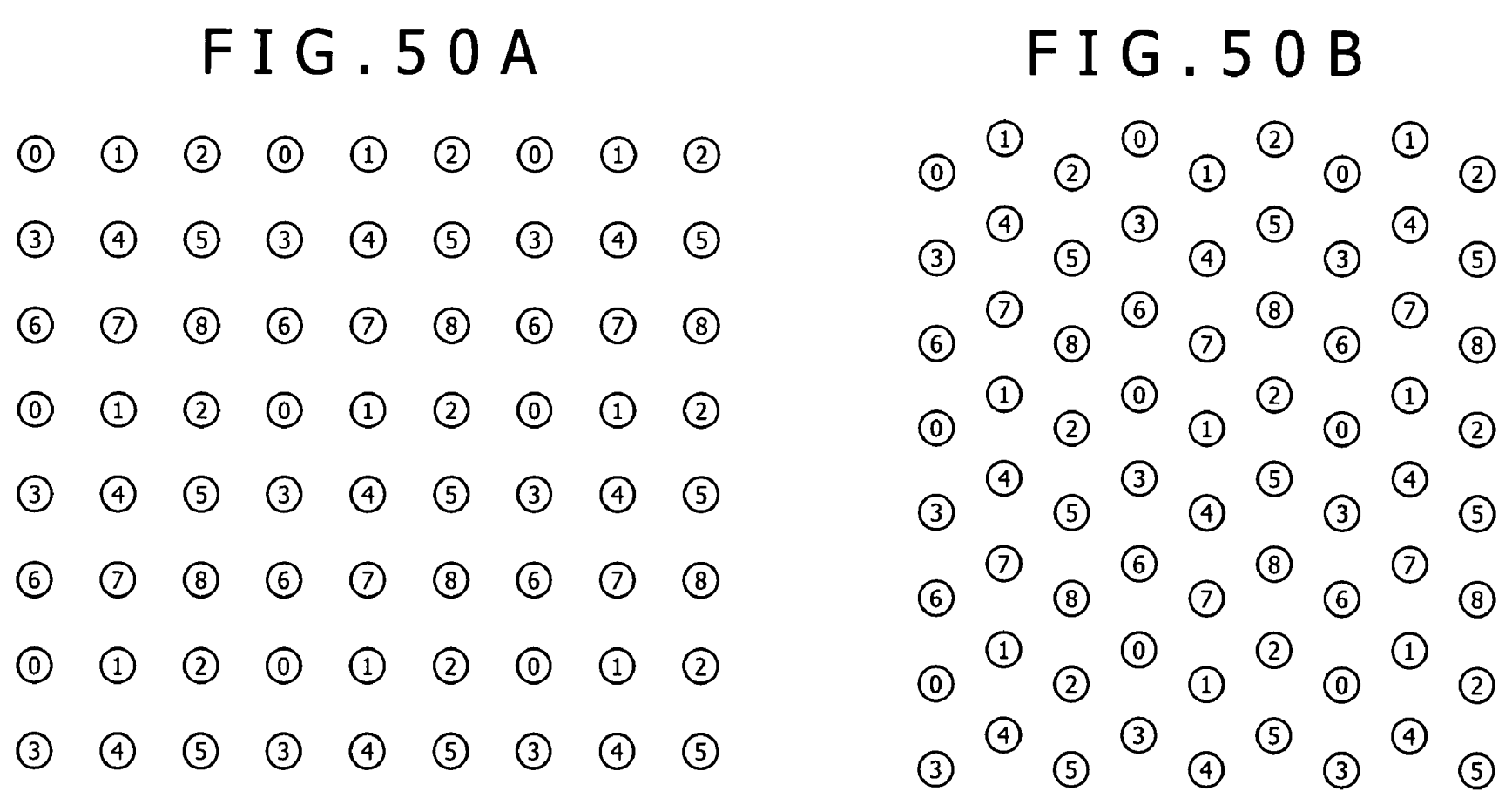

FIGS. 50A and 50B illustrate embedding rules of a crosstalk detection symbol number into each of element holograms arrayed in a hologram unit matrix. In FIGS. 50A and 50B, one element hologram is indicated by a mark ○, and a numeral in each mark ○ represents a crosstalk detection symbol number. The crosstalk detection symbol number indicates a type of a pattern of the crosstalk detection symbol.

First, as an arraying method of element holograms, two types are available including a tetragonal lattice of FIG. 50A and an orthorhombic lattice of FIG. 50B. To the two-dimensional arrays, nine different crosstalk detection symbol numbers from zero to eight are allocated as illustrated in FIGS. 50A and 50B.

Figure 51:
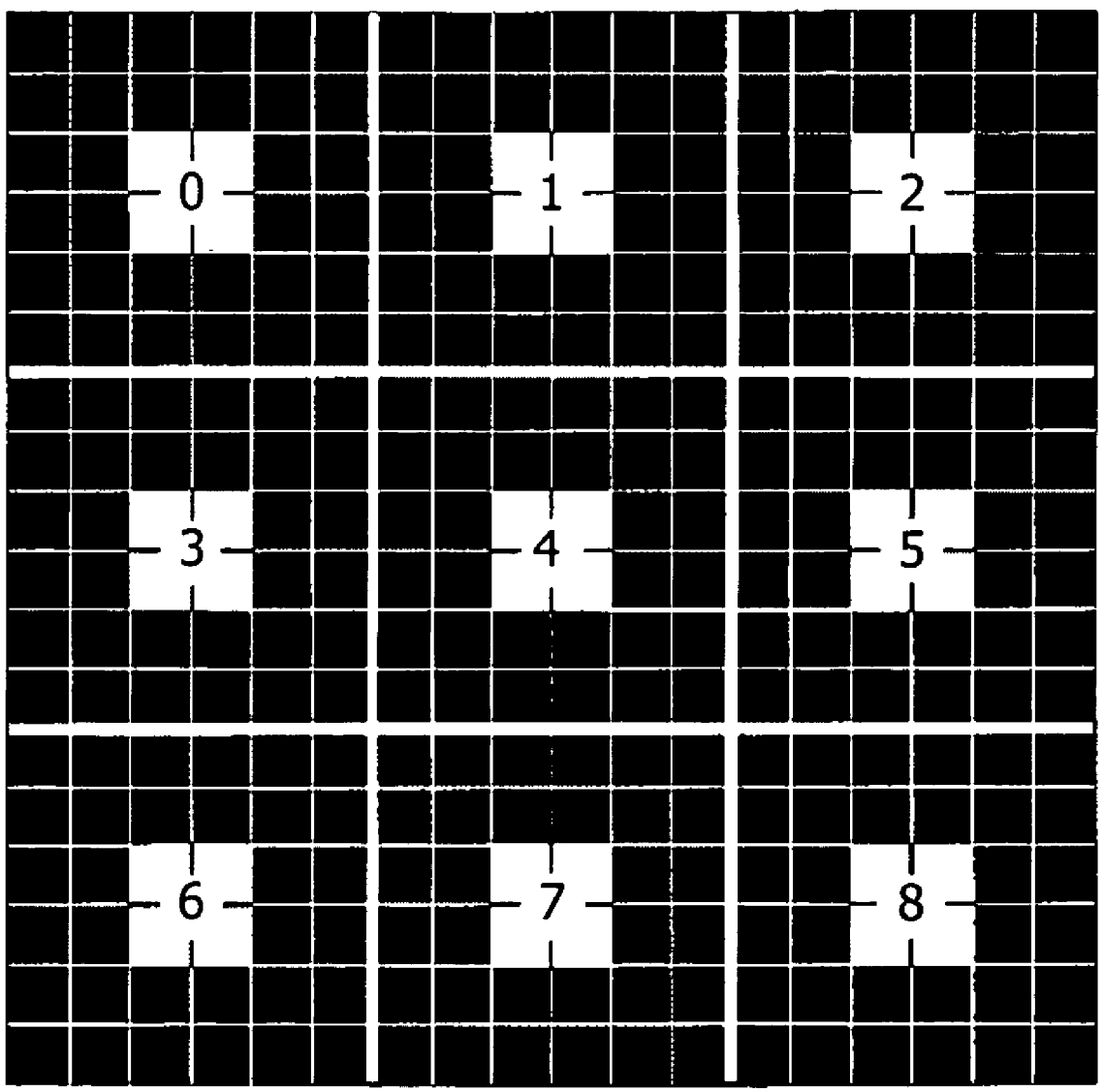
FIG. 51 is a schematic view showing a crosstalk detection symbol.

FIG. 51 shows a crosstalk detection symbol. The crosstalk detection symbol is formed from horizontal 18 pixels×vertical 18 pixels.

It is to be noted that, as can be seen from FIG. 37, horizontal 16 pixels×vertical 2 pixels for two rows at an upper end and horizontal 2 pixels×vertical 16 pixels at an left end of the crosstalk detection symbol overlap with the black guard portions of a logical page ID code symbol and a physical page ID code symbol, respectively. Consequently, the page search symbol has a pattern of 32×32 pixels.

The horizontal 18 pixels×vertical 18 pixels have totaling nine regions of 6×6 pixels in the horizontal three regions× vertical 3 regions.

In the crosstalk detection symbol of FIG. 51, four pixels at the center of each of the nine 6×6 pixels in the horizontal 18 pixels×vertical 18 pixels have the white level so as to indicate a crosstalk detection symbol number.

While a crosstalk detection symbol number is allocated to one element hologram as described hereinabove with reference to FIG. 50, each crosstalk detection symbol is represented by the pattern of FIG. 51 such that only the four pixels in a region corresponding to the crosstalk detection symbol number have the white level while all of the other pixels have the black level.

Figure 52:
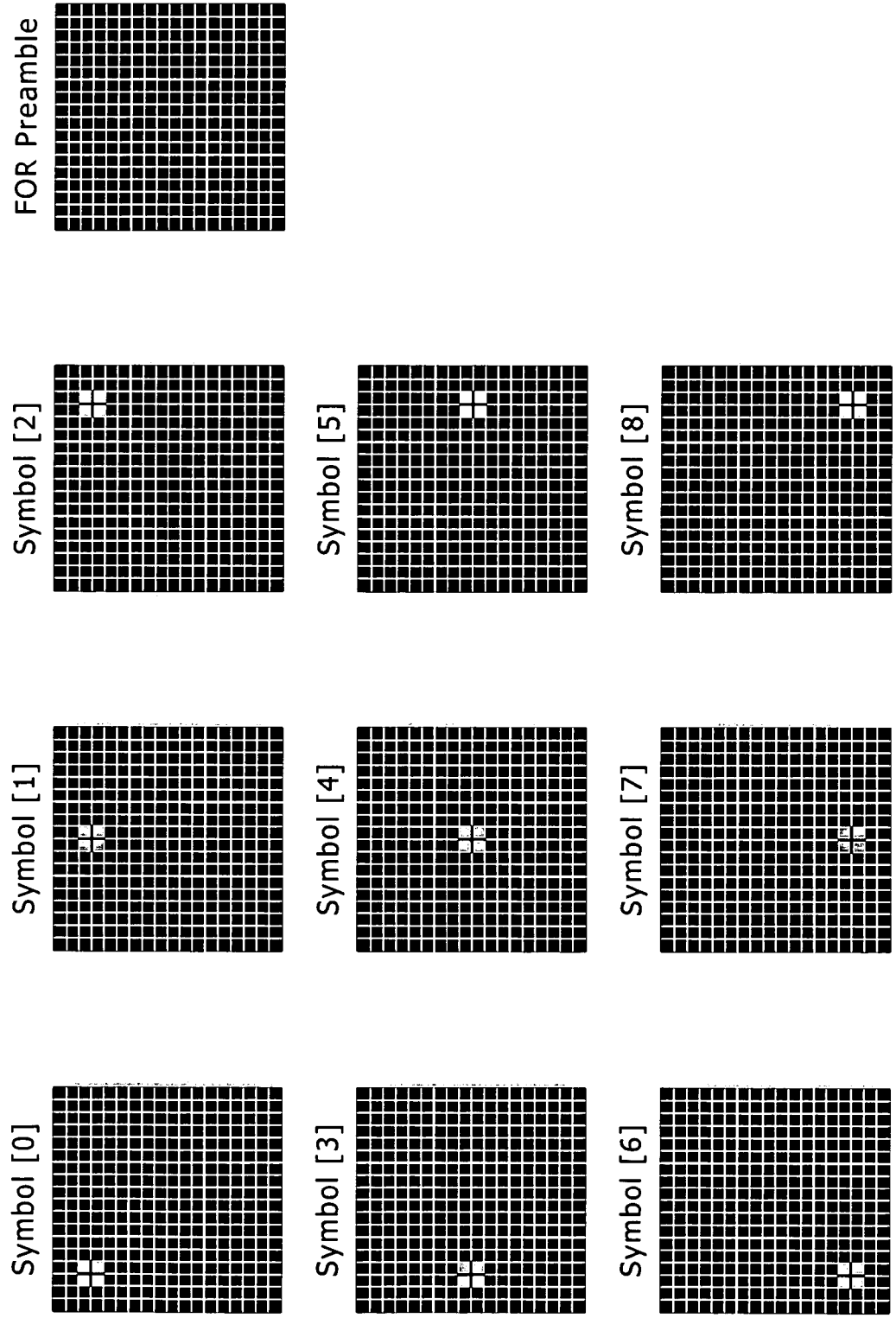
FIG. 52 is a schematic view showing crosstalk detection symbols for different numbers.
Figure 53:
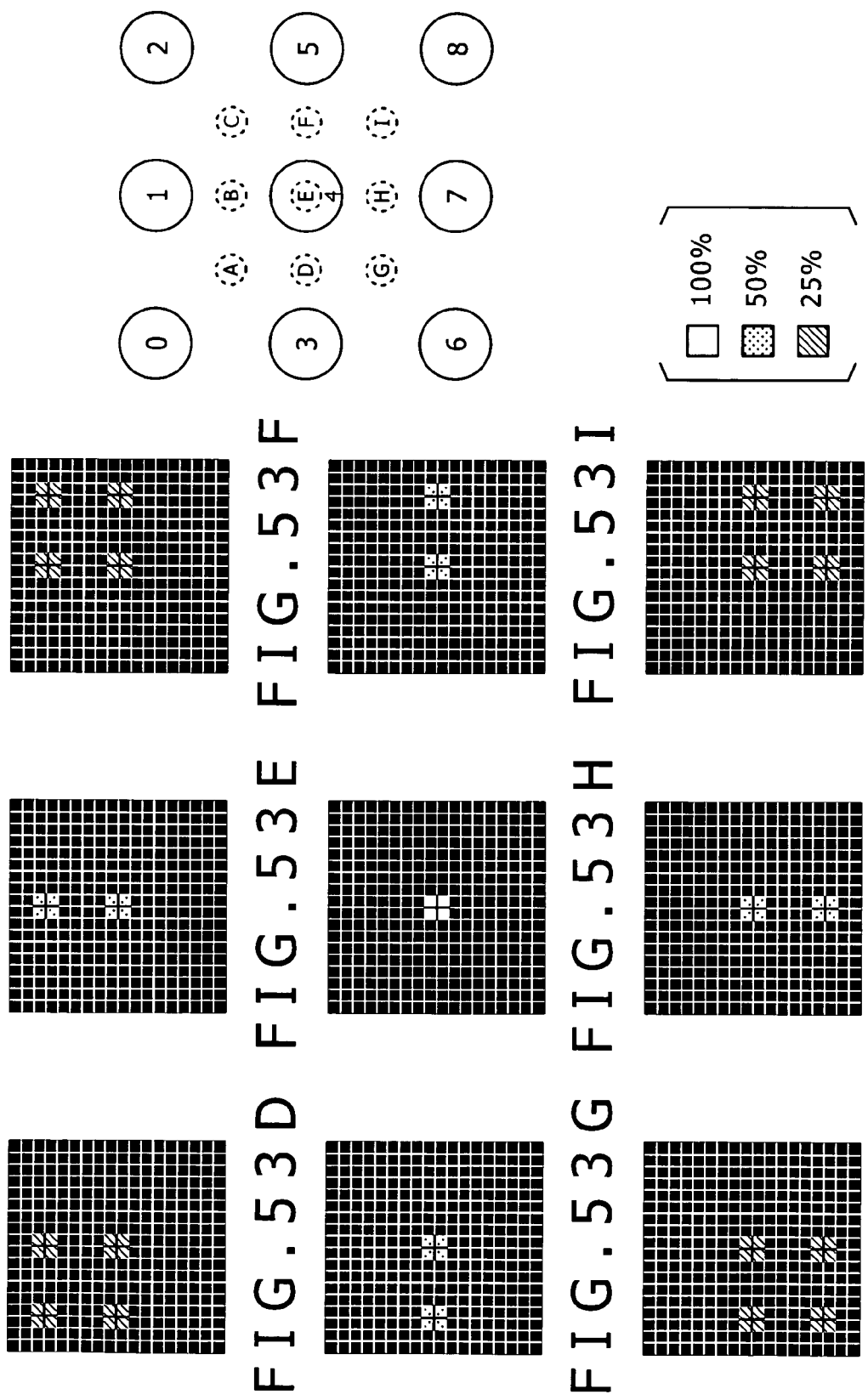
FIGS. 53A to 53I are schematic views showing reproduction images of a crosstalk detection symbol upon reproduction at different positions respectively.
FIG. 53J is a diagrammatic view illustrating a relationship between element holograms and tracking upon reproduction of the crosstalk detection symbol.
Figure 54:
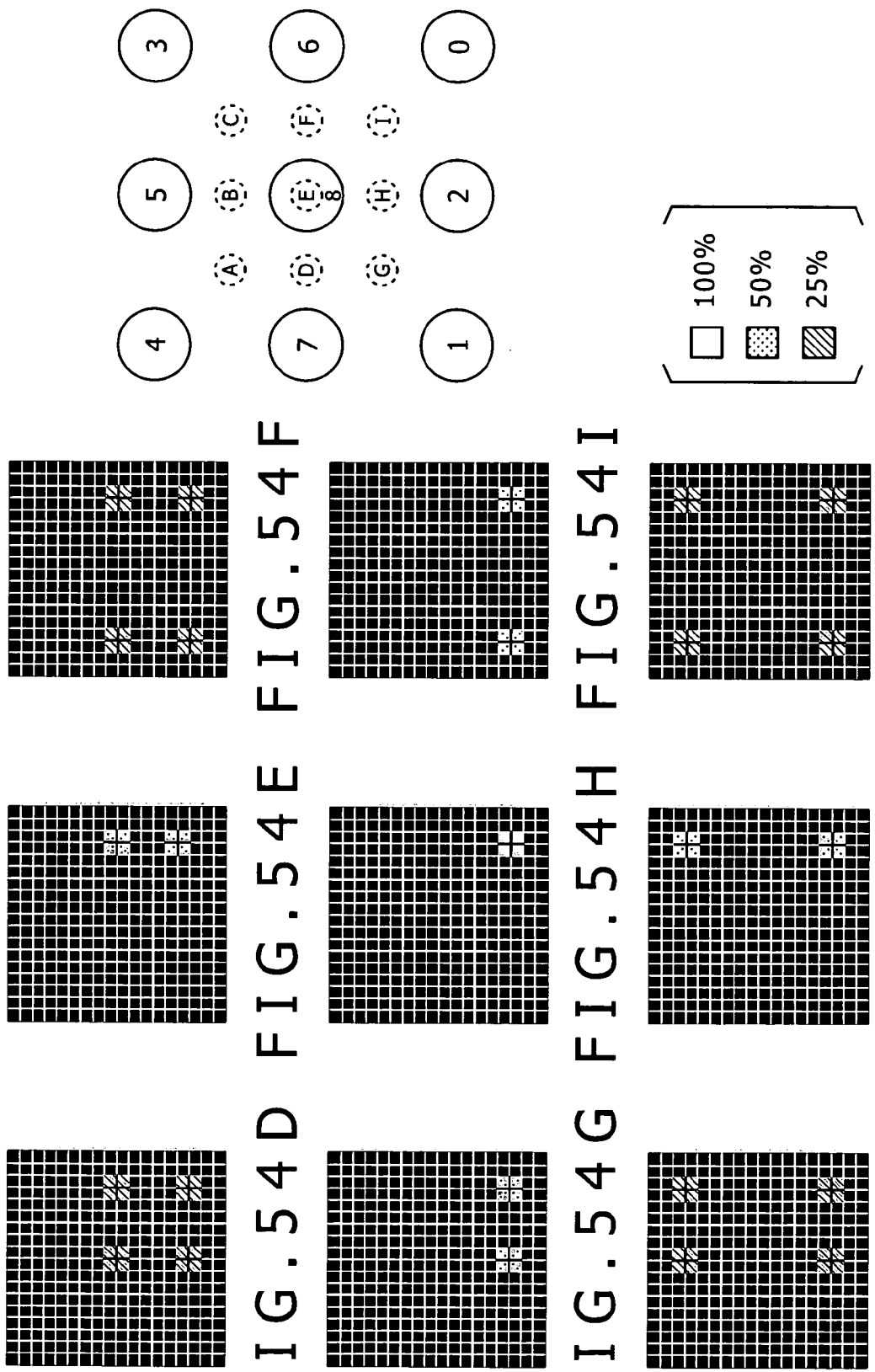
FIGS. 54A to 54I are schematic views showing reproduction images of another crosstalk detection symbol upon reproduction at different positions respectively.
FIG. 54J is a diagrammatic view illustrating a relationship between element holograms and tracking upon reproduction of the crosstalk detection symbol.

FIG. 52 shows nine different crosstalk detect symbols whose crosstalk detection symbol number is "0" to "8".

For example, the crosstalk detection symbol (Symbol [0]) whose crosstalk detection symbol number is "0" has a pattern of horizontal 18 pixels×vertical 18 pixels. Only the four pixels indicated by 0 in FIG. 51 have the white level while all of the other pixels have the black level.

Meanwhile, the crosstalk detection symbol (Symbol[1]) whose crosstalk detection symbol number is "1" has a pattern of horizontal 18 pixels×vertical 18 pixels Only the four pixels indicated by "1" in FIG. 51 have the white level while all of the other pixels have the black level.

It is to be noted that FIG. 52 further shows a crosstalk detection symbol for being added to a special page such as a preamble page. The crosstalk detection symbol to be added to a preamble page or the like has a pattern that all of the pixels have the black level.

As described above, a crosstalk detection symbol is generated as a two-dimensional pattern including totaling nine regions (one region=6×6 pixels) of horizontal three regions× vertical three regions by the crosstalk detection symbol generation process D4. Particularly, a crosstalk detection symbol is formed in a two-dimensional pattern that one of the nine regions is formed as a region which includes pixels of the white level and the other regions are formed as regions in which all pixels have the black level.

Then, one of the nine different crosstalk detect symbols having the crosstalk detect symbols from "0" to "8" is set by setting one of the nine regions as a region including pixels of the white level.

As a result of the crosstalk detection symbol generation process D4, the crosstalk detect symbols of the crosstalk detection symbol numbers "0" to "8" are outputted in a predetermined order such that each of element holograms arrayed by the element hologram arraying process D7 may include a crosstalk detection symbol of a number allocated thereto from among a plurality of crosstalk detect symbols (crosstalk detection symbol numbers "0" to "8") in response to the position of the element pixel.

Further, the crosstalk detect symbols of the individual numbers are outputted in a predetermined order such that different crosstalk detect symbols may be provided to element holograms which are positioned adjacent each other.

A utilization method of a crosstalk detection symbol is described below by way of an example.

FIGS. 53A to 53I show examples of crosstalk detection symbol reproduction images where element holograms are arrayed in a tetragonal lattice as seen in FIG. 50A. In FIG. 53J, a mark ○ indicates an element hologram, and a numeral in each mark ○ represents a crosstalk detection symbol number allocated to the element hologram. Further, broken line round marks A to I denote each a tracking position upon reproduction, that is, the center of a spot of reproduction reference light L4.

FIG. 53J illustrates an example of tracking centered at the element hologram of the crosstalk detection symbol number 4.

If the crosstalk detection symbol is reproduced at the tracking position A in FIG. 53J, then an intermediate position of the four element holograms to which the crosstalk detection symbol numbers 0, 1, 3, and 4 are allocated is reproduced. Therefore, the reproduction image of the crosstalk detection symbol becomes such an image as shown in FIG. 53A. The crosstalk detect symbols of the crosstalk detection symbol numbers 0, 1, 3, and 4 are synthesized. Thus, the white level portions corresponding to the crosstalk detection symbol numbers 0, 1, 3, and 4 are detected individually with a brightness of 25%.

If the crosstalk detection symbol is reproduced at the tracking position B in FIG. 53J, then an intermediate position of the two element holograms to which the crosstalk detection symbol numbers 1 and 4 are allocated is reproduced. Therefore, the reproduction image of the crosstalk detection symbol becomes such an image as shown in FIG. 53B. The crosstalk detect symbols of the crosstalk detection symbol numbers 1 and 4 are synthesized. Thus, the white level portions corresponding to the crosstalk detection symbol numbers 1 and 4 are detected individually with a brightness of 50%.

If the crosstalk detection symbol is reproduced at the tracking position C in FIG. 53J, then an intermediate position of the four element holograms to which the crosstalk detection symbol numbers 1, 2, 4, and 5 are allocated is reproduced. Therefore, the reproduction image of the crosstalk detection symbol becomes such an image as shown in FIG. 53C. The white level portions corresponding to the crosstalk detection symbol numbers 1, 2, 4, and 5 are detected individually with a brightness of 25%.

If the crosstalk detection symbol is reproduced at the tracking position D in FIG. 53J, then an intermediate position of the two element holograms to which the crosstalk detection symbol numbers 3 and 4 are allocated is reproduced. Therefore, the reproduction image of the crosstalk detection symbol becomes such an image as shown in FIG. 53D. The white level portions corresponding to the crosstalk detection symbol numbers 3 and 4 are detected individually with a brightness of 50%.

If the crosstalk detection symbol is reproduced at the tracking position E in FIG. 53J, then the position of the element hologram to which the crosstalk detection symbol number 4 is allocated is reproduced. Therefore, the reproduction image of the crosstalk detection symbol becomes such an image as shown in FIG. 53E. The white level portion corresponding to the crosstalk detection symbol number 4 is detected with a brightness of 100%.

Similarly, if the crosstalk detection symbol is reproduced at the tracking position F in FIG. 53J, then the white level portions corresponding to the crosstalk detection symbol numbers 4 and 5 are detected individually with a brightness of 50% as seen in FIG. 53F.

If the crosstalk detection symbol is reproduced at the tracking position G in FIG. 53J, then the white level portions corresponding to the crosstalk detection symbol numbers 3, 4, 6, and 7 are detected individually with a brightness of 25% as seen in FIG. 53G.

If the crosstalk detection symbol is reproduced at the tracking position H in FIG. 53J, then the white level portions corresponding to the crosstalk detection symbol numbers 4 and 7 are detected individually with a brightness of 50% as seen in FIG. 53H.

If the crosstalk detection symbol is reproduced at the tracking position I in FIG. 53J, then the white level portions corresponding to the crosstalk detection symbol numbers 4, 5, 7, and 8 are detected individually with a brightness of 25% as seen in FIG. 53I.

In this manner, the relationship between the element hologram array and the tracking position is reflected on a reproduction image of the crosstalk detection symbol.

Also FIGS. 54A to 54I show examples of a crosstalk detection symbol reproduction image similarly where element holograms are arrayed in a tetragonal lattice as seen in FIG. 50A. In particular, FIGS. 54A to 54I show examples of tracking centered at the element hologram of the crosstalk detection symbol number 8.

If the crosstalk detection symbol is reproduced at the tracking position A in FIG. 54J, then an intermediate position of the four element holograms to which the crosstalk detection symbol numbers 4, 5, 7, and 8 are allocated is reproduced. Therefore, the reproduction image of the crosstalk detection symbol becomes such an image as shown in FIG. 54A. The crosstalk detect symbols of the crosstalk detection symbol numbers 4, 5, 7, and 8 are synthesized. Thus, the white level portions corresponding to the crosstalk detection symbol numbers 4, 5, 7, and 8 are detected individually with a brightness of 25%.

If the crosstalk detection symbol is reproduced at the tracking position B in FIG. 54J, then an intermediate position of the two element holograms to which the crosstalk detection symbol numbers 5 and 8 are allocated is reproduced. Therefore, in the reproduction image of the crosstalk detection symbol, the white level portions corresponding to the crosstalk detection symbol numbers 5 and 8 are detected individually with a brightness of 50% as seen in FIG. 54B.

If the crosstalk detection symbol is reproduced at the tracking position C in FIG. 54J, then an intermediate position of the four element holograms to which the crosstalk detection symbol numbers 5, 3, 8, and 6 are allocated is reproduced. Therefore, in the reproduction image of the crosstalk detection symbol, the white level portions corresponding to the crosstalk detection symbol numbers 5, 3, 8, and 6 are detected individually with a brightness of 25% as seen in FIG. 54C.

If the crosstalk detection symbol is reproduced at the tracking position D in FIG. 54J, then an intermediate position of the two element holograms to which the crosstalk detection symbol numbers 7 and 8 are allocated is reproduced. Therefore, in the reproduction image of the crosstalk detection symbol, the white level portions corresponding to the crosstalk detection symbol numbers 7 and 8 are detected individually with a brightness of 50% as seen in FIG. 54D.

If the crosstalk detection symbol is reproduced at the tracking position E in FIG. 54J, then the position of the element hologram to which the crosstalk detection symbol number 8 is allocated is reproduced. Therefore, in the reproduction image of the crosstalk detection symbol, the white level portion corresponding to the crosstalk detection symbol number 8 is detected with a brightness of 100% as seen in FIG. 54E.

Similarly, if the crosstalk detection symbol is reproduced at the tracking position F in FIG. 54J, then the white level portions corresponding to the crosstalk detection symbol numbers 8 and 6 are detected individually with a brightness of 50% as seen in FIG. 54F.

If the crosstalk detection symbol is reproduced at the tracking position G in FIG. 54J, then the white level portions corresponding to the crosstalk detection symbol numbers 7, 8, 1, and 2 are detected individually with a brightness of 25% as seen in FIG. 54G.

If the crosstalk detection symbol is reproduced at the tracking position H in FIG. 54J, then the white level portions corresponding to the crosstalk detection symbol numbers 8 and 2 are detected individually with a brightness of 50% as seen in FIG. 54H.

If the crosstalk detection symbol is reproduced at the tracking position I in FIG. 54J, then the white level portions corresponding to the crosstalk detection symbol numbers 8, 6, 2, and 0 are detected individually with a brightness of 25% as seen in FIG. 54I.

In this manner, the relationship between the element hologram array and the tracking position is reflected on a reproduction image of the crosstalk detection symbol.

Figure 55:
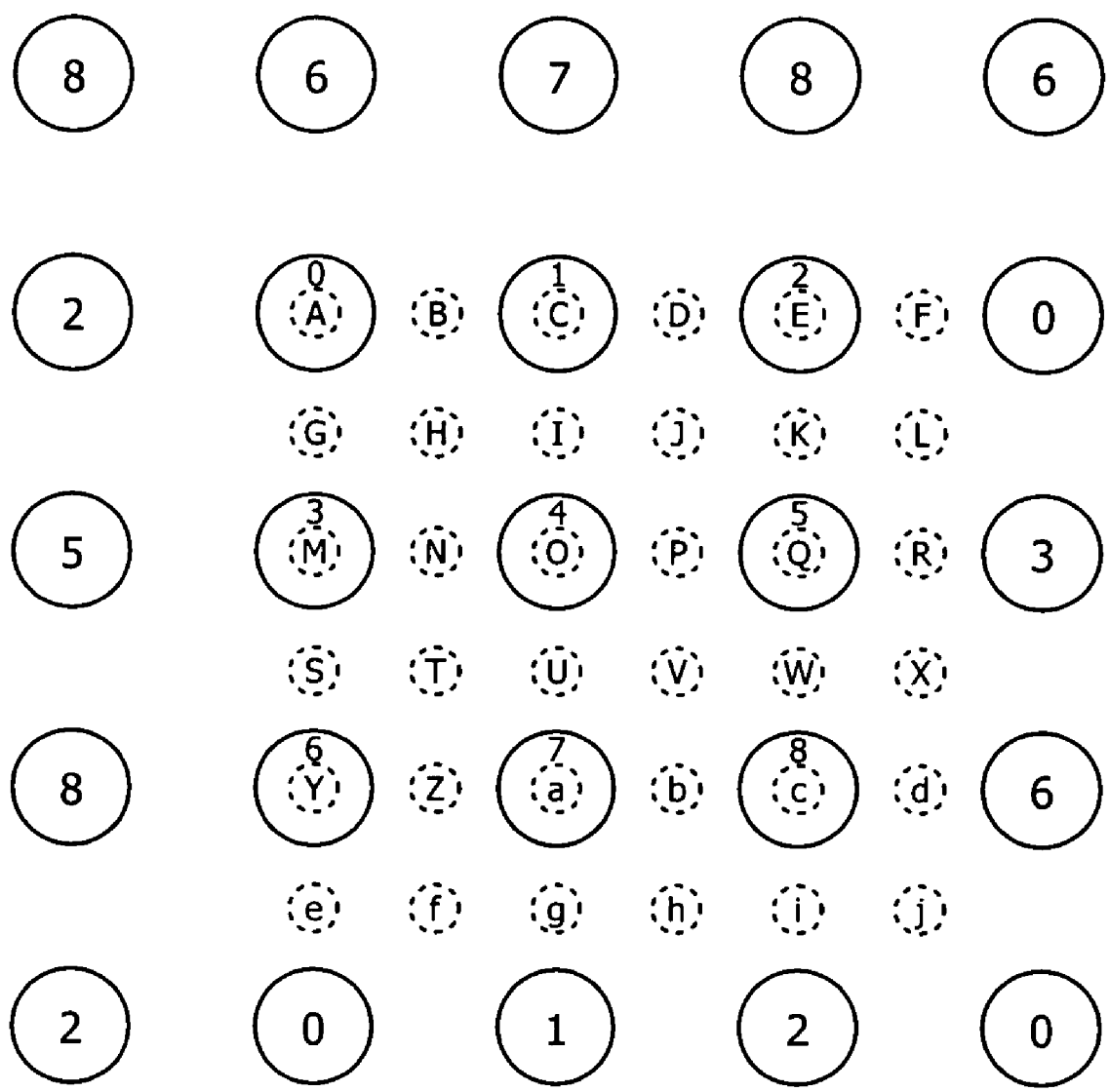
FIG. 55 is a diagrammatic view showing different tracking positions.

A representative example of tracking of an element hologram array of a tetragonal lattice is shown in FIG. 55 including a case that tracking is performed at a position different from the tracking positions centered at the element holograms of the crosstalk detection symbol numbers 4 and 8 as shown in FIGS. 53A to 53J and 54A to 54J.

Figure 56:
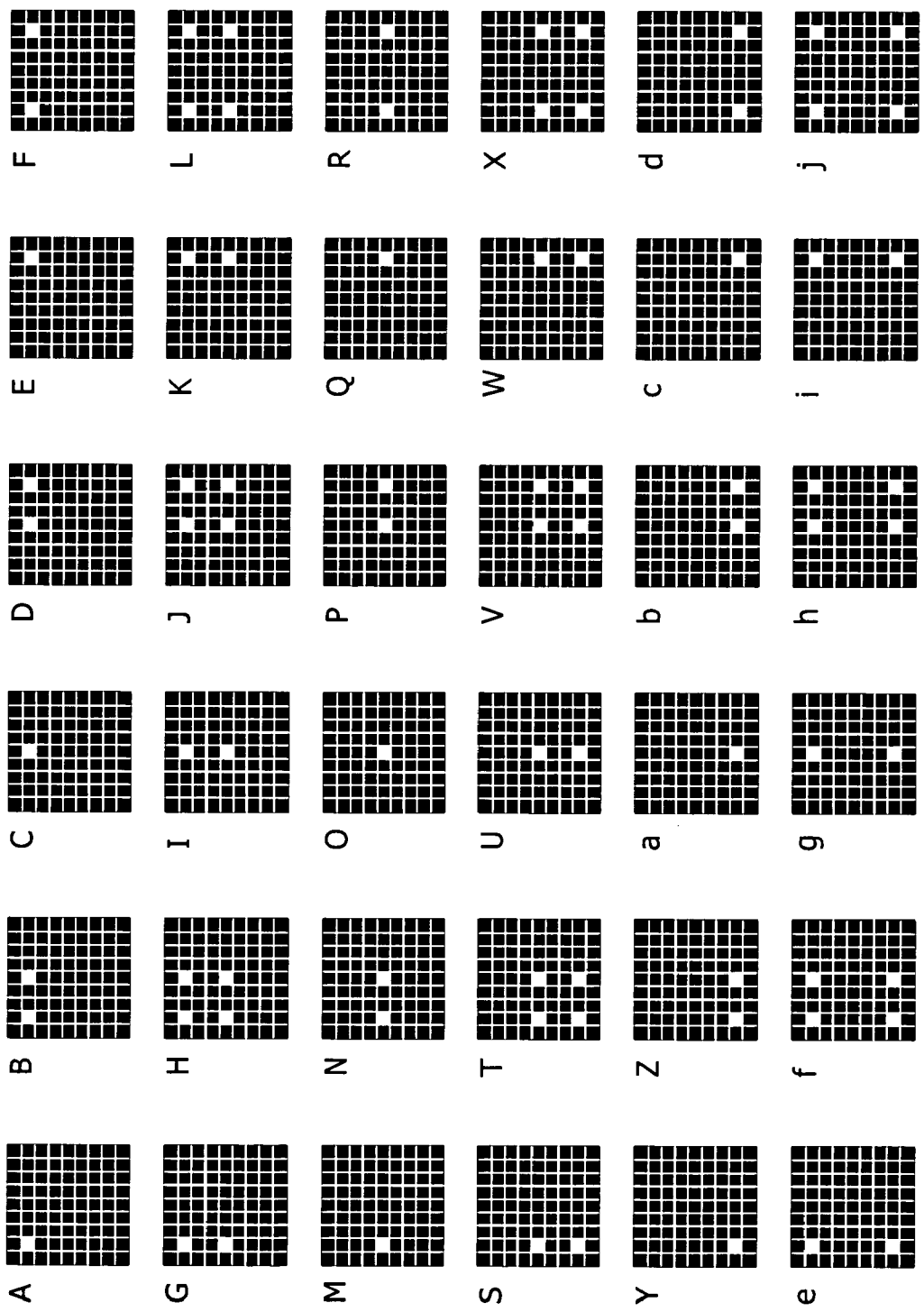
FIG. 56 is a schematic view showing reproduction images of a crosstalk detection symbol.

Also in FIG. 55, a crosstalk detection symbol number is indicated by a numeral in a mark ○. Further, a tracking position is indicated by each of broken line round marks A to Z and a to j.

Where those cases that the position just on an element hologram is reproduced (just tracking) and those cases that an intermediate position between a plurality of element holograms is reproduced (half tracking) are considered as representative examples of tracking, totaling 36 tracking states of A to Z and a to j as seen in FIG. 55 are available. Reproduction images in the 36 tracking states are shown in FIG. 56.

Although description of tracking at the individual tracking positions is omitted, some description is given so that such tracking can be understood similarly as in the cases of FIGS. 53A to 53J and 54A to 54J. In particular, where the crosstalk detection symbol is reproduced just on a certain element hologram, in the reproduction image of the crosstalk detection symbol, the white level portion corresponding to the cross talk detection symbol number allocated to the element hologram is detected with a brightness of 100%. On the other hand, in a half tracking state for two element holograms, the reproduction image of the crosstalk detection symbol is formed such that the white level portions corresponding to the two crosstalk detect symbols allocated to the two element holograms are detected individually with a brightness of 50%. Further, in a half tracking state for four element holograms, the reproduction image of the crosstalk detection signal is formed such that the white level portions corresponding to the four crosstalk detection symbol numbers allocated to the four element holograms are detected individually with a brightness of 25%.

It is to be noted that there actually exists also a delicate intermediate state between such a just tracking state and a half tracking state as described above. In such an instance, the reproduction image appears with a brightness of a balance in brightness between white level portions of the crosstalk detection symbol.

Now, a reproduction image of a crosstalk detection symbol where element holograms are arrayed in an orthorhombic lattice as seen in FIG. 50B is described.

In FIG. 57J, an element hologram where such element holograms are arrayed in an orthorhombic lattice is represented by a mark ○, and a numeral in each mark ○ represents a crosstalk detection symbol number allocated to the element hologram. FIGS. 57A to 57J illustrates examples of tracking centered at the even-numbered element hologram of the crosstalk detection symbol number 4.

If the crosstalk detection symbol is reproduced at the tracking position A in FIG. 57J, then an intermediate position of the three element holograms to which the crosstalk detection symbol numbers 0, 1, and 4 are allocated is reproduced. Therefore, the reproduction image of the crosstalk detection symbol becomes such an image as shown in FIG. 57A. The crosstalk detect symbols of the crosstalk detection symbol numbers 0, 1, and 4 are synthesized. Thus, the white level portions corresponding to the crosstalk detection symbol numbers 0, 1, and 4 are detected individually with a brightness of 33%.

If the crosstalk detection symbol is reproduced at the tracking position B in FIG. 57J, then an intermediate position of the two element holograms to which the crosstalk detection symbol numbers 1 and 4 are allocated is reproduced. Therefore, in the reproduction image of the crosstalk detection symbol, the white level portions corresponding to the crosstalk detection symbol numbers 1 and 4 are detected individually with a brightness of 50% as seen in FIG. 57B.

If the crosstalk detection symbol is reproduced at the tracking position C in FIG. 57J, then an intermediate position of the three element holograms to which the crosstalk detection symbol numbers 1, 2, and 4 are allocated is reproduced. Therefore, in the reproduction image of the crosstalk detection symbol, the white level portions corresponding to the crosstalk detection symbol numbers 1, 2, and 4 are detected individually with a brightness of 33% as seen in FIG. 57C.

If the crosstalk detection symbol is reproduced at the tracking position D in FIG. 57J, then an intermediate position of the three element holograms to which the crosstalk detection symbol numbers 0, 3, and 4 are allocated is reproduced. Therefore, in the reproduction image of the crosstalk detection symbol, the white level portions corresponding to the crosstalk detection symbol numbers 0, 3, and 4 are detected individually with a brightness of 33% as seen in FIG. 57D.

If the crosstalk detection symbol is reproduced at the tracking position E in FIG. 57J, then the position of the element hologram to which the crosstalk detection symbol number 4 is allocated is reproduced. Therefore, in the reproduction image of the crosstalk detection symbol, the white level portion corresponding to the crosstalk detection symbol number 4 is detected with a brightness of 100% as seen in FIG. 57E.

Similarly, if the crosstalk detection symbol is reproduced at the tracking position F in FIG. 57J, then the white level portions corresponding to the crosstalk detection symbol numbers 2, 4, and 5 are detected individually with a brightness of 33% as seen in FIG. 57F.

If the crosstalk detection symbol is reproduced at the tracking position G in FIG. 57J, then the white level portions corresponding to the crosstalk detection symbol numbers 4, 3, and 7 are detected individually with a brightness of 33% as seen in FIG. 57G.

If the crosstalk detection symbol is reproduced at the tracking position H in FIG. 57J, then the white level portions corresponding to the crosstalk detection symbol numbers 4 and 7 are detected individually with a brightness of 50% as seen in FIG. 57H.

If the crosstalk detection symbol is reproduced at the tracking position I in FIG. 57J, then the white level portions corresponding to the crosstalk detection symbol numbers 4, 5, and 7 are detected individually with a brightness of 33% as seen in FIG. 57I.

In this manner, the relationship between the element hologram array and the tracking position is reflected on a reproduction image of the crosstalk detection symbol.

FIGS. 58A to 58I show examples of a reproduction image centered at the element hologram of the crosstalk detection symbol number 4 in an array of an orthorhombic lattice similarly.

If the crosstalk detection symbol is reproduced at the tracking position A in FIG. 58J, then an intermediate position of the three element holograms to which the crosstalk detection symbol numbers 1, 3, and 4 are allocated is reproduced. Therefore, the reproduction image of the crosstalk detection symbol becomes such an image as shown in FIG. 58A. The crosstalk detect symbols of the crosstalk detection symbol numbers 1, 3, and 4 are synthesized. Thus, the white level portions corresponding to the crosstalk detection symbol numbers 1, 3, and 4 are detected individually with a brightness of 33%.

If the crosstalk detection symbol is reproduced at the tracking position B in FIG. 58J, then an intermediate position of the two element holograms to which the crosstalk detection symbol numbers 1 and 4 are allocated is reproduced. Therefore, in the reproduction image of the crosstalk detection symbol, the white level portions corresponding to the crosstalk detection symbol numbers 1 and 4 are detected individually with a brightness of 50% as seen in FIG. 58B.

If the crosstalk detection symbol is reproduced at the tracking position C in FIG. 58J, then an intermediate position of the three element holograms to which the crosstalk detection symbol numbers 1, 5, and 4 are allocated is reproduced. Therefore, in the reproduction image of the crosstalk detection symbol, the white level portions corresponding to the crosstalk detection symbol numbers 1, 5, and 4 are detected individually with a brightness of 33% as seen in FIG. 58C.

If the crosstalk detection symbol is reproduced at the tracking position D in FIG. 58J, then an intermediate position of the three element holograms to which the crosstalk detection symbol numbers 3, 4, and 6 are allocated is reproduced. Therefore, in the reproduction image of the crosstalk detection symbol, the white level portions corresponding to the crosstalk detection symbol numbers 3, 4, and 6 are detected individually with a brightness of 33% as seen in FIG. 58D.

If the crosstalk detection symbol is reproduced at the tracking position E in FIG. 58J, then the position of the element hologram to which the crosstalk detection symbol number 4 is allocated is reproduced. Therefore, in the reproduction image of the crosstalk detection symbol, the white level portion corresponding to the crosstalk detection symbol number 4 is detected with a brightness of 100% as seen in FIG. 58E.

Similarly, if the crosstalk detection symbol is reproduced at the tracking position F in FIG. 58J, then the white level portions corresponding to the crosstalk detection symbol numbers 5, 4, and 8 are detected individually with a brightness of 33% as seen in FIG. 58F.

If the crosstalk detection symbol is reproduced at the tracking position G in FIG. 58J, then the white level portions corresponding to the crosstalk detection symbol numbers 4, 6, and 7 are detected individually with a brightness of 33% as seen in FIG. 58G.

If the crosstalk detection symbol is reproduced at the tracking position H in FIG. 58J, then the white level portions corresponding to the crosstalk detection symbol numbers 4 and 7 are detected individually with a brightness of 50% as seen in FIG. 58H.

If the crosstalk detection symbol is reproduced at the tracking position I in FIG. 58J, then the white level portions corresponding to the crosstalk detection symbol numbers 4, 8, and 7 are detected individually with a brightness of 33% as seen in FIG. 58I.

In this manner, the relationship between the element hologram array and the tracking position is reflected on a reproduction image of the crosstalk detection symbol.

Figure 59A:
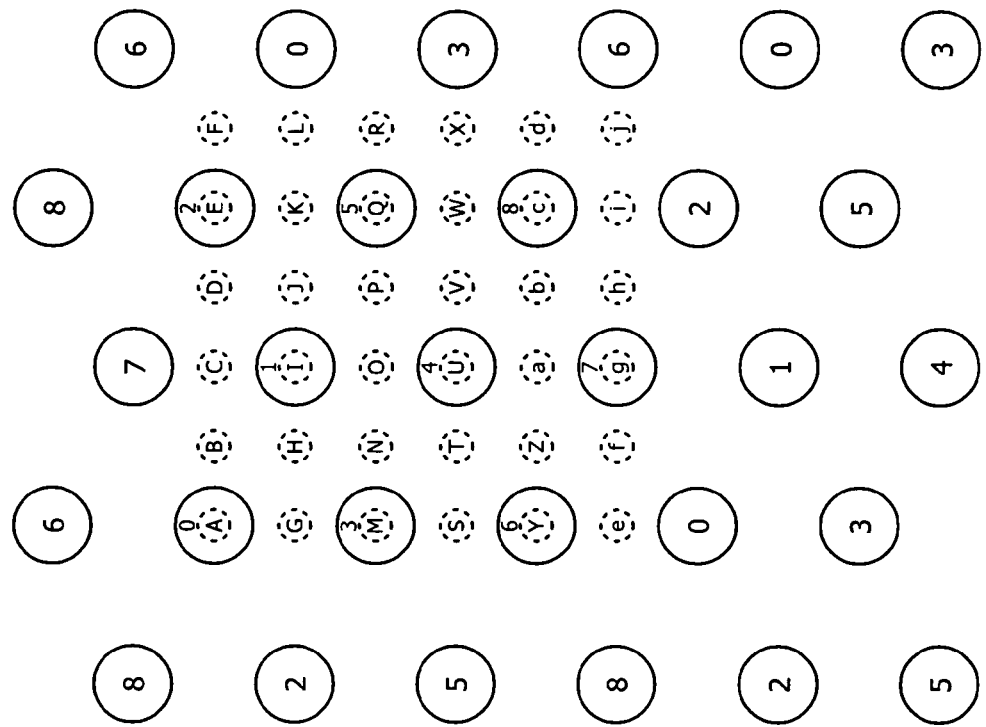
FIG. 59A is a diagrammatic view illustrating an odd-numbered column of a tracking position.
Figure 59B:
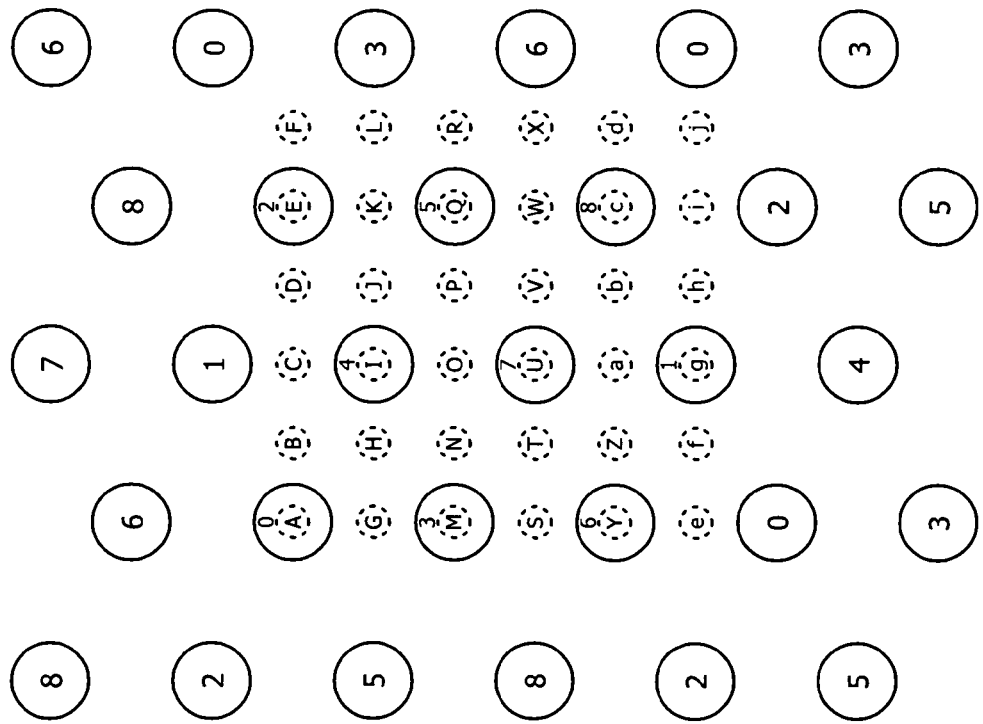
FIG. 59B is a similar view but illustrating an even-numbered column of the tracking position.

Representative examples of tracking of an element hologram array of an orthorhombic lattice are shown in FIGS. 59A and 59B. In the case of an orthorhombic lattice, two cases are available including a case of an odd-numbered column (Odd Column) and an even-numbered column (Even Column). The Odd Column is a column of the element holograms to which the crosstalk detection symbol numbers 1, 4, and 7 are allocated is displaced by a 0.5-element hologram distance upwardly with respect to the columns of the element holograms to which the crosstalk detection symbol numbers 0, 3, and 6 and the crosstalk detection symbol numbers 2, 5, and 8 are allocated as seen in FIG. 59A. The Even Column is the column of the element holograms of the crosstalk detection symbol numbers 1, 4, and 7 is displaced by a 0.5-element hologram distance downwardly with respect to the columns described above as seen in FIG. 59B.

Figure 60:
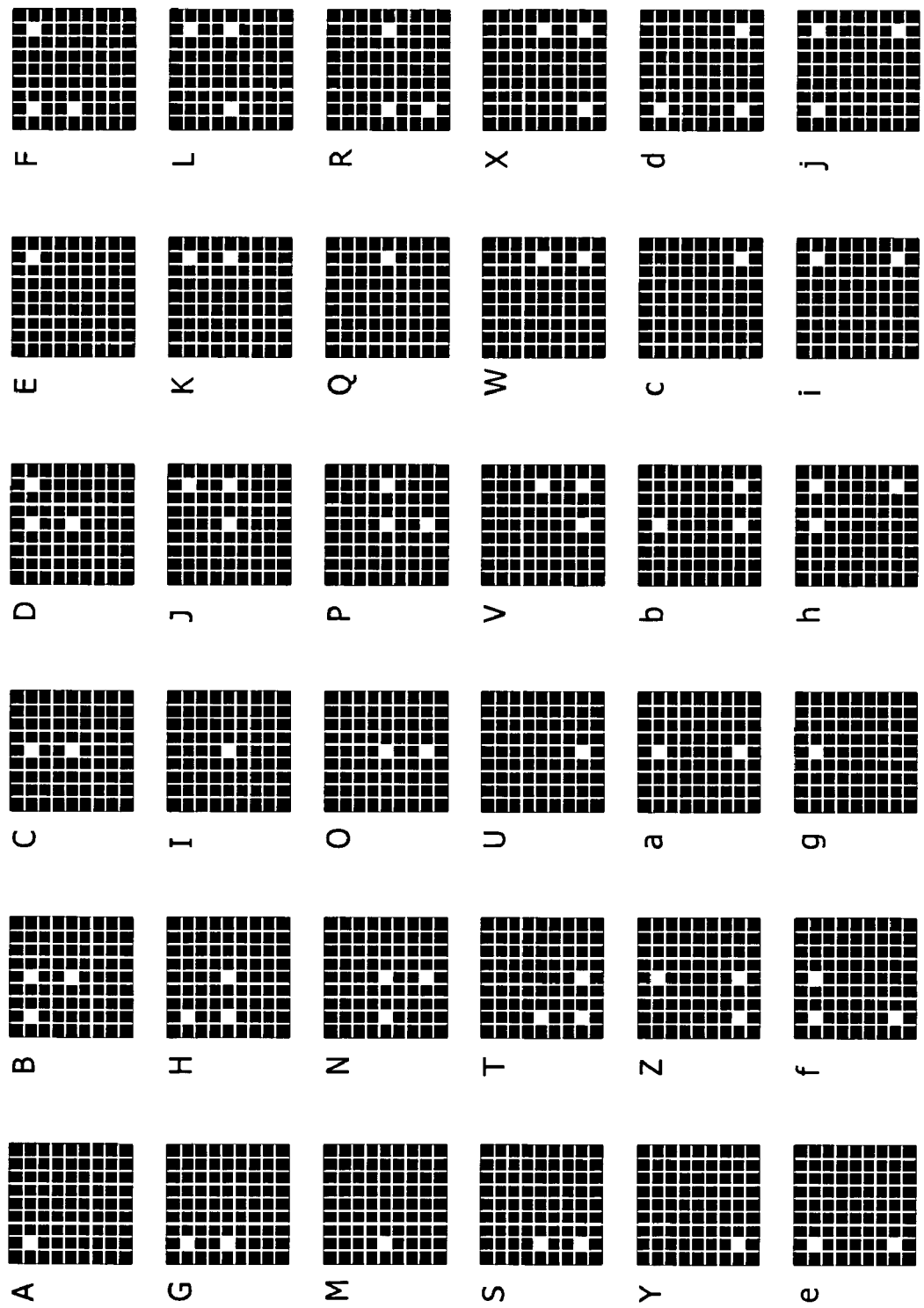
FIG. 60 is a schematic view showing reproduction images of the crosstalk detection symbol upon the odd-numbered column.

Reproduction images in the 36 tracking states A to Z and a to j in the case of the odd-numbered column of FIG. 59A are shown in FIG. 60.

Meanwhile, reproduction images in the 36 tracking states A to Z and a to j in the case of the even-numbered column of FIG. 59B are shown in FIG. 61.

Some description is given below so that tracking can be understood similarly as in the cases of FIGS. 57A to 57J and 58A to 58J. In particular, where the crosstalk detection symbol is reproduced just on a certain element hologram, in the reproduction image of the crosstalk detection symbol, the white level portion corresponding to the cross talk detection symbol number allocated to the element hologram is detected with a brightness of 100%. On the other hand, in a half tracking state for two element holograms, the reproduction image of the crosstalk detection symbol is formed such that the white level portions corresponding to the two crosstalk detect symbols allocated to the two element holograms are detected individually with a brightness of 50%. Further, in a half tracking state for three element holograms, the reproduction image of the crosstalk detection signal is formed such that the white level portions corresponding to the three crosstalk detection symbol numbers allocated to the three element holograms are detected individually with a brightness of 33%.

Naturally, also in this instance, there actually exists also a delicate intermediate state between such a just tracking state and half tracking states as described above. In such an instance, the reproduction image appears with a brightness of a balance in brightness between white level portions of the crosstalk detection symbol.

A crosstalk detection symbol can be used for decision of a tracking state upon reproduction as described above.

Then, the crosstalk detection symbol, main synchronization symbol, physical ID code symbol, and logical ID code symbol are synthesized to generate a page search symbol as described hereinabove with reference to FIG. 24.

Further, the page search symbol and a group sub sync are synthesized to form a group main sync. Then, a plurality of such group main syncs are synthesized to form a physical image, and an element hologram is formed based on the physical page.

Such element holograms are arrayed two-dimensionally to form the hologram unit matrix 20.

7. Effects of the Embodiment

According to the embodiment described above, the following effects can be achieved.

According to the embodiment, an encoding system suitable for information recording on a hologram recording medium can be implemented by generating data pages from input data as a one-dimensional information sequence of an object of encoding, performing inner encoding and outer encoding for the data pages, producing physical pages as two-dimensional data, and arraying the physical pages as element holograms.

Particularly by dividing data, which are to be converted into element holograms, into sectors and adding EDCs to the sectors by the sector dividing process A2 and the EDC addition process A3 of the scrambled data page generator 11, the reliability of final corrected data can be decided in a unit of a sector.

Further, by applying scrambling to logical pages by the scramble process A4 of the scrambled data page generator 11, such a situation that recording data are difficult to be estimated readily from a physical page which is read optically can be established. Consequently, the security or copyright protection of content data, computer data, and so forth recorded on the hologram memory 3 can be achieved suitably.

Further, by adding error correction codes to a logical page unit by the data array conversion process B1 and the intra-page encoding process B2 of the inner page encoder 12, error detection and correction in a unit of a logical page are permitted.

Further, by performing an interleaving process, which is completed in a logical page, as the intra-page interleave process B3, symbol errors arising from a dispersion in brightness, geometrical displacement, and so forth in a physical page can be distributed to the entire page.

Further, by performing the inter-page encoding process C2 by the outer page encoder 13, the necessity to read out all pages upon reproduction of the hologram unit matrix 20 (upon reproduction of the hologram memory 3 on which the hologram unit matrix 20 is formed) is eliminated. For example, if 16 parity pages are added to 112 logical pages, then if reading of 77.5 percent of all logical pages is completed, then all logical pages can be reproduced fully by carrying out disappearance correction for those pages for which reading is not completed. This can achieve implementation of efficient scanning upon reproduction and enhancement of the data reading out performance.

Further, by performing the page duplication process C3 by the outer page encoder 13, an element hologram array of the closed stack type is permitted, and consequently, a reading operation of element holograms is facilitated.

Further, by adding a logical page ID allocated uniquely and a physical page ID allocated uniquely to an inner encoded page and an outer encoded page, respectively, by the page ID generation process D1 of the hologram unit matrix generator 14, when a physical page is reproduced from element holograms, a physical reproduction position can be grasped first from the physical page ID. Further, it is possible to grasp a logical reproduction position developed on a RAM on the reproduction apparatus side using the physical page as a logical page.

Further, by providing a two-dimensional code symbol with a sub-sync pixel and a sub-guard pixel as shown in FIG. 26, performing rotational joining of a set of four symbols to generate a group R as seen in FIG. 35, and then producing a group sub sync from four such groups R as seen in FIG. 36 by the first two-dimensional modulation process D6, a sub synchronization pattern of 2×2 pixels can be generated from a two-dimensional symbol generated based on a single two-dimensional modulation table (FIGS. 28 to 34). A white level region as a sub synchronization pattern is made clear by sub guard pixels.

Furthermore, by forming a group sub sync from four groups R, forming a sub synchronization pattern at the center of the group sub sync, and forming a main synchronization symbol from 4×4 symbols, the synchronization center positions as viewed in a unit of a group sub sync can be distributed uniformly in a physical page.

Further, such 30 patterns as shown in FIG. 27 are excepted. In other words, in a two-dimensional symbol generation procedure, conversion into any two-dimensional pattern in which pixels of the white level appear adjacent each other in the vertical, horizontal, and oblique directions is inhibited. Consequently, the two-dimensional run length can be restricted to six pixels or less, and this facilitates identification from a continuous pattern of eight pixels used in a main synchronization symbol.

Further, a page search symbol has a size equal to an integral number of times that of a group sub sync. The group sub sync is formed from 16×16 pixels while the page search symbol is formed from 32×32 pixels. In other words, one page search symbol corresponds to four group sub syncs in size. By the configuration just described, even if a page search symbol is arranged at any symbol position on a group main sync, the center-of-gravity positions of the main synchronization symbol and the sub synchronization pattern can maintain regularity in both of the directions of the axis of ordinate and the axis of abscissa.

Further, by forming an even-numbered main synchronization symbol in a square shape and forming an odd-numbered main synchronization symbol in a diamond shape as described hereinabove with reference to FIGS. 46 and 47, displacement of read coordinates of a scanned signal from the center of a symbol upon reproduction can be detected readily.

Further, as described hereinabove with reference to FIGS. 50A to 60, each of element holograms formed as a hologram unit matrix 20 includes a type of a crosstalk detection symbol which depends upon the position of the element hologram on the array. Therefore, a tracking state can be decided from information of crosstalk detect symbols detected upon reproduction.

Particularly since stroke detection symbol numbers different from each other are allocated without fail to adjacent element holograms, that is, since adjacent element holograms have crosstalk detect symbols different from each other without fail, the tracking state upon reproduction of a physical page can be detected from a brightness dispersion of crosstalk detect symbols.

While a preferred embodiment of the present invention has been described using specific terms, such processing procedures and patterns as are described in the embodiment are mere examples at all, and it is to be understood that changes and variations may be made without departing from the spirit or scope of the following claims.

According to an embodiment of the present invention, to group main syncs arrayed as physical pages, main synchronization symbols as a plurality of different two-dimensional patterns are allocated in a predetermined order. By such allocation, upon reproduction of element holograms, that is, when a physical page is read out, the scanning position can be detected readily from a difference between the main synchronization symbols.

For example, the main synchronization symbols are allocated such that the main synchronization symbol of those group main syncs which are even-numbered in both of vertical and horizontal directions on the physical page has a square shape, and the main synchronization symbol of those group main syncs which are odd-numbered has a diamond shape. Upon reproduction, the displacement of the read coordinates of a signal obtained by scanning from the center of the symbol can be detected readily from a reproduction signal waveform.

In short, according to an embodiment of the present invention, a hologram recording apparatus, hologram recording method, and a hologram recording medium which have a suitable synchronization pattern from which a scanning state can be detected upon reproduction can be provided.

What is claimed is:

1. A recording apparatus for recording data as element holograms on a hologram recording medium, comprising:
    two-dimensional modulation means configured to convert the recording data into a two-dimensional code symbol for each predetermined data unit amount;
    synchronization signal generation means configured to generate a plurality of main synchronization symbols each from a two-dimensional pattern; and
    physical page generation means configured to generate a plurality of group main syncs each from the two-dimensional code symbols obtained by the conversion by said two-dimensional modulation means and a main synchronization symbol selected in a predetermined order from the plurality of main synchronization symbols generated by said synchronization signal generation means and to two-dimensionally arrange the generated group main syncs to generate a physical page,
    wherein the two-dimensional code symbol is an n×n square array, and the main synchronization symbol is in an (n·m)×(n·m) square array, wherein m and n are positive integers, and
    said two-dimensional modulation means converts a data type represented by the predetermined data unit amount, in which the recording data are converted into the two-dimensional code symbol, on the two-dimensional code symbol with a combination array of a first type of data.

2. The recording apparatus according to claim 1, wherein the main synchronization symbol is formed from the first kind of data the number of which is greater than the number of the first kind of data which are used for the two-dimensional code symbol into which the recording data are converted.

3. The recording apparatus according to claim 2, wherein one of the plurality of main synchronization symbols includes the first kind of data which are arrayed in a square in the square array.

4. The recording apparatus according to claim 3, wherein the other of the plurality of main synchronization symbols includes the first kind of data which are arranged in a diamond shape in the square array.

5. A recording method for recording data as element holograms on a hologram recording medium, comprising the steps of:
    converting the recording data into a two-dimensional code symbol for each predetermined data unit amount;
    generating a plurality of main synchronization symbols each from a two-dimensional pattern;
    generating a plurality of group main syncs each from the two-dimensional code symbols and a main synchronization symbol selected in a predetermined order from the plurality of main synchronization symbols; and
    two-dimensionally arranging the generated group main syncs to generate a physical page,
    wherein the two-dimensional code symbol is an n×n square array, and the main synchronization symbol is in an (n·m)×(n·m) square array, wherein m and n are positive integers, and in the conversion into the two-dimensional code symbol, a data type represented by the predetermined data unit amount, in which the recording data are converted into the two-dimensional code symbol, is converted on the two-dimensional code symbol with a combination array of a first type of data.

6. The recording method according to claim 5, wherein the main synchronization symbol is formed from the first kind of data the number of which is greater than the number of the first kind of data which are used for the two-dimensional code symbol into which the recording data are converted.

7. The recording method according to claim 6, wherein one of the plurality of main synchronization symbols includes the first kind of data which are arrayed in a square in the square array.

8. The recording method according to claim 7, wherein the other of the plurality of main synchronization symbols includes the first kind of data which are arranged in a diamond shape in the square array.

9. A recording apparatus for recording data as element holograms on a hologram recording medium, comprising:
a two-dimensional modulation section configured to convert the recording data into a two-dimensional code symbol for each predetermined data unit amount;
a synchronization signal generation section configured to generate a plurality of main synchronization symbols each from a two-dimensional pattern; and
a physical page generation section configured to generate a plurality of group main syncs each from the two-dimensional code symbols obtained by the conversion by said two-dimensional modulation section and a main synchronization symbol selected in a predetermined order from the plurality of main synchronization symbols generated by said synchronization signal generation section and to two-dimensionally arrange the generated group main syncs to generate a physical page,
wherein the two-dimensional code symbol is an n×n square array, and the main synchronization symbol is in an (n·m)×(n·m) square array, wherein m and n are positive integers, and
said two-dimensional modulation section is configured to convert a data type represented by the predetermined data unit amount, in which the recording data are converted into the two-dimensional code symbol, on the two-dimensional code symbol with a combination array of a first type of data.

* * * * *